US011934730B2

(12) United States Patent
Okada

(10) Patent No.: US 11,934,730 B2
(45) Date of Patent: Mar. 19, 2024

(54) INFORMATION PROCESSING APPARATUS AND IMAGE COMMUNICATION APPARATUS

(71) Applicant: SHARP KABUSHIKI KAISHA, Sakai (JP)

(72) Inventor: Mikiya Okada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/725,405

(22) Filed: Apr. 20, 2022

(65) Prior Publication Data

US 2022/0350555 A1 Nov. 3, 2022

(30) Foreign Application Priority Data

Apr. 28, 2021 (JP) ................................ 2021-076252
Apr. 28, 2021 (JP) ................................ 2021-076253

(51) Int. Cl.
*G06F 3/12* (2006.01)

(52) U.S. Cl.
CPC .......... *G06F 3/1273* (2013.01); *G06F 3/1256* (2013.01); *G06F 3/1257* (2013.01); *G06F 3/1268* (2013.01)

(58) Field of Classification Search
CPC .... G06F 3/1273; G06F 3/1256; G06F 3/1257; G06F 3/1258; G06F 3/1268; G06F 3/1204; H04N 1/0051; H04N 1/0083
See application file for complete search history.

(56) References Cited

U.S. PATENT DOCUMENTS

| | | | | |
|---|---|---|---|---|
| 10,880,452 | B2 * | 12/2020 | Yokoyama | H04N 1/00204 |
| 2010/0128309 | A1 | 5/2010 | Matoba | |
| 2016/0011821 | A1 * | 1/2016 | Tomihisa | G06F 3/1286 358/1.13 |
| 2016/0320924 | A1 * | 11/2016 | Mizuguchi | A61H 9/0078 |
| 2019/0384552 | A1 * | 12/2019 | Sakaguchi | G06F 3/1254 |
| 2020/0249891 | A1 * | 8/2020 | Kawakami | G06F 3/1273 |

FOREIGN PATENT DOCUMENTS

JP 2010-130245 A 6/2010

* cited by examiner

*Primary Examiner* — John R Wallace
(74) *Attorney, Agent, or Firm* — ScienBiziP, P.C.

(57) ABSTRACT

An information processing apparatus includes a display, a storage, and a controller. The controller displays either an execution screen that accepts an execution command of a job or a simple execution screen whose displayed contents are simplified from those of the execution screen, on the display. The storage stores history information related to the job which was instructed to be executed through either the execution screen or the simple execution screen. The controller displays the execution screen or the simple execution screen on the display unit, in accordance with the history information selected by the user.

8 Claims, 45 Drawing Sheets

FIG. 3

SETTING HISTORY INFORMATION

| JOB ID | JOB TYPE | EXECUTION USERNAME | DOCUMENT NAME | PAGE No./ SET No. | STARTING DATE AND TIME -- ENDING DATE AND TIME | MODE | SETTING VALUES | |
|---|---|---|---|---|---|---|---|---|
| 025 | COPY | Yamada | document 03 | 002/ 001 | 2019/12/04 10:30:50 -- 2019/12/04 10:32:50 | Normal | Color Mode :Full Color<br>Paper Size :A4<br>Original Size :A4<br>Paper Type :Plain Paper<br>Number of Copy :1 Copy<br>Zoom Function :ON<br>Zoom Ratio :100 %<br>Copy Density :Auto<br>Paper Select :No. 1 | Duplex Copy :2-side --> 2-side<br>N-Up Print :1:1<br>Fit Page :Yes<br>Staple/Punch :Needleless Staple<br>Data Correction Function :Yes<br>Color Mode Adjustment Function :Yes<br>Letter-Image Composition Function :No<br>Special Printing Function :No<br>Sort/Group :Auto |
| 024 | COPY | Yamada | document 05 | 010/ 001 | 2019/12/04 10:15:30 -- 2019/12/04 10:17:50 | Simple | Color Mode :Full Color<br>Paper Size :A4<br>Original Size :A4<br>Paper Type :Plain Paper<br>Number of Copy :10 Copies<br>Zoom Function :ON<br>Zoom Ratio :100 %<br>Copy Density :Auto<br>Paper Select :Manual Feed | Duplex Copy :1-side --> 1-side<br>N-Up Print :1:1<br>Fit Page :Yes<br>Staple/Punch :OFF<br>Data Correction Function :Yes<br>Color Mode Adjustment Function :Yes<br>Letter-Image Composition Function :No<br>Special Printing Function :No<br>Sort/Group :Auto |
| 023 | COPY | Tanaka | document 02 | 001/ 001 | 2019/12/04 09:30:00 -- 2019/12/04 09:31:10 | Normal | Color Mode :Black&White<br>Paper Size :A4<br>Original Size :A4<br>Paper Type :Plain Paper<br>Number of Copy :5 Copies<br>Zoom Function :ON<br>Zoom Ratio :100 %<br>Copy Density :Auto<br>Paper Select :No. 1 | Duplex Copy :Double Page Spread --> Double<br>N-Up Print :1:1<br>Fit Page :Yes<br>Staple/Punch :OFF<br>Data Correction Function :Yes<br>Color Mode Adjustment Function :Yes<br>Letter-Image Composition Function :No<br>Special Printing Function :No<br>Sort/Group :Auto |

FIG. 23

SETTING HISTORY INFORMATION

| JOB ID | JOB TYPE | EXECUTION USERNAME | DOCUMENT NAME | PAGE No./ SET No. | STARTING DATE AND TIME ~ ENDING DATE AND TIME | MODE | SETTING VALUES |
|---|---|---|---|---|---|---|---|
| 025 | FAX | Yamada | document 03 | 002/ 001 | 2019/12/04 10:30:50 ~ 2019/12/04 10:32:50 | Normal | Fax/Image : Fax<br>Paper Size: A4<br>Original Orientation H4 :Landscape<br>Density: Auto<br>Image Quality: Normal Letter<br>Mass Original Mode :Yes<br>Thin Paper Reading :Yes<br>Thick Paper Reading :Yes<br>Mixed Originals :Yes<br>Program :No ~<br>Frame Erase :Yes<br>Page Segmentation :No<br>Page Aggregation :No<br>Card Scan :No |
| 024 | FAX | Tanaka | document 05 | 010/ 001 | 2019/12/04 10:15:30 ~ 2019/12/04 10:17:50 | Simple | Fax/Image :Fax<br>Paper Size: A4<br>Original Orientation: Landscape<br>Density :Auto<br>Image Quality :Normal Letter<br>Mass Original Mode :No<br>Thin Paper Reading :No<br>Thick Paper Reading :No<br>Mixed Originals :Yes<br>Program :No ~<br>Frame Erase :Yes<br>Page Segmentation :No<br>Page Aggregation :No<br>Card Scan :No |
| 023 | IMAGE TRANS-MISSION | Ikeda | document 02 | 001/ 001 | 2019/12/04 09:30:00 ~ 2019/12/04 09:31:10 | Normal | Color Mode : Auto/Auto Binary<br>Resolution : 200dpi x 200dpi<br>Format :PDF<br>Original :1-side -> 1-side<br>Density :Auto<br>Compression Method :MMR(G4)<br>Compression Ratio :High<br>Paper Feed Method :Auto<br>Program :No ~<br>Frame Erase :Yes<br>Page Segmentation :No<br>Background Removal :No<br>Card Scan :No<br>Mass Original Mode :No<br>Thin Paper Reading :No<br>Count Number of Originals :Yes |

FIG. 26A
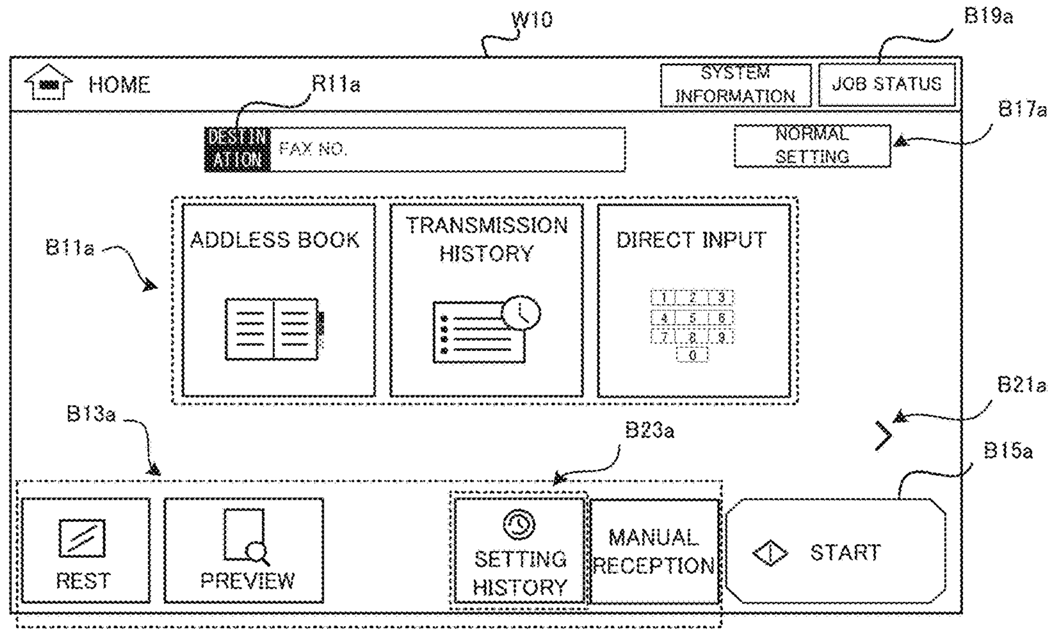
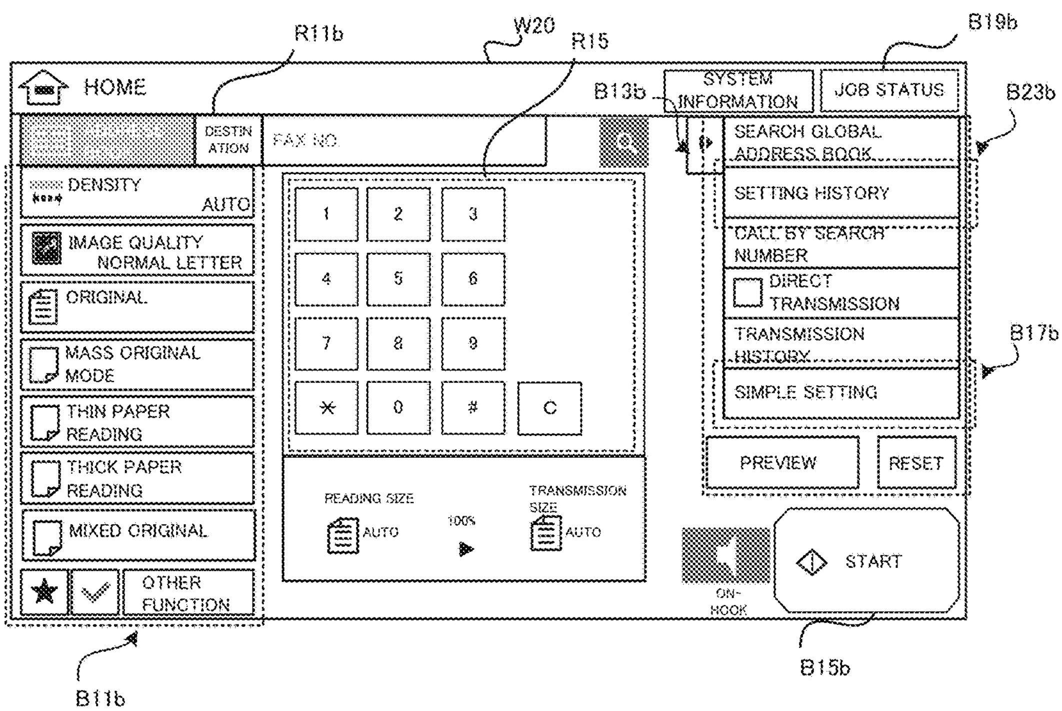
FIG. 26B

FIG. 27A
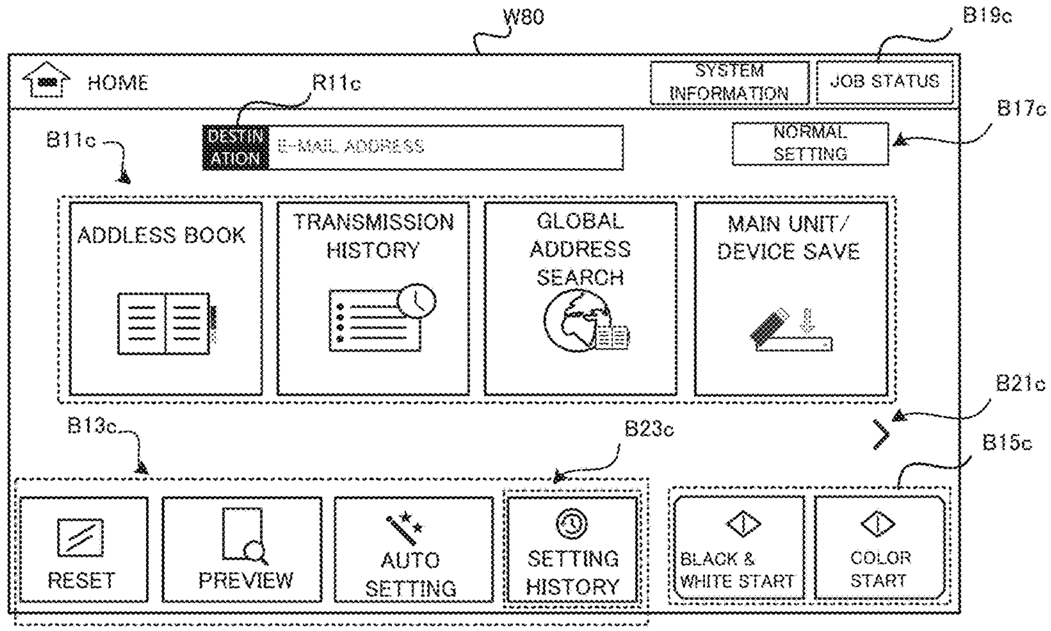
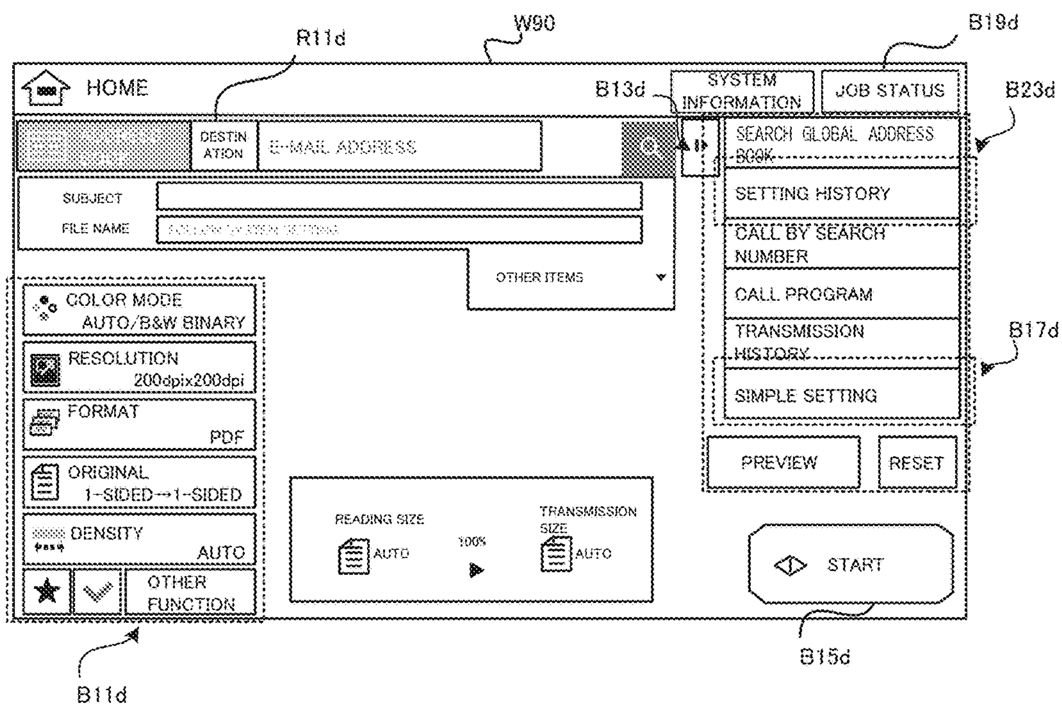
FIG. 27B

INFORMATION PROCESSING APPARATUS AND IMAGE COMMUNICATION APPARATUS

This Nonprovisional application claims priority under 35 U.S.C. § 119(a) on Patent Application No. 2021-76252 filed on Apr. 28, 2021 in Japan and Patent Application No. 2021-76253 filed on Apr. 28, 2021 in Japan, the contents of which are incorporated herein in its entirety by reference.

BACKGROUND OF THE INVENTION

Field of the Invention

The present invention relates to an information processing apparatus and the like.

Description of the Background Art

There is an information processing apparatus such as a multifunction machine that executes functions including as copying, faxing, scanning and e-mail transmission job by job.

Execution of a general job is implemented through a setting screen specialized for setting the functions of the job. In recent years, as information processing apparatuses have been developed into high functionality, screen operation through the setting screen is becoming more complex.

In order to enhance the convenience of information processing apparatuses, there is a known device that separately has a setting screen (simple setting screen) in which part of the contents to be displayed on the setting screen (normal setting screen) enabling setting of all items is omitted on purpose.

Since the settable items are limited on the simple setting screen, a user who does not require high-performance processing or who is not good at screen operations through the normal setting screen, can easily handle a job without performing unnecessary screen operations.

Incidentally, there have been proposals in which setting value designated through the setting screen upon execution of a job are stored so as to be readable as setting history information and so that the past setting history information can be reused (see, for example, Patent Document 1).

The image forming apparatus according to Patent Document 1 and others are configured so that the setting history information can be set through a setting screen and can be read from the setting screen.

PRIOR ART DOCUMENT

Patent Document

[Patent Document 1]

Japanese Patent Application Laid-open No. 2010-130245

Conventionally, for example, when the setting history information set and stored through the normal setting screen is read out through the simple setting screen, the simple setting screen changes to the normal setting screen. Therefore, it was not convenient for the user who usually executes their job through the simple setting screen.

An object of the present disclosure to provide a highly convenient information processing apparatus and the like, which makes it easy to execute a job based on setting history information through a setting screen desired by a user.

SUMMARY OF THE INVENTION

In order to solve the above problems, an information processing apparatus according to the present disclosure includes a display, a storage, and a controller, wherein the controller is configured to display either an execution screen for accepting an execution command of a job or a simple execution screen displaying contents simplified from contents displayed on the execution screen, on the display; the storage is configured to store history information related to the job instructed to be executed through either the execution screen or the simple execution screen; and the controller is configured to display the execution screen or the simple execution screen on the display, in accordance with the history information selected by a user.

An image communication apparatus according to the present disclosure includes: a communicator configured to communicate with another device in accordance with an operation mode; a history manager configured to manage the operation mode and a history of the communicator; and a controller configured to perform control for displaying the history, wherein that when a first operation mode related to a setting screen accepted a display command of the history and a second operation mode associated with a selected history are different, and when a job associated with the history can be executed in the first operation mode, the controller is configured to display a setting screen corresponding to the first operation mode.

Further, an image communication apparatus according to the present disclosure includes: a communicator configured to communicate with another device by using a first transmission method and a second transmission method different from the first transmission method; a history manager configured to manage a transmission method and a history of the communicator; and a controller configured to perform control for displaying the history, wherein when accepting a display command of the history, the controller is configured to: compare the number of destinations through the first transmission method recorded in the history and the number of destinations through the second transmission method, recorded in the history; and display a setting screen corresponding to a transmission method having a greater number of destinations.

According to the present disclosure, it is possible to provide a highly convenient information processing apparatus or the like which enables the user to easily execute the job based on setting history information through the setting screen desired by the user.

BRIEF DESCRIPTION OF THE DRAWINGS

FIG. 3 is a table for explaining setting history information.

FIG. 23 is a table for explaining setting history information.

FIGS. 26A and 26B are diagrams for explaining an operation example of the fifth embodiment.

FIGS. 27A and 27B are diagrams for explaining an operation example of the fifth embodiment.

DESCRIPTION OF THE PREFERRED EMBODIMENTS

In the following, embodiments of the present disclosure are described with reference to the drawings. In this disclosure, a multifunction machine that executes each function such as copying, faxing, scanning or e-mail transmission on a job-by-job basis are described as a form of an information processing apparatus. Note that, The following embodiments are mere examples for explaining the present disclosure, and the technical scope described in the claims is not limited to the following description.

1. First Embodiment

A first embodiment is given in a form of a multifunction machine that can perform a job through either a setting screen as an execution screen allowing all the settings for the execution of the job to be set (hereinafter referred to as normal setting screen) or a setting screen whose displayed contents are simplified from those of the normal setting screen (hereinafter referred to as simple setting screen). The job execution mode through the normal setting screen may be referred to as "normal mode", whereas the job execution mode through the simple setting screen may be referred to as "simple mode".

1.1 Functional Configuration

Figure 1:
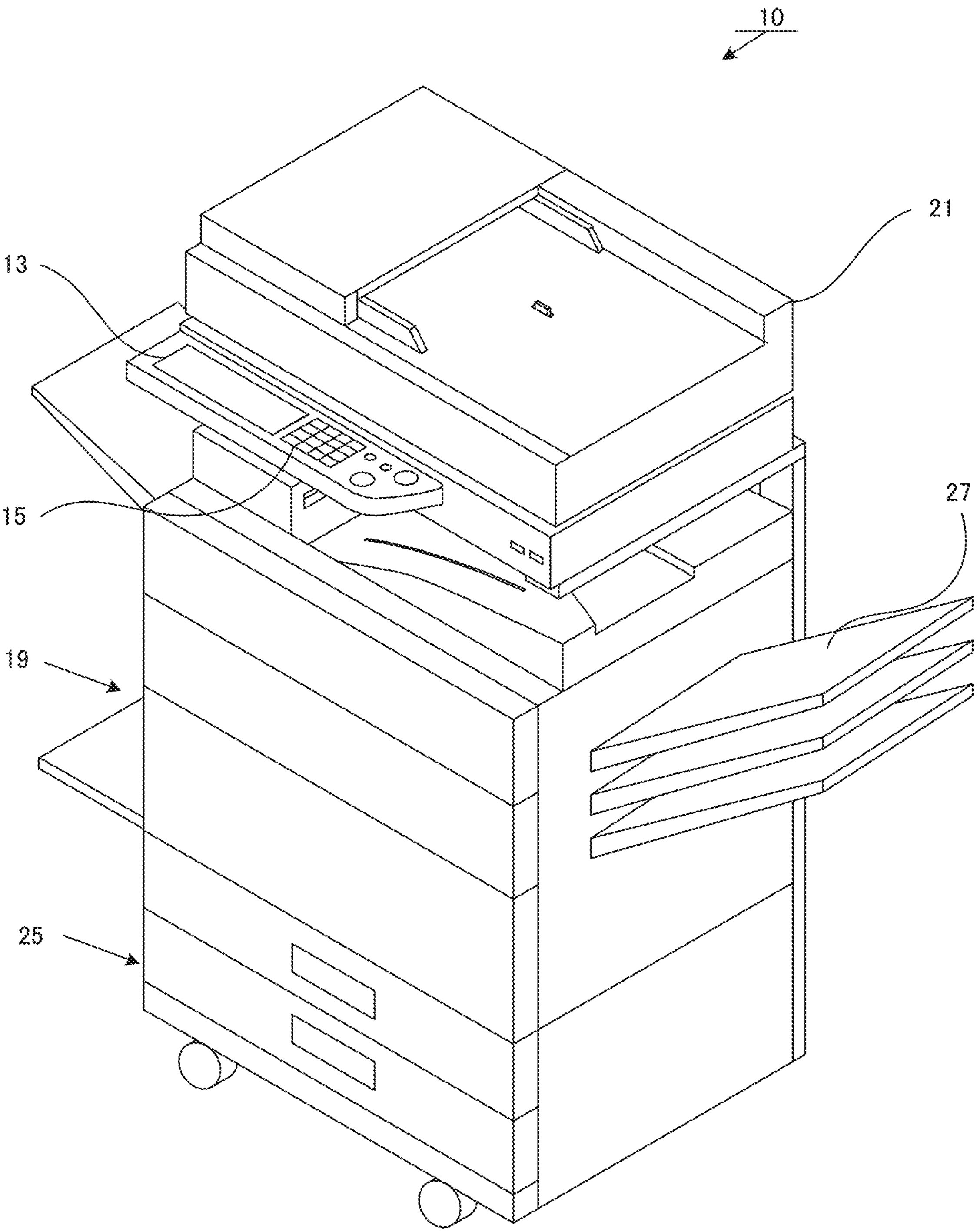
FIG. 1 is an external perspective view for explaining the overall configuration of a multifunction machine according to a first embodiment.
Figure 2:
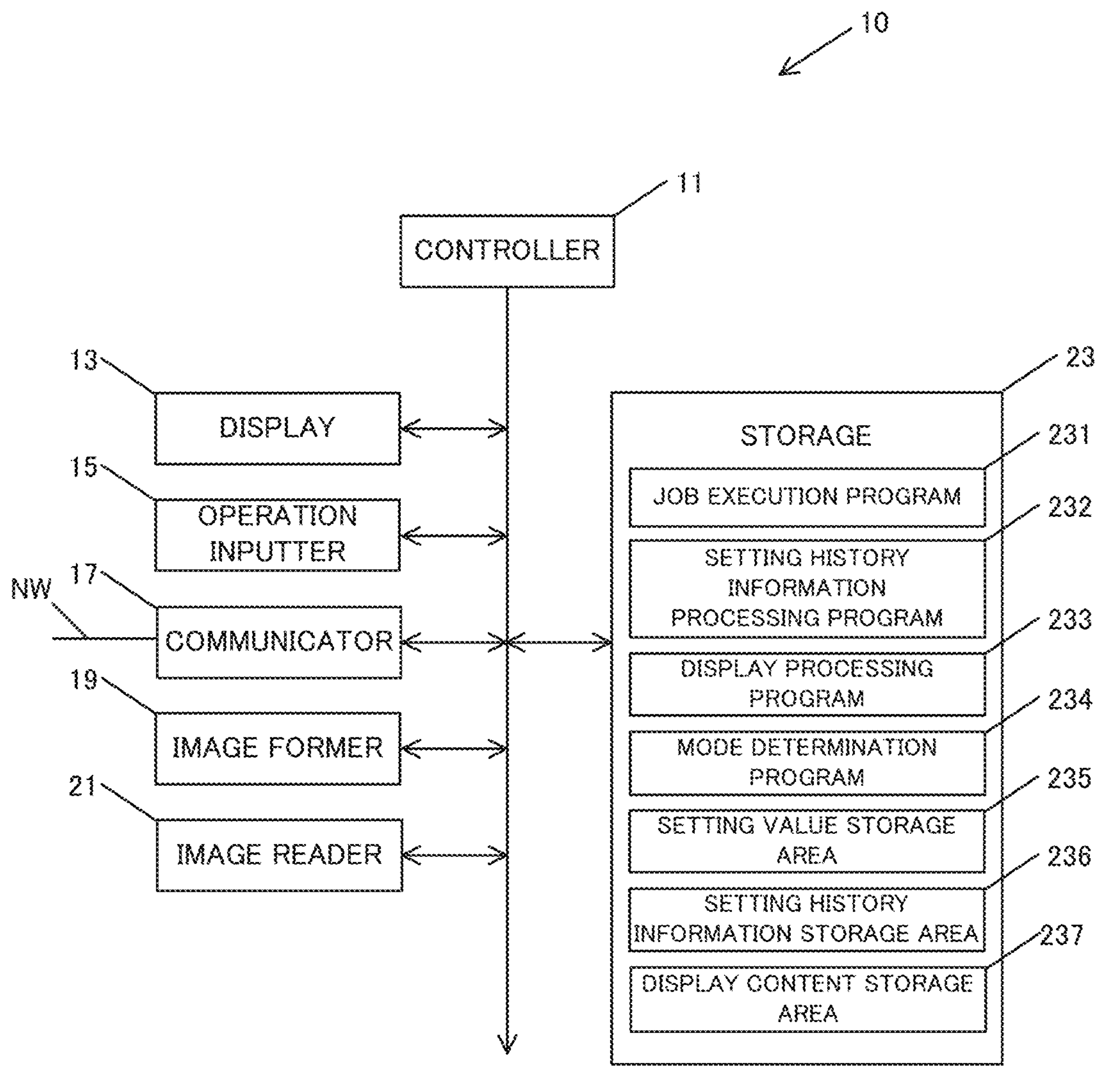
FIG. 2 is a diagram for explaining a functional configuration of the multifunction machine according to the first embodiment.

FIG. 1 is an external perspective view schematically illustrating the overall configuration of a multifunction machine 10 according to the first embodiment. FIG. 2 is a functional configuration diagram of the multifunction machine 10. The multifunction machine 10 includes a controller 11, a display 13, an operation inputter 15, a communicator 17, an image former 19, an image reader 21, and a storage 23.

The controller 11 controls the entirety of the multifunction machine 10. The controller 11 is configured of, for example, one or more arithmetic devices (such as a central processing unit (CPU)). The controller 11 reads and runs various programs stored in the storage 23 to realize their functions.

The display 13 displays various types of information to a user or others. The display 13 can be configured of, for example, a liquid crystal display (LCD), an organic electroluminescence (EL) display, or the like.

The operation inputter 15 accepts information input by the user or the like. The operation inputter 15 can be configured of hard keys (for example, a numeric keypad), buttons and the like. Note that, the operation inputter 15 can be configured as a touch panel allowing input through the display 13. In this case, as an input detection method of the touch panel, for example, a method such as a resistive film method, an infrared method, an electromagnetic induction method, and an electrostatic capacitance methods can be employed.

The communicator 17 includes either wired or wireless interface, or both for communication with other devices via a network (NW) such as a local area network (LAN), wide area network (WAN), the Internet, telephone line, and fax line.

The image former 19 forms an image based on image data on paper as a recording medium. The image former 19 feeds paper from a paper feeder 25, forms an image based on the image data on the paper, and then discharges the paper to a paper discharger 27. The image former 19 can be configured of, for example, a laser printer or the like using an electro-photographic method. The image former 19 forms an image with toners supplied from unillustrated toner cartridges associated with toner colors (e.g., cyan (C), magenta (M), yellow (Y), black (K)).

The image reader 21 generates image data by scanning and reading a document image to be read. The image reader 21 can be configured as a scanner device including an image sensor such as a charge coupled device (CCD) or a contact image sensor (CIS), for example. The image reader 21 may have any configuration as long as it picks up reflected light image from the document image by means of an image sensor to generate image data.

The storage 23 stores various programs and various data necessary to operate the multifunction machine 10. The storage 23 can be configured of storage devices such as, for example, a random access memory (RAM), a hard disk drive (HDD), a solid state drive (SSD), and read-only memories (ROM).

In the first embodiment, the storage 23 stores a job execution program 231 and a setting history information processing program 232, a display processing program 233, and a mode determination program 234, and secures a setting value storage area 235, a setting history information storage area 236 and a display content storage area 237.

The job execution program 231 is a program read out by the controller 11 in order to perform processing accompanying execution of each function such as copying, faxing, scanning, or e-mail transmission, on a job-by-job basis. The controller 11 that has read the job execution program 231, controls each of the units involved in job execution, such as the display 13, the operation inputter 15, the communicator 17, the image former 19, and the image reader 21 and the like to achieve the job. Further, the controller 11 that has read out the job execution program 231 executes each job based on the setting value included in the setting history information described later.

The setting history information processing program 232 is, for example, a program read out by the controller 11 when acquiring setting values and the like for job execution, generating setting history information, and performing various processing on the setting history information. The controller 11 that has read out the setting history information processing program 232 acquires the setting values for job execution and stores them in the setting value storage area 235. Further, the controller 11 generates setting history information based on the acquired setting values and stores it in the setting history information storage area 236.

The display processing program 233 is a program read out by the controller 11 when displaying a display screen for displaying setting history information, setting a screen such as the normal setting screen for accepting input of various setting values for job execution and the simple setting screen, or the home screen for receiving instructions as to switching between job functions. The controller 11 that has read out the display processing program 233 configures each screen based on the unillustrated frame information stored in the display content storage area 237, the content arrangement information, and the like, to display the screen on the display 13.

The mode determination program 234, upon execution of a job, checks whether the setting history information selected through the displayed setting screen is related to the job that was executed in the normal mode (normal setting screen), or the job that was executed in the simple mode (simple setting screen), and determines the mode of the job to be executed.

The controller 11 that has read the mode determination program 234, for example:

(1) determines that the mode of the job to be executed is "simple mode" when the setting screen being displayed is a simple setting screen, and the setting history information selected through the simple setting screen is that related to a job that was executed through a simple setting screen;

(2) determines that the mode of the job to be executed is "simple mode" when the setting screen being displayed is a simple setting screen, the setting history information selected through the simple setting screen is that related to a job that was executed through a normal setting screen, and the job to be executed is executable in the simple mode;

(3) determines that the mode of the job to be executed is "simple mode" when the setting screen being displayed is a normal setting screen, and the setting history information selected through the normal setting screen is that related to a job that was executed through a simple setting screen; and, (4) determines that the mode of the job to be executed is "simple mode" when the setting screen being displayed is a normal setting screen, the setting history information selected through the normal setting screen is that related to a job that was executed through a normal setting screen, and the job to be executed is executable in the simple mode.

Note that, in the above (2) or (4), when setting history information in which a function (for example, character/image composition functionality, special printing functionality, or the like.) that is not in the simple mode is set is selected by the user, the controller 11 may determine that the mode of the job to be executed is "normal mode".

The setting value storage area 235 is a storage area for storing the setting values for job execution. The setting values, for example, include the setting values designated by the user such as color mode, paper/original sizes, paper type, number of copies, zoom function (magnification), paper selection (tray), duplex copying, etc., and the setting values the device itself holds as the initial values.

The setting history information storage area 236 is a storage area for storing the setting history information in a data table format. The setting history information according to the present disclosure can be configured as history information allotted with an identifier, ID or the like that uniquely identifies the combination of the information on the job execution history such as job type, execution username, execution date and time, mode, and a part or all of the setting values stored in the setting value storage area 235. The setting history information stored in the setting history information storage area 236 is called as appropriate upon execution, mode determination, and the like of a job, based on the setting history information.

FIG. 3 is a diagram for explaining a configuration example of setting history information. For example, the setting history information of a job ID "025" contains as information on execution history, "JOB TYPE": COPY, "EXECUTION USERNAME": Yamada, "DOCUMENT NAME": Document03, "PAGE NUMBER/SET NUMBER": 002/001, "STARTING DATE AND TIME/ENDING DATE AND TIME": 2019/12/04 10:30:50-2019/12/04 10:32:50, "MODE": Normal (normal mode). In addition, the setting history information contains as setting values, "Color Mode": Full Color, "Paper Size/Original Size": A4, "Paper Type": Plain Paper, . . . , "Sort/Group": Automatic, etc. It should be noted that the settings in FIG. 3 are merely examples, and the setting values in this disclosure are not limited to the items displayed in FIG. 3.

The display content storage area 237 is a storage area for unillustrated storing frame information used for displaying the display screen, the setting screen, the home screen, and the like, content arrangement information, and others. The controller 11 that has read out the display processing program 233 configures each screen based on the unillustrated frame information, content arrangement information and the like, stored in the display content storage area 237, to display the screen on the display 13.

1.2 Flow of Processing

Next, a flow of processing according to the first embodiment is described. Referring first to the flowchart in FIG. 4, as the whole processing of the multifunction machine 10, the process related to generation and storing of setting history information based on an executed job is described. Note that, the following explanation will be given on the assumption that a copying job is performed by the multifunction machine 10 as one job form. However, other than copying jobs, this process can be also applied to fax jobs, scanning jobs, e-mail transmission, and the like.

The controller 11 accepts input of an execution command of a copying job through the normal setting screen for normal mode or the simple setting screen for simple mode (step S10).

The controller 11 reads out the job execution program 231. The controller 11 executes the copy job by controlling each unit such as the image former 19 based on the setting values inputted through the normal setting screen or the simple setting screen (step S20).

After execution of the copy job, the controller 11 reads out the setting history information processing program 232. The controller 11 acquires the setting values for the execution of the copy job. Then, the controller 11 generates setting history information based on the acquired setting values and stores it in the setting history information storage area 236. At this step, the controller 11 adds mode information (see FIG. 3) indicating that the copy job is executed in the normal mode or in the simple mode to stores the generated setting history information and save it (step S30).

Referring next to a flowchart in FIG. 5, description will be made on a process relating to the execution of a new copy job when the setting history information stored in the setting history information storage area 236 is used.

When executing a copying job, the user selects whether to execute the copy job in the normal mode through the normal setting screen or in the simple mode through the simple setting screen. In this case, the user can select either the normal mode or the simple mode, for example, through the home screen described later.

When the normal mode or the simple mode is selected by the user, the controller 11 accepts input of the selected mode (step S40).

By reading out the display processing program 233, the controller 11 displays a setting screen (normal setting screen or simple setting screen) based on the received mode, on the display 13 (step S50).

After displaying the setting screen, the controller 11 determines whether or not the execution of the job will use the stored setting history information (step S60). In this case, the controller 11 may also determine that the stored setting history information will be used, based on the input of a display command of the setting history information.

When it is determined that the setting history information will be used, the controller 11 displays the stored setting history information (step S60; Yes→step S70).

Next, the controller 11 accepts the user's selection of setting history information (step S80). Then, the controller 11 displays a setting screen to which the setting values of the setting history information selected by the user is applied, on the display 13 (step S90).

When the controller 11 receives an execution command of a new job through the setting screen displayed on the display unit 13, the controller 11 executes the job based on the setting history information (step S100).

When it is determined that no setting history information will be used (step S60; No), the controller 11, as it receives an execution command of a new job through the setting screen displayed on the display 13 at step S50, executes the job (step S100).

Figure 4:
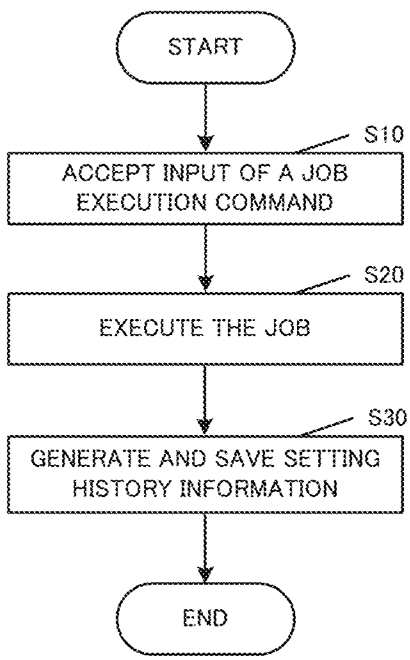
FIG. 4 is a flowchart for explaining processing flows according to first and fifth embodiments.

Additionally, the setting values for the job executed at step S100 can be taken and stored as setting history information, by the same procedures as in step S30 of FIG. 4.

Figure 5:
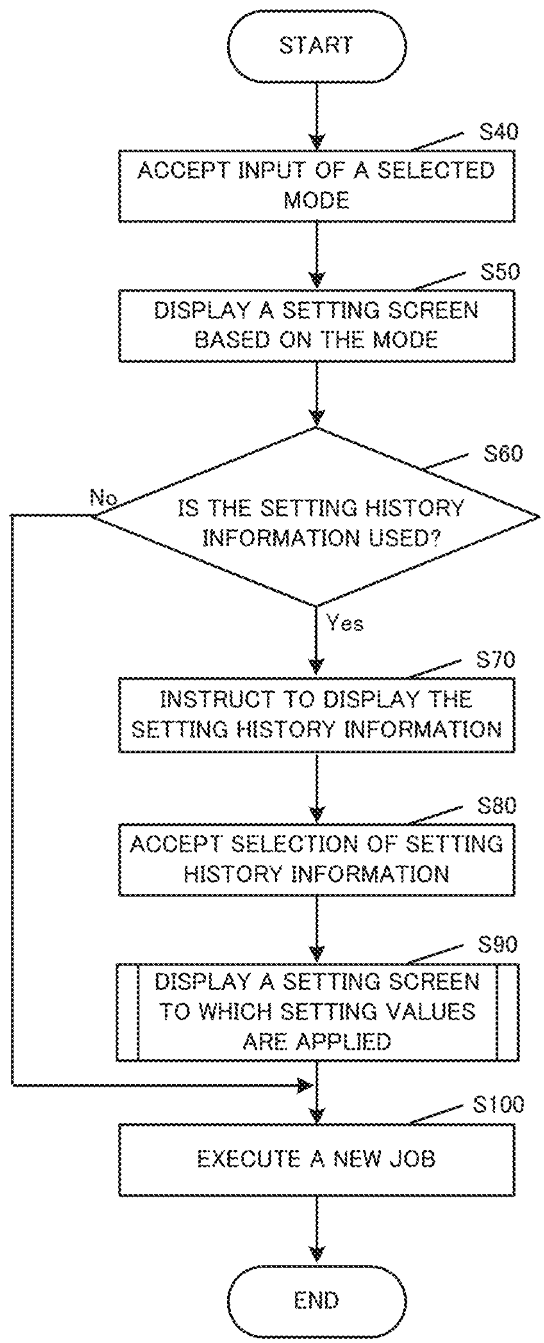
FIG. 5 is a flowchart for explaining a processing flow according to the first embodiment.
Figure 6:
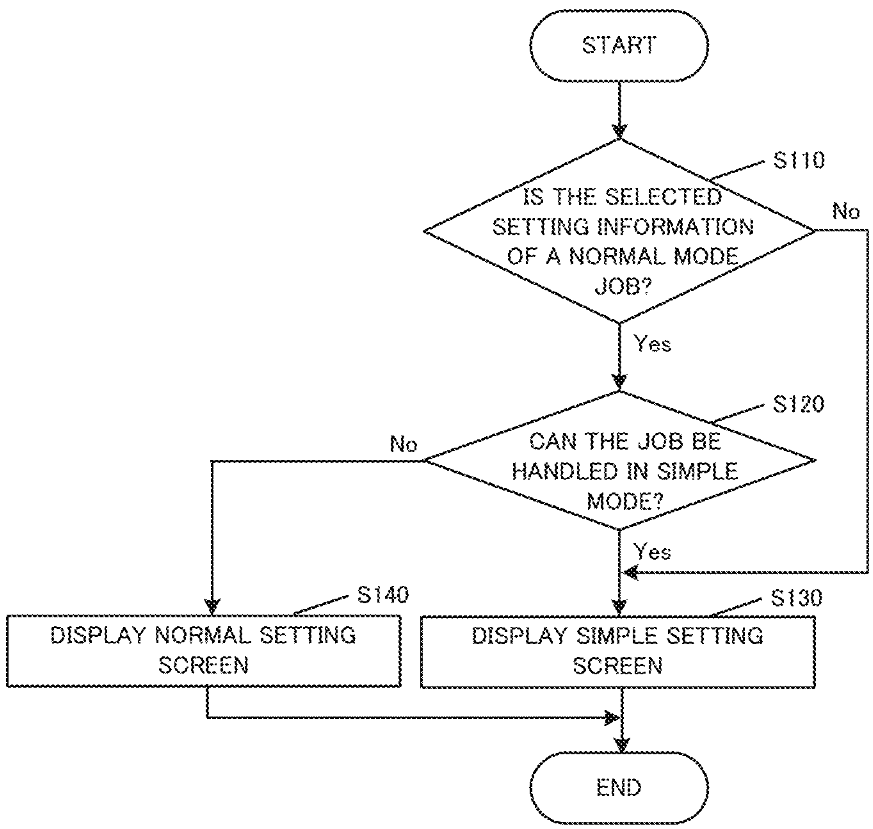
FIG. 6 is a flowchart for explaining a processing flow according to the first embodiment.

Referring next to the flowchart in FIG. 6, the process at step S90 in FIG. 5 is described.

The controller 11 reads out the mode determination program 234 and determines whether or not the setting history information received at step S80 of FIG. 5 is that of a copying job that was executed in the normal mode (step S110).

When determining that the selected setting history information is that of a copying job that was executed in the normal mode, the controller 11 determines whether or not the copy job related to this setting history information can be handled in the simple mode (step S110; Yes→step S120).

When determining that the copy job related to the setting history information can be handled in the simple mode, the controller 11 displays a simple setting screen to which the setting values of the setting history information are applied, on the display 13 (step S120; Yes→step S130).

On the other hand, when determining that the selected setting history information is not that related to the copy job that was executed in the normal mode, the controller 11 displays a simple setting screen to which the setting values of the setting history information are applied, on the display 13 and ends the process (step S110; No→step S130).

On the other hand, when it is determined that the copy job related to the setting history information cannot be handled in the simple mode, the controller 11 displays a normal setting screen to which the setting values of the setting history information are applied, on the display 13 and ends the process (step S120; No→step S140).

1.3 Operation Example

Figure 7:
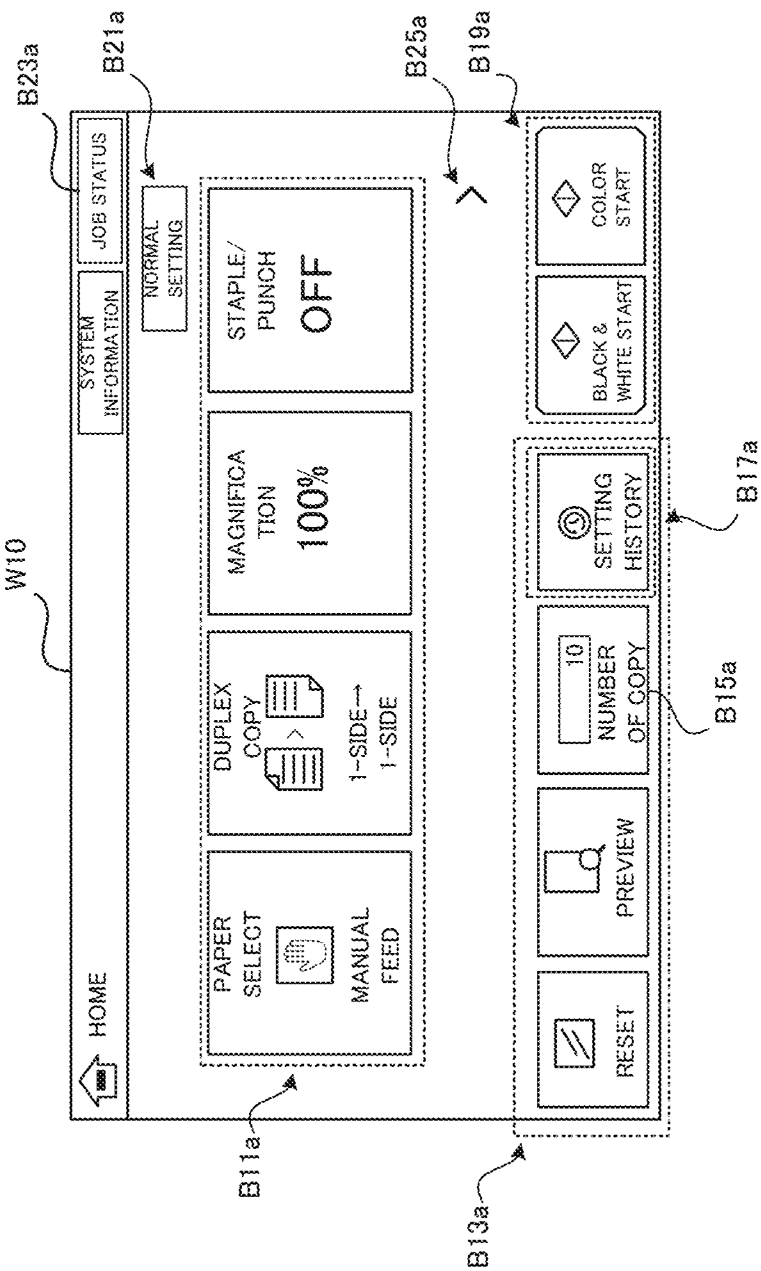
FIG. 7 is a diagram for explaining an operation example of the first embodiment.

Next, an operation example of the first embodiment is described. The operation inputter 15 of a touch panel type provided on the screen of the display 13, detects a user's pressing on each button area sectioned on the screen, enabling each input by the user. FIG. 7 is a configuration example of a simple setting screen W10 for a copying job. The simple setting screen W10 can be displayed, for example, through the mode selection process performed by user through the home screen described later at step S40 of FIG. 5, or through the normal setting screen described with the next figure.

The simple setting screen W10 has such a simple screen configuration that the items of settings that can be set by the user is limited in number as compared with the normal setting screen described with the following figure. The simple setting screen W10 includes setting value buttons B11*a*, operation control buttons B13*a*, start buttons B19*a*, a normal setting button B21*a*, a job status notification button B23*a*, and a display switching button B25*a*.

The setting value buttons B11*a* accepts selection/input of setting values that can be set by the user through the simple setting screen W10. For example, the user presses the paper selection button and selects a desired setting values from items such as "MANUAL FEED", "Tray 1, 2, 3 . . . ", and unillustrated "Automatic Selection" for paper selection, thus making it possible to set the setting values for paper selection. FIG. 7 shows an example of displaying four configurable setting value items: "PAPER SELECT", "DUPLEX COPY", "MAGNIFICATION", and "STAPLE/PUNCH". Other setting value items can be displayed by pressing the display switching button B25*a*. Herein, the setting values displayed on the top of each button of the setting buttons B11*a* reflects the setting values of the applied setting history information (FIG. 7 is an example in which the setting values of the setting history information of the job ID "024" in FIG. 3 are applied). The configuration of the setting buttons B11*a* illustrated in FIG. 7 is merely an example and should not be limited to the items shown in FIG. 7.

The operation control buttons B13*a* include, for example, a reset button, a preview button, a number-of-copies button B15*a*, a setting history display button B17*a*, and the like. For example, the reset button accepts reset of the setting values selected/input through the setting buttons B11*a*, the number-of-copies button B15*a*, and the like. The preview button accepts a display command of a preview image ahead of execution of a copying job. The number-of-copies button B15*a* accepts the input of the number of copies. The setting history display button B17*a* accepts a display command of the setting history display screen described later.

The start buttons B19*a* include black-and-white start button and a color start button. When black and white copying is desired, the user presses the black-and-white start button. On the other hand, when color copying is desired, the user presses the color start button. When either the black-and-white start button or the color start button is pressed by the user, the process for the copy job is executed.

The normal setting button B21*a* accepts a command to switch to a normal setting screen described with the following drawing.

The job status notification button B23*a* accepts a notification command of the job execution status.

Figure 8:
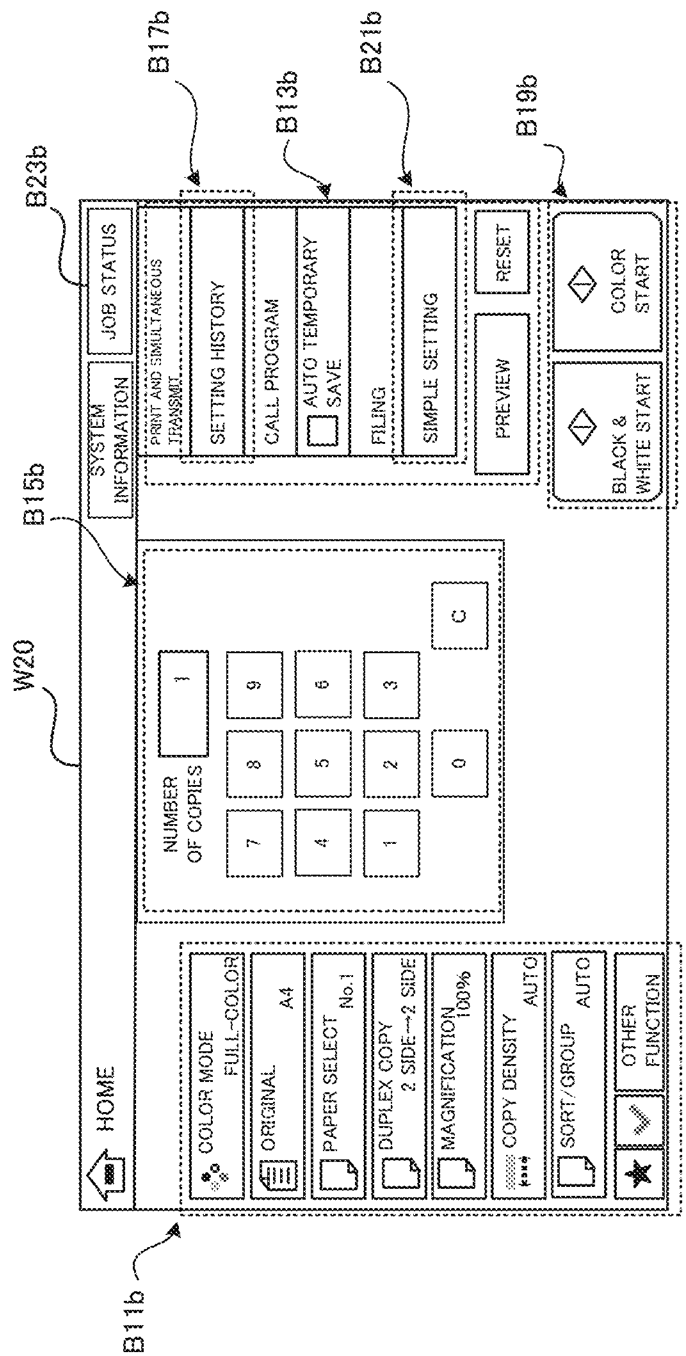
FIG. 8 is a diagram for explaining an operation example of the first embodiment.

FIG. 8 is a configuration example of a normal setting screen W20 for a copying job. The normal setting screen W20, for example, can be displayed through the mode selection process by the user at step S40 of FIG. 5 or through the simple setting screen W10.

The normal setting screen W20 has a screen configuration that allows all settings related to execution of a copying job. The normal setting screen W20 includes setting value buttons B11*b*, operation control buttons B13*b*, and a number-of-copies button B15*b*, start buttons B19*b*, a simple setting button B21*b*, and a job status notification button B23*b*.

The setting value buttons B11*b* accept selection/input of setting values that can be set by the user among the setting values contained in the setting history information. For example, when pressing the color mode button, the user can select a desired setting values from the items for color mode selection such as "Full Color", "Black & White", "Monochromatic Color", and "Automatic (Color/Black & White)" to thereby configure the setting values for color mode. FIG. 8 shows an example in which seven setting value items that can be set: "COLOR MODE", "ORIGINAL", "PAPER SELECT", "DUPLEX COPY", "MAGNIFICATION", "COPY DENSITY", and "SORT/GROUP" are provided. Herein, the setting values displayed on the top of each of the setting value buttons B11*b* reflects the setting values of the applied setting history information (FIG. 8 is an example in which the setting values of the setting history information of the job ID "025" in FIG. 3 are applied). The configuration of the setting value buttons B11*b* illustrated in FIG. 8 is merely an example and should not be limited to the items shown in FIG. 8.

The setting value buttons B11*b* include an "Other Functions" button in addition to the above setting value items. By pressing the "Other Functions" button, the user can call other setting value items other than the setting value items being displayed and can select/input the setting values.

The operation control buttons B13*b*, in addition to a preview button and a reset button, include extended functionality buttons such as a "PRINT AND SIMULTANEOUS TRANSMIT" button, a "CALL PROGRAM" button, and a "FILING" button. For example, by pressing the "SIMULTANEOUS PRINT AND SEND" button, an image scanned as a copying job is executed, can be printed and sent to a specified destination (for example, e-mail transmission, fax transmission, etc.) at the same time.

The operation control buttons B13*b* further include a setting history display button B17*b* and a simple setting button B21*b*. The setting history display button B17*b* accepts a display command of the setting history display screen, which will be described later. The simple setting button B21*b* accepts a command to switch to the simple setting screen W10.

The number-of-copies button B15*b* is pressed when the number of copies is set.

The start buttons B19*b* include a black-and-white start button and a color start button. When black and white copying is desired, the user presses the black-and-white start button. On the other hand, when color copying is desired, the user presses the color start button. When either the black-and-white start button or the color start button is pressed by the user, the process related to the copy job is executed.

The job status notification button B23*b* accepts a notification command of the job execution status.

Figure 9:
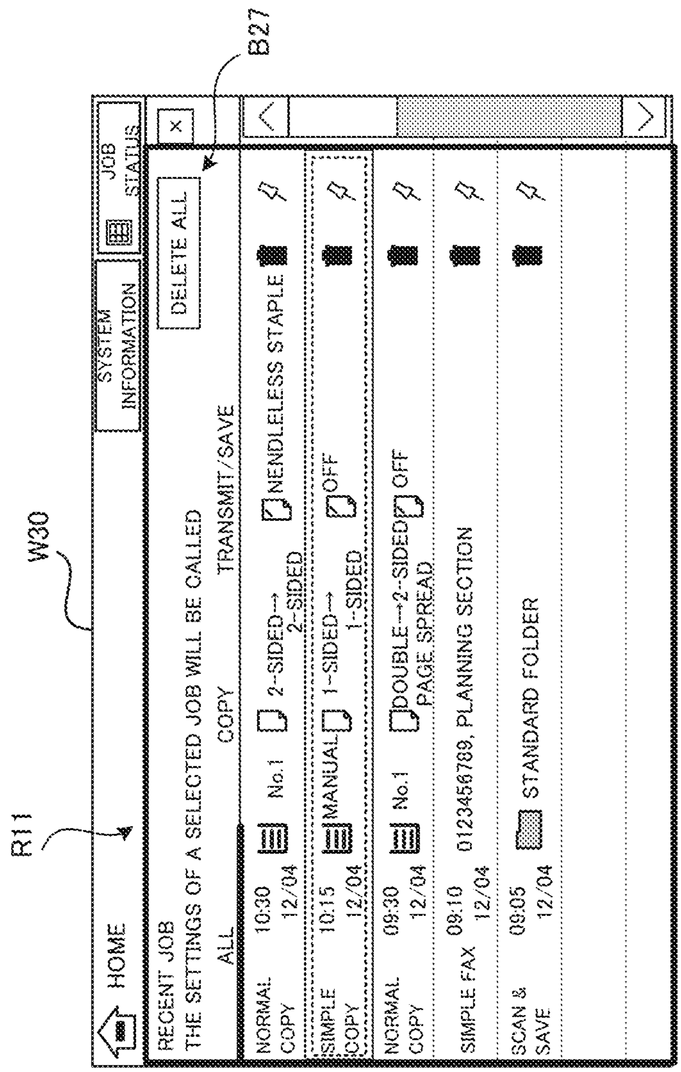
FIG. 9 is a diagram for explaining an operation example of the first embodiment.

FIG. 9 is a configuration of the setting history display screen W30. For example, the setting history display screen W30 can be displayed anytime by pressing the setting history display button B17*a* on the simple setting screen W10 shown in FIG. 7, the setting history display button B17*b* on the normal setting screen W20 shown in FIG. 8, or a setting history display button on the home screen described later.

The setting history display screen W30 includes a setting history display area R11 and a delete-all button B27. The history display area R11 is configured so that, for example, pieces of setting history information related to jobs can be displayed in time-sequential order. The display method of the setting history information is not particularly limited, but may adopt, for example: a display format in which the setting history information for all jobs is displayed as shown in the example in FIG. 9; a display format in which pieces of setting history information related to a certain specific job are displayed; when the multifunction machine 10 has a user authentication function, a display format in which only pieces of setting history information related to logged-in user's jobs are displayed; a display format in which only pieces of setting history information having identical settings are displayed; a format in which only pieces of setting history information for the jobs executed within a specific period are displayed; a display formant in which only pieces of setting history information related to a specific job execution user are displayed; and the like.

FIG. 9 is an example in which pieces of setting history information related to the five jobs of normal copying, simple copying, normal copying, simple faxing, and scanning and saving are displayed in time-sequential order from top to bottom. The three pieces of setting history information from the top in FIG. 9 correspond to the setting history information on the job IDs "025" to "023" shown in FIG. 3.

Here, in each display section (a section related to copy jobs) in the setting history display area R11, the job type in a specific mode (for example, a copying job in the normal mode: normal copy) and the start date and time of the job, part of the setting values are displayed. FIG. 9 shows an example in which three setting items, "PAPER SELECT", "DUPLEX COPY", and "STAPLE/PUNCH" are given as the setting value items to be displayed, but the setting value items to be displayed can be selected as appropriate.

In addition, each piece of setting history information displayed in the setting history display area R11 is configured so that the user can select it. By selecting a desired piece of setting history information, the user can easily execute a job based on the setting history information or a job similar thereto. For example, when the setting history information (corresponding to job ID "024") for simple copying, surrounded by the dotted line frame in the drawing is selected, the screen transitions to the simple setting screen W10 shown in FIG. 7. In this case, the selected piece of setting history information may be darkened so that the selected piece of setting history information can be easily grasped.

The delete-all button B27 accepts a command to delete the setting history information from the setting history display area R11. When the delete-all button B27 is pressed by the user, the controller 11 stops displaying the setting history information in the setting history display area R11.

Figure 10:
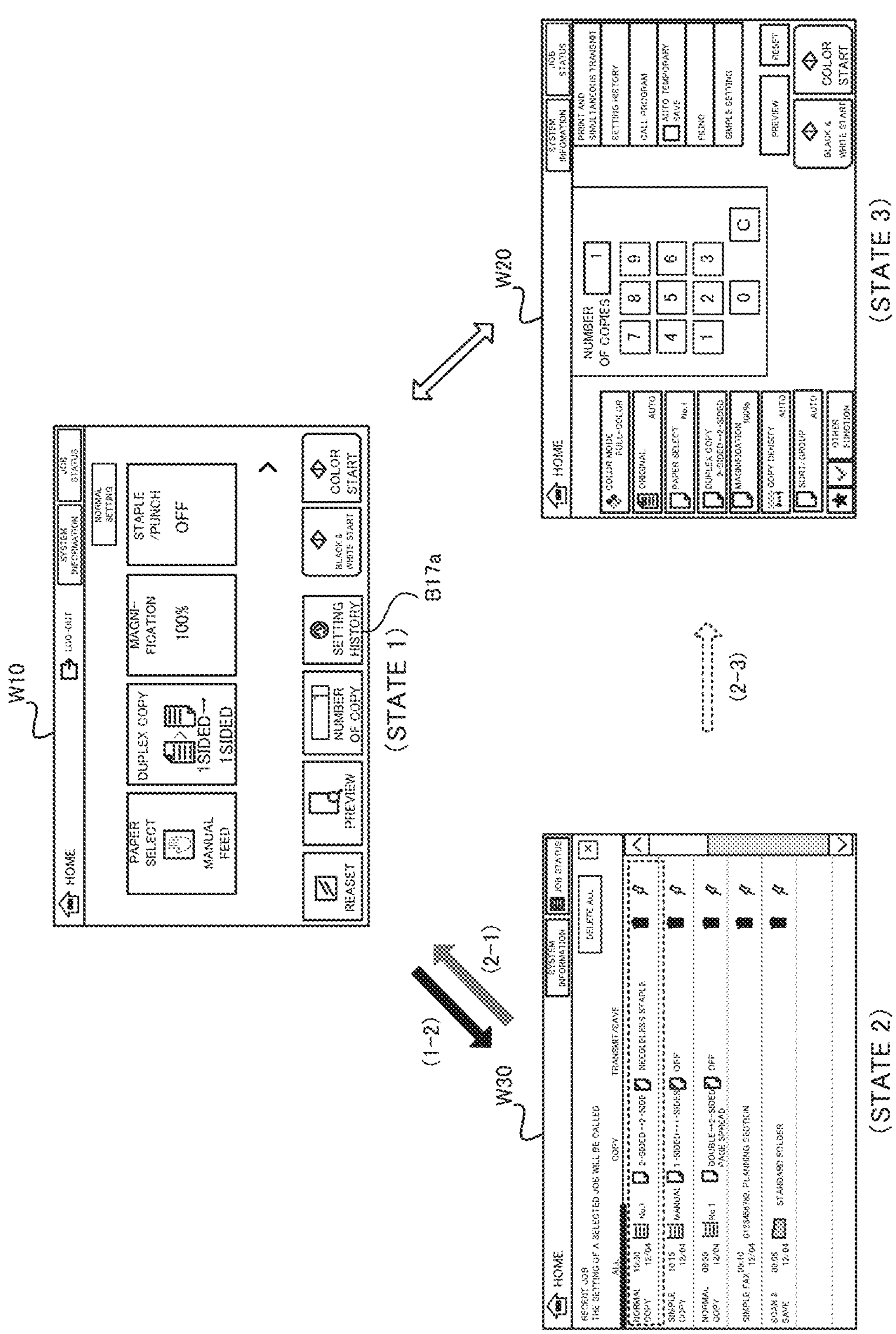
FIG. 10 is a diagram for explaining an operation example of the first embodiment.

FIG. 10 shows an operation example relating to a case where in the simple mode selected by the user at step S40 of FIG. 5, a job is executed in the normal mode (the normal setting screen W20), using the setting history information selected through the simple setting screen W10.

Note that, this operation example corresponds to the processing described in the flowcharts of FIGS. 5 and 6. Description herein will be made by referring the states where the controller 11 displays the simple setting screen W10 as "state 1", the setting history display screen W30 as "state 2", and the normal setting screen W20 as "state 3".

When the setting history display button B17*a* is pressed from the state 1 where the simple setting screen W10 is displayed, the controller 11 transits the display screen to the setting history display screen W30 (arrow 1-2 in the drawing, state 2)).

When a piece of setting history information related to a copying job is selected by the user in the state 2, the controller 11 determines whether or not the selected setting history information is of a copying job that was executed in the normal mode (corresponding to the process at step S110 in FIG. 6). In this case, the controller 11, referring to the "mode" of the selected setting history information, can determine whether or not the setting history information is of a copying job that was executed in the normal mode.

When determining that the setting history information selected by the user is of a copying job that was executed in the normal mode, the controller 11 further determines whether or not the copy job can be handled in the simple mode (corresponding to the process of step S110; Yes→step S120 in FIG. 6). In this case, the controller 11 refers to the setting values of the setting history information and checks the setting values that the user cannot change through the simple setting screen W10 (for example, the character/image composition function and the special printing function, etc.). The controller 11 can determine that the simple mode can be used when any of these setting values has not been changed.

When it is determined that the copy job can be handled in the simple mode, the controller 11 transits the display screen from the setting history display screen W30 to the simple setting screen W10 (arrow 2-1 in the drawing, state 2→state 1). Additionally, even when the controller 11 determines that the setting history information selected by the user is of a copying job that was executed in the simple mode, the controller 11 transits the display screen from the setting history display screen W30 to the simple setting screen W10 (arrow 2-1 in the drawing, state 2→state 1).

With the transition of the display screen from the state 2 to the state 1, the controller 11 displays the setting values of the setting history information selected by the user, being applied to the simple setting screen W10, on the display unit 13.

On the other hand, when setting values that cannot be changed by the user through the simple setting screen W10 has been modified, the controller 11 determines that the simple mode cannot be used. Then, the controller 11 transits the display screen from the setting history display screen W30 to the normal setting screen W20 (arrow 2-3 in the drawing, state 2→state 3).

With the transition of the display screen from the state 2 to the state 3, the controller 11 displays the setting values of the setting history information selected by the user, being applied to the normal setting screen W20, on the display unit 13.

Note that, as illustrated in FIG. 10, the simple setting screen W10 and the normal setting screen W20 have respective switching command buttons (normal setting button B21*a* and simple setting button B21*b*) provided thereon, which allow switching between the screens as appropriate when these buttons are pressed. Accordingly, for example, when the user wants to modify setting values that cannot be changed in the simple mode, the user can switch the display screen (mode) from the simple setting screen W10 to the normal setting screen W20, thereby being able to execute a copying job easily and flexibly.

Figure 11:
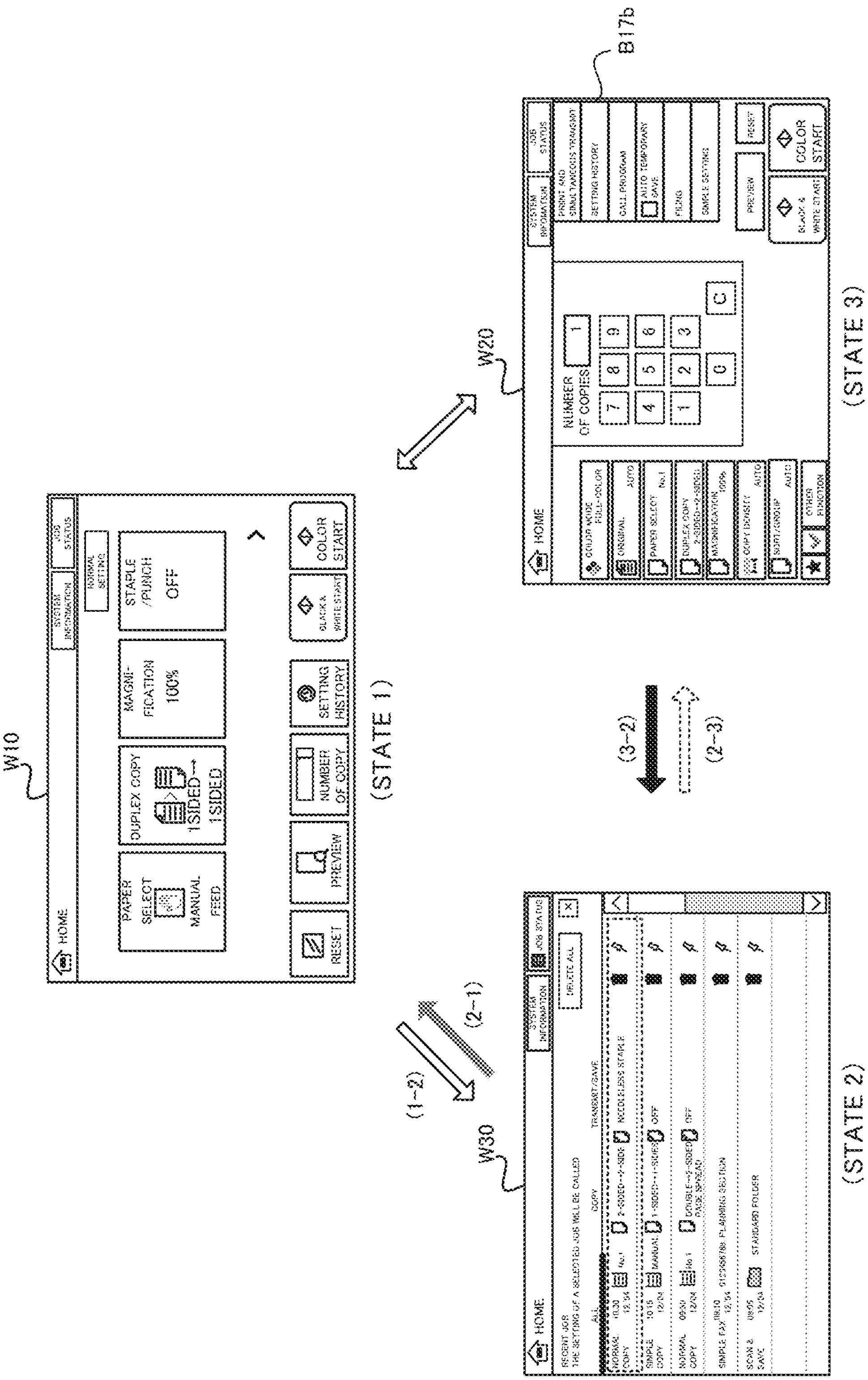
FIG. 11 is a diagram for explaining an operation example of the first embodiment.

FIG. 11 shows an operation example relating to a case where in the normal mode selected by the user at step S40 of FIG. 5, a job is executed in the normal mode (the normal setting screen W20), using the setting history information selected through the normal setting screen W20.

When the setting history display button B17*b* is pressed from the state 3 where the normal setting screen W20 is displayed, the controller 11 transits the display screen to the setting history display screen W30 (arrow 3-2 in the drawing, state 2).

When a piece of setting history information related to a copying job is selected by the user in the state 2, the controller 11 determines whether or not the selected setting history information is of a copying job that was executed in the normal mode (corresponding to the process at step S110 in FIG. 6). In this case, the controller 11, referring to the "mode" of the selected setting history information, can determine whether or not the setting history information is of a copying job that was executed in the normal mode.

When determining that the setting history information selected by the user is of a copying job that was executed in the normal mode, the controller 11 further determines whether or not the copy job can be handled in the simple mode (corresponding to the process of step S120; Yes→step S130 in FIG. 6). In this case, the controller 11 refers to the setting values of the setting history information and checks the setting values that the user cannot change through the simple setting screen W10 (for example, the character/image composition function and the special printing function, etc.). The controller 11 can determine that the simple mode can be used when any of these settings has not been changed. Then, the controller 11 transits the display screen from the setting history display screen W30 to the simple setting screen W10 (arrow 2-1 in the drawing, state 2→state 1). Note that, when the control unit 11 determines that the setting history information selected by the user is of a copying job that was executed in the simple mode, the controller 11 transits the display screen from the setting history display screen W30 to the simple setting screen W10 (arrow 2-1 in the drawing, state 2→state 1).

With the transition of the display screen from the state 2 to the state 1, the controller 11 displays the setting values of the setting history information selected by the user, being applied to the simple setting screen W10, on the display unit 13.

When setting values that cannot be changed by the user through the simple setting screen W10 has been modified, the controller 11 determines that the simple mode cannot be used. Then, the controller 11 transits the display screen from the setting history display screen W30 to the normal setting screen W20 (arrow 2-3 in the drawing, state 2→state 3).

With the transition of the display screen from the state 2 to the state 3, the controller 11 displays the setting values of the setting history information selected by the user, being applied to the normal setting screen W20, on the display unit 13.

Note that, as illustrated in FIG. 11, the normal setting screen W20 and the simple setting screen W10 have respective switching command buttons (normal setting button B21*a* and simple setting button B21*b*) provided thereon, which allow switching between the screens as appropriate when these buttons are pressed. Accordingly, for example, when the user wants to modify setting values that cannot be changed in the simple mode, the user can switch the display screen (mode) from the simple setting screen W10 (state 1) to the normal setting screen W20 (state 3) so as to execute a copying job easily and flexibly.

As described above, according to the first embodiment, in response to the execution mode of the setting history information that is selected through the setting screen being displayed (selected), a setting screen for the execution of a job based on the setting history information is selected. Accordingly, it is possible to provide a highly convenient information processing device which enables the user to easily execute a job based on setting history information through a setting screen desired thereby.

2. Second Embodiment

A second embodiment is a configuration in which, upon selection of setting history information on the home screen, either the execution of a job in the normal mode through the normal setting screen or the execution of a job in the simple mode through the simple setting screen can be selected.

The functional configuration of a multifunction machine according to the second embodiment can be the same as the functional configuration of the multifunction machine 10 according to the first embodiment. Therefore, the description of the functional configuration of the multifunction machine according to the second embodiment is omitted, and the description will be given using the same reference numerals as those of the multifunction machine 10 in the first embodiment.

2.1 Flow of Processing

Figure 12:
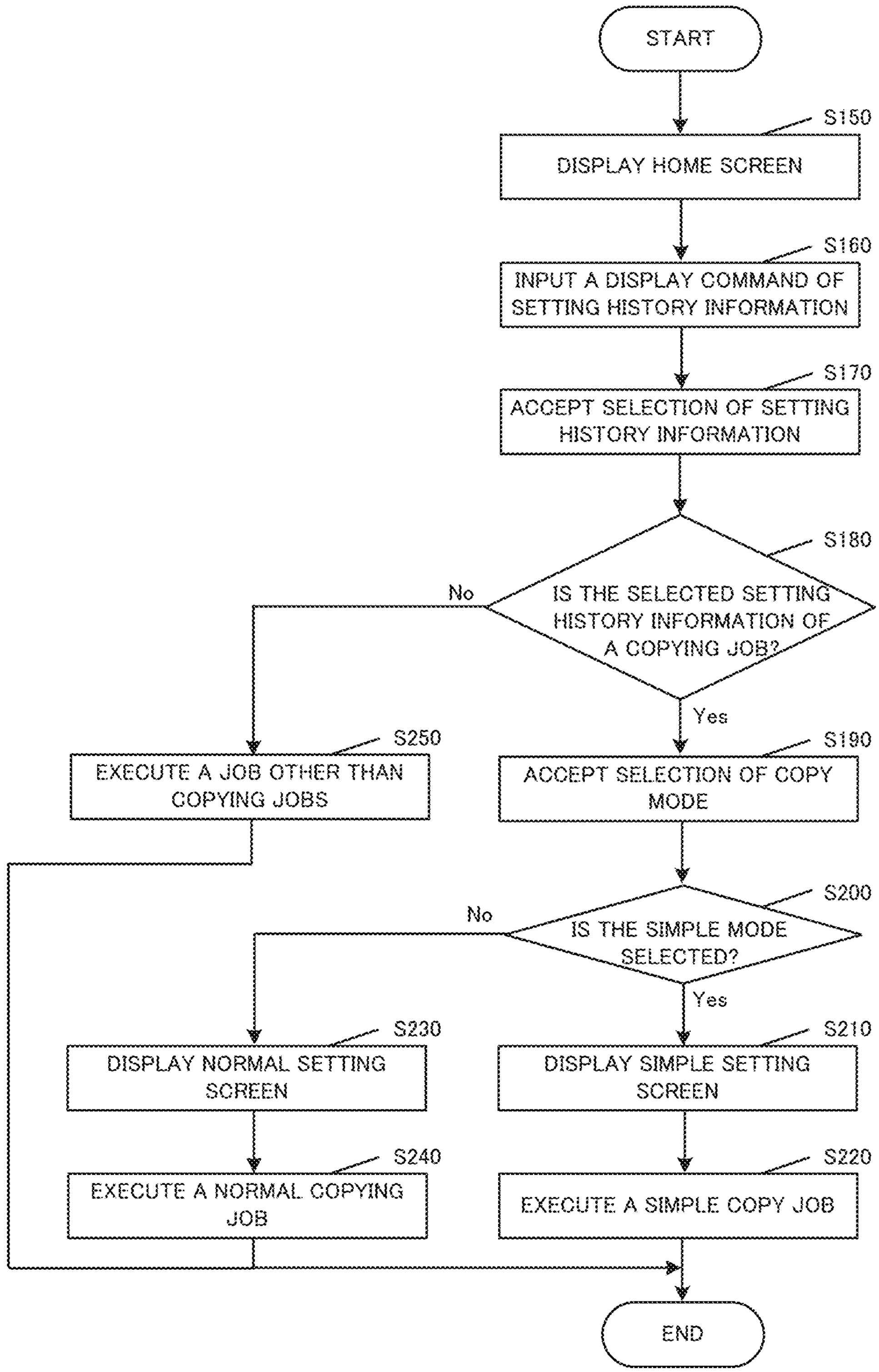
FIG. 12 is a flowchart for explaining a processing flow according to a second embodiment.

A flow of processing according to the second embodiment is described using the flowchart of FIG. 12. In the second embodiment, the process is started through the home screen. The home screen is a basic screen that is displayed on the display 13 at the time of power activation, in standby mode, at the time of recovery from sleep mode, etc., and accepts operation input by the user. Here, the following explanation will be given on the assumption that a copying job is performed by the multifunction machine 10 as one job form. However, other than copying jobs, this process can be also applied to fax jobs, scanning jobs, e-mail transmission, and the like.

The controller 11 displays the home screen on the display 13, by reading out the display processing program 233 when power is activated, in standby mode, at the time of recovery from sleep mode, or the like (step S150).

When the user inputs a display command of setting history information (step S160), the controller 11 displays the setting history display screen W30 on the display 13.

Next, the controller 11 accepts the user's selection of setting history information (step S170). Then, the controller 11 determines whether or not the setting history information selected by the user is related to a copying job (step S180).

When the controller 11 determines that the selected setting history information is related to a copying job, the controller 11 accepts the user's selection of copy mode (step S180; Yes→step S190).

The controller 11 determines whether or not the copy mode selected by the user is the simple mode (step S200). When the copy mode selected by the user is the simple mode, the controller 11 displays the simple setting screen W10 on the display 13 (step S200; Yes→step S210). After displaying the simple setting screen W10, the controller 11 executes a simple copy job based on the execution command by the user and ends the process (step S220).

On the other hand, when the copy mode selected by the user is not the simple mode, the controller 11 displays the normal setting screen W20 on the display 13 (step S200; No→step S230). After displaying the normal setting screen W20, the controller 11 executes a normal copying job based on the execution command by the user and ends the process (step S240).

When it is determined at step S180 that the setting history information selected by the user is not of a copying job, the controller 11 displays the setting screen to which the settings of the setting history information is applied, executes the job corresponding to the setting history information based on the execution command by the user, and ends the process (step S180; No→step S250).

2.2 Operation Example

Figure 13:
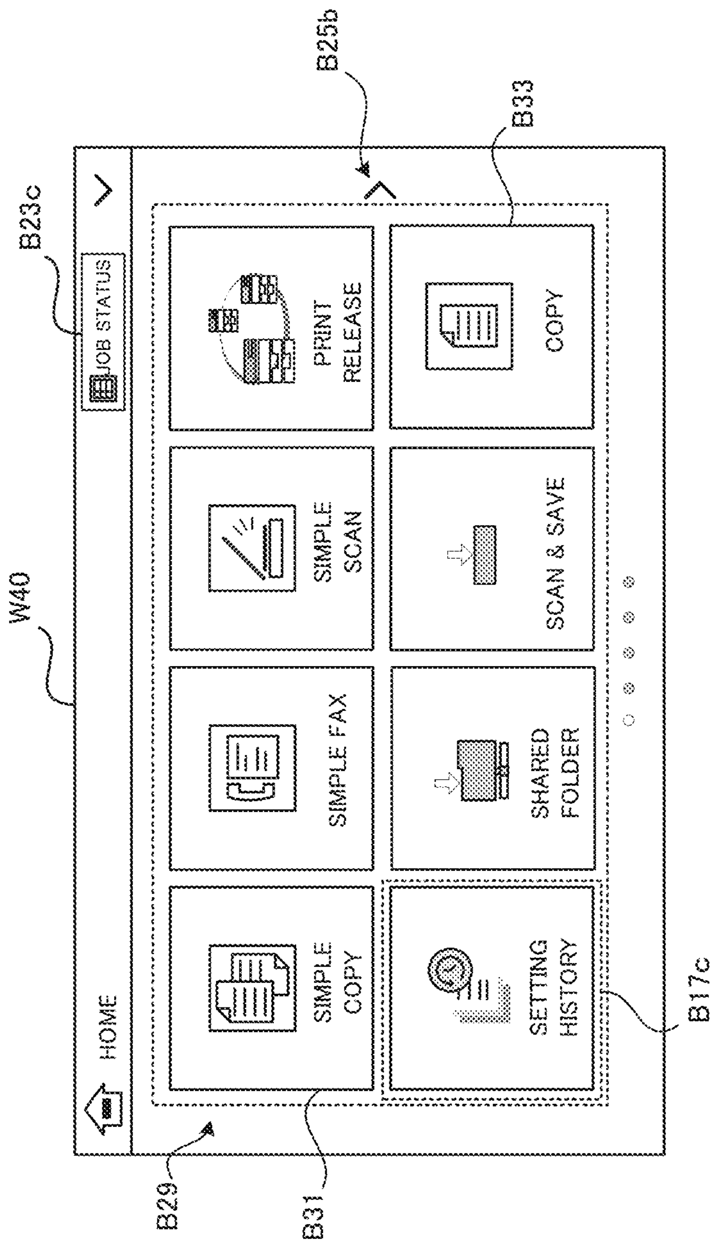
FIG. 13 is a diagram for explaining an operation example of the second embodiment.

FIG. 13 is a configuration example of a home screen W40. The home screen W40 includes job set selection buttons B29, a job status notification button B23*c*, and a display switching button B25*b*.

The job set selection buttons B29 accept selection of a job or various processes desired by the user. The user can execute a copying job in the simple mode by pressing the simple copy button B31 included in the job set selection buttons B29. In addition, the user can execute a copying job in the normal mode by pressing the copy button B33. The controller 11 displays the simple setting screen W10 in response to the pressing of the simple copy button B31. Similarly, the controller 11 displays the normal setting screen W20 in response to the pressing of the copy button B33. The setting history display button B17*c* accepts input of a display command of the setting history display screen as in the first embodiment.

FIG. 13 shows a display example of eight job/process items including "SIMPLE COPY", "SIMPLE FAX", "SIMPLE SCAN", "PRINT RELEASE", "SETTING HISTORY", "SHARED FOLDER", and "SCAN AND SAVE" and "COPY" as selectable job/processing items. Other job/processing items can be displayed by pressing the display switching button B25*b*. It should be noted that the configuration of the job set selection buttons B29 shown in FIG. 13 is merely an example and should not be limited to the items described in FIG. 13.

The job status notification button B23*c* accepts a notification command of the job execution status.

Figure 14:
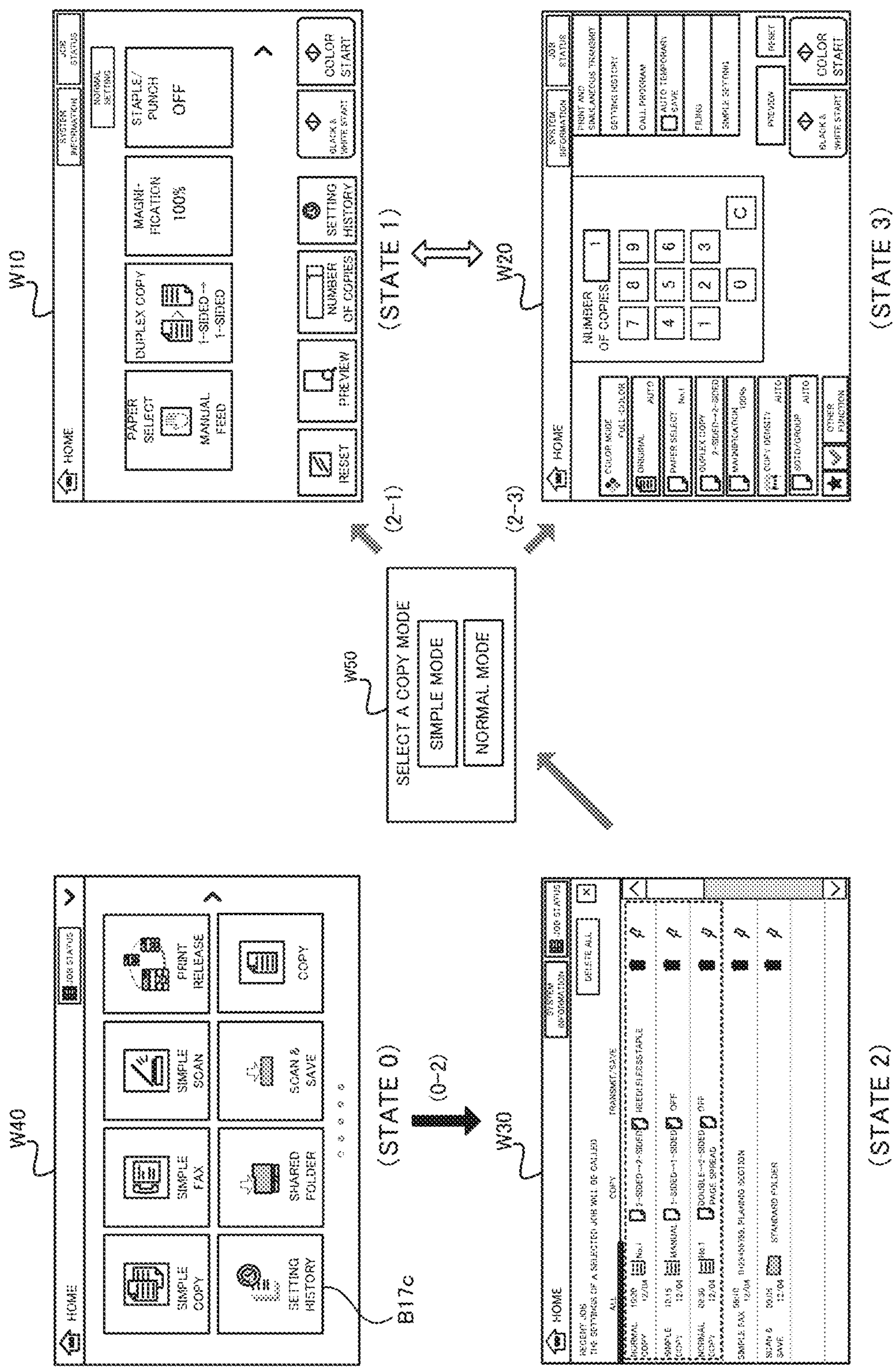
FIG. 14 is a diagram for explaining an operation example of the second embodiment.

FIG. 14 is an operation example of a copying job related to a piece of setting history information selected by the user at step S180 of FIG. 12, when accepting a mode selection of whether the copy job based on the setting history information is executed in the normal mode or in the simple mode.

Note that, this operation example corresponds to the processing described in the flowchart of FIG. 12. Description herein will be made by referring the states where the controller 11 displays the home screen W40 as "state 0", the simple setting screen W10 as "state 1", the setting history display screen W30 as "state 2", and the normal setting screen W20 as "state 3".

When the setting history display button B17*c* is pressed from the state 0 where the home screen W40 is displayed, the controller 11 transits the display screen to the setting history display screen W30 (arrow 0-2 in the drawing, state 2).

In the state 2, when the setting history information related to a copying job is selected by the user, the controller 11 displays a mode selection screen W50 for accepting a mode selection of whether the copy job based on this setting history information is executed in the normal mode or in the simple mode (corresponding to the processing of steps S180 to step S200 in FIG. 12).

When the simple mode is selected by the user through the mode selection screen W50, the controller 11 transits the display screen from the setting history display screen W30 to the simple setting screen W10 (arrow 2-1 in the drawing, state 2→state 1).

On the other hand, when the normal mode is selected by the user through the mode selection screen W50, the controller 11 transits the display screen from the setting history display screen W30 to the normal setting screen W20 (arrow 2-3 in the drawing, states 2→3).

When the system construction or the like is set to prioritize either the simple mode or the normal mode, the system may be configured to display the setting screen corresponding to the priority mode without displaying the mode selection screen W50 shown in FIG. 14. Also, when, in the selected setting history information, setting values that the user cannot change through the simple setting screen W10 has been changed, that is, when a piece of setting history information that cannot be handled in the simple mode is selected, the display screen may be preferentially transited to the normal mode.

As illustrated in FIG. 14, the simple setting screen W10 and the normal setting screen W20 have respective switching command buttons (normal setting button B21*a* and simple setting button B21*b*) provided thereon, which allow switching between the screens as appropriate when these buttons are pressed. Accordingly, for example, when the user wants to modify setting values that cannot be changed in the simple mode, the user can switch the display screen (mode) from the simple setting screen W10 to the normal setting screen W20, thereby being able to execute a copying job easily and flexibly.

As described above, according to the second embodiment, in response to the execution mode of the setting history information that is selected through the setting screen being displayed (selected), a setting screen for the execution of a job based on the setting history information is selected. Accordingly, it is possible to provide a highly convenient information processing apparatus which enables the user to easily execute a job based on setting history information through a setting screen desired thereby.

3. Third Embodiment

A third embodiment is a configuration in which, upon selection of setting history information on the simple setting screen or the normal setting screen, either the execution of a job in the normal mode through the normal setting screen or the execution of a job in the simple mode through the simple setting screen can be selected.

The functional configuration of a multifunction machine according to the third embodiment can be the same as the functional configuration of the multifunction machine 10 according to the first embodiment. Therefore, the description of the functional configuration of the multifunction machine according to the third embodiment is omitted, and the description will be given using the same reference numerals as those of the multifunction machine 10 in the first embodiment.

3.1 Flow of Processing

Figure 15:
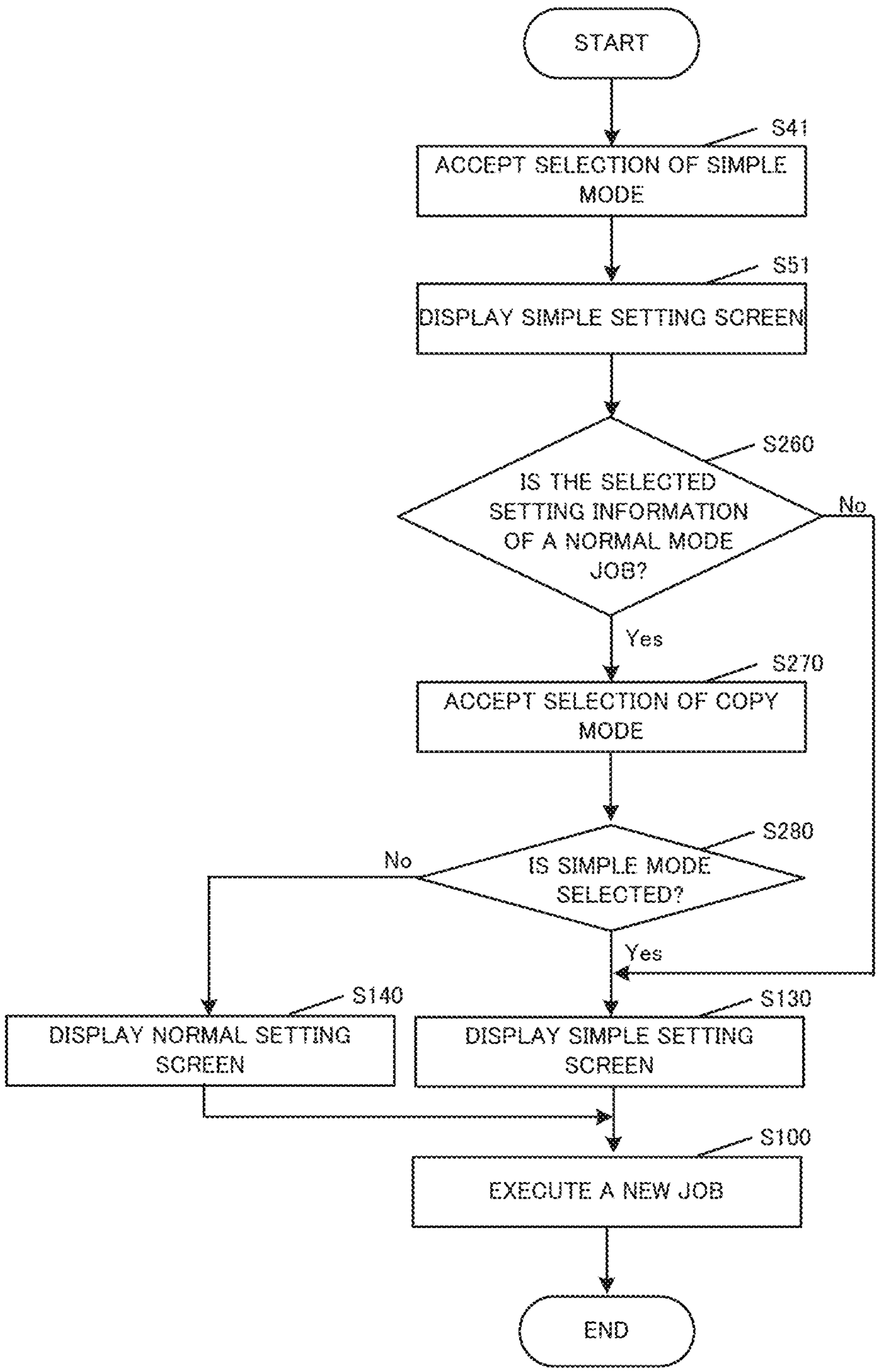
FIG. 15 is a flowchart for explaining a processing flow according to a third embodiment.

A flow of processing according to the third embodiment is described with reference to FIGS. 15 and 16. FIG. 15 is a flowchart explaining a process which is set in the simple mode by the user and performed through the simple setting screen W10. Note that the same procedures as those described with reference to FIG. 5 or FIG. 6 in the first embodiment may be allotted with the same reference numerals and the description thereof may be omitted.

When the simple mode is selected by the user, the controller 11 accepts the selection of the simple mode (step S41).

The controller 11, based on the input of the simple mode, displays the simple setting screen W10 on the display 13 (step S51).

After displaying the simple setting screen W10, the controller 11 accepts user's selection of setting history information. Then, the controller 11 determines whether or not the setting history information selected by the user is that related to a copying job that was executed in the normal mode (step S260).

When the controller 11 determines that the selected setting history information is that of a copying job that was executed in the normal mode, the controller 11 accepts the selection of the copy mode to execute a copying job according to the setting history information (step S260; Yes→step S270).

When the user selects the simple mode to execute the copy job related to the setting history information, the controller 11 displays the simple setting screen W10 on the display 13 (step S280; Yes→step S130). Then, the controller 11 executes a new copy job and ends the process (step S100).

On the other hand, when it is determined that the selected setting history information is not the setting history information related to a copying job that was executed in the normal mode, the controller 11 displays the simple setting screen W10 on the display 13 (step S260); No→step S130). Then, the controller 11 executes a new copy job and ends the process (step S100).

When the user does not select the simple mode to execute the copy job related to the setting history information, the controller 11 displays the normal setting screen W20 on the display 13 (step S280; No→step S140). Then, the controller 11 executes a new copy job and ends the process (step S100).

Figure 16:
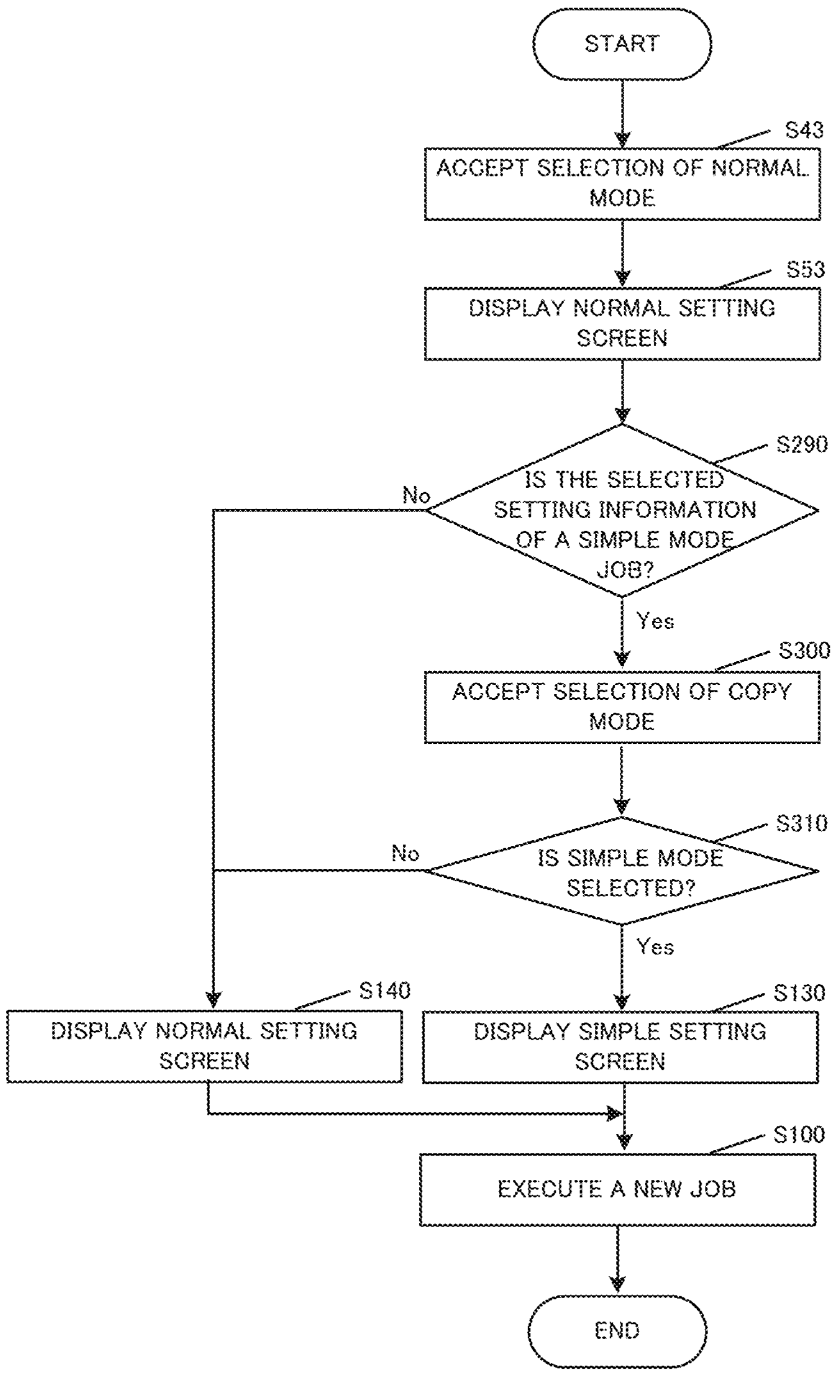
FIG. 16 is a flowchart for explaining a processing flow according to the third embodiment.

FIG. 16 shows a flowchart explaining a process which is set in the normal mode by the user and performed through the normal setting screen W20.

When the normal mode is selected by the user, the controller 11 accepts the selection of the normal mode (step S43).

The controller 11, based on the input of the normal mode, displays the normal setting screen W20 on the display 13 (step S53).

After displaying the normal setting screen W20, the controller 11 accepts user's selection of setting history information. Then, the controller 11 determines whether or not the setting history information selected by the user is that related to a copying job that was executed in the simple mode (step S290).

When the controller 11 determines that the selected setting history information is that related to a copying job that was executed in the simple mode, the controller 11 accepts the selection of the copy mode to execute the copy job related to the setting history information (step S290; Yes→step S300).

When the user selects the simple mode to execute the copy job related to the setting history information, the controller 11 displays the simple setting screen W10 on the display 13 (step S310; Yes→step S130). Then, the controller 11 executes a new copy job and ends the process (step S100).

On the other hand, when it is determined that the selected setting history information is not that related to a copying job that was executed in the simple mode, the controller 11 displays the normal setting screen W20 on the display 13 (step S290; No→step S140). Then, the controller 11 executes a new copy job and ends the process (step S100).

When the user does not select the simple mode to execute the copy job related to the setting history information, the controller 11 displays the normal setting screen W20 on the display 13 (step S310; No→step S140). Then, the controller 11 executes a new copy job and ends the process (step S100).

3.2 Operation Example

Figure 17:
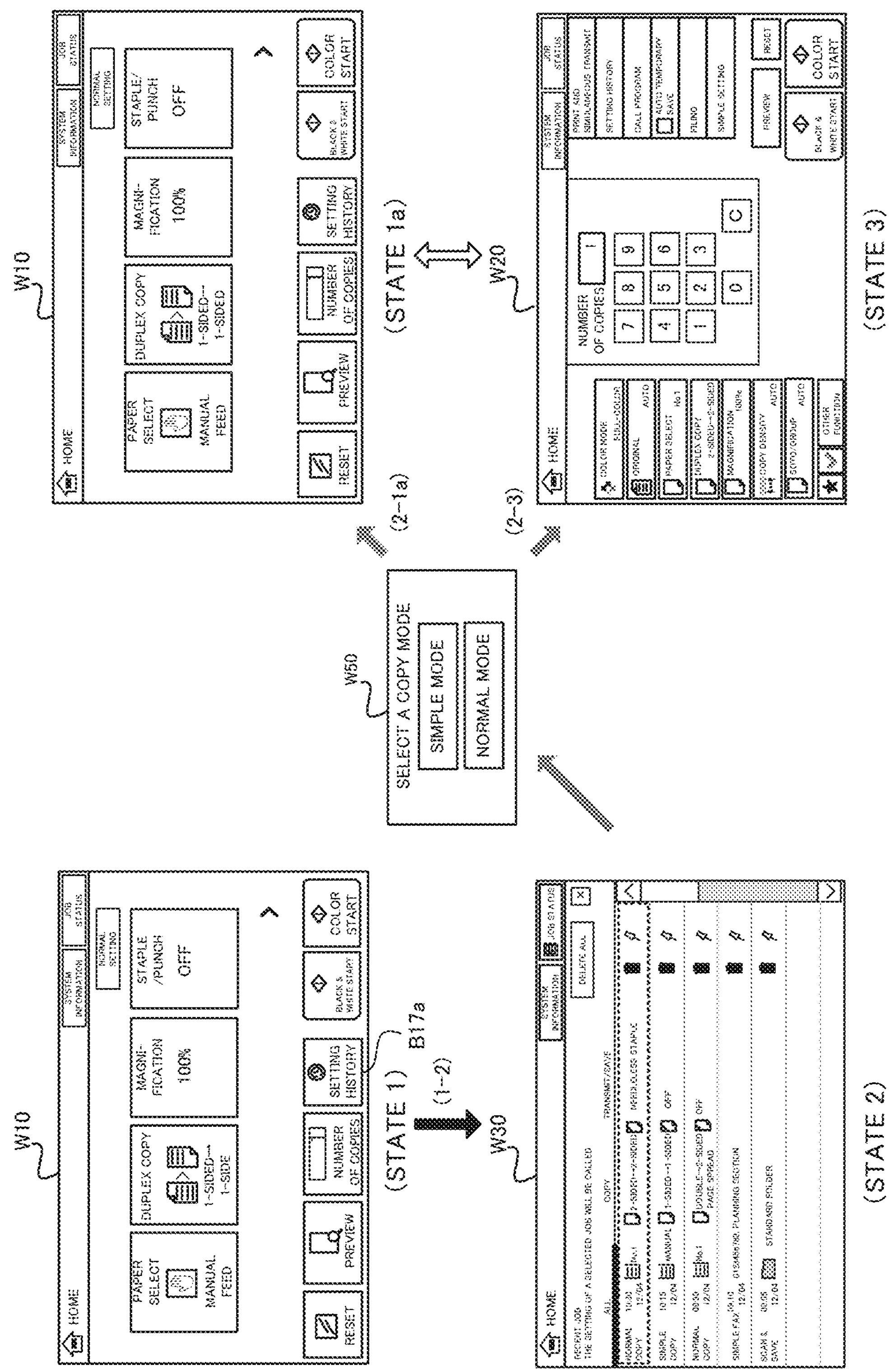
FIG. 17 is a diagram for explaining an operation example of the third embodiment.

FIG. 17 shows an operation example where, when in the simple mode selected by the user the setting history information selected through the simple setting screen W10 is of a job that was executed in the normal mode, it is selected whether the job is executed in the normal mode through the normal setting screen or the job is executed in the simple mode through the simple setting screen.

This operation example corresponds to the process described with the flowchart of FIG. 15. Description herein will be made by referring the states where the controller 11 displays the simple setting screen W10 as "state 1", the setting history display screen W30 as "state 2", and the normal setting screen W20 as "state 3".

When the setting history display button B17*a* is pressed from the state 1 where the simple setting screen W10 is displayed, the controller 11 transits the display screen to the setting history display screen W30 (arrow 1-2 in the drawing, state 2).

In the state 2, when the setting history information related to a copying job that was executed in the normal mode is selected by the user, the controller 11 displays a mode selection screen W50 for accepting a mode selection of whether the copy job based on this setting history information is executed in the normal mode or in the simple mode.

When the simple mode is selected by the user through the mode selection screen W50, the controller 11 transits the display screen from the setting history display screen W30 to the simple setting screen W10 (arrow 2-1*a* in the drawing, state 2→state 1a).

On the other hand, when the normal mode is selected by the user through the mode selection screen W50, the controller 11 transits the display screen from the setting history display screen W30 to the normal setting screen W20 (arrow 2-3 in the drawing, state 2→3).

In the state 2, when the setting history information related to a copying job that was executed in the simple mode is selected by the user, the controller 11, without displaying the mode selection screen W50, transits the display screen from the setting history display screen W30 to the simple setting screen W10 (arrow 2-1*a* in the drawing, state 2→state 1a).

Figure 18:
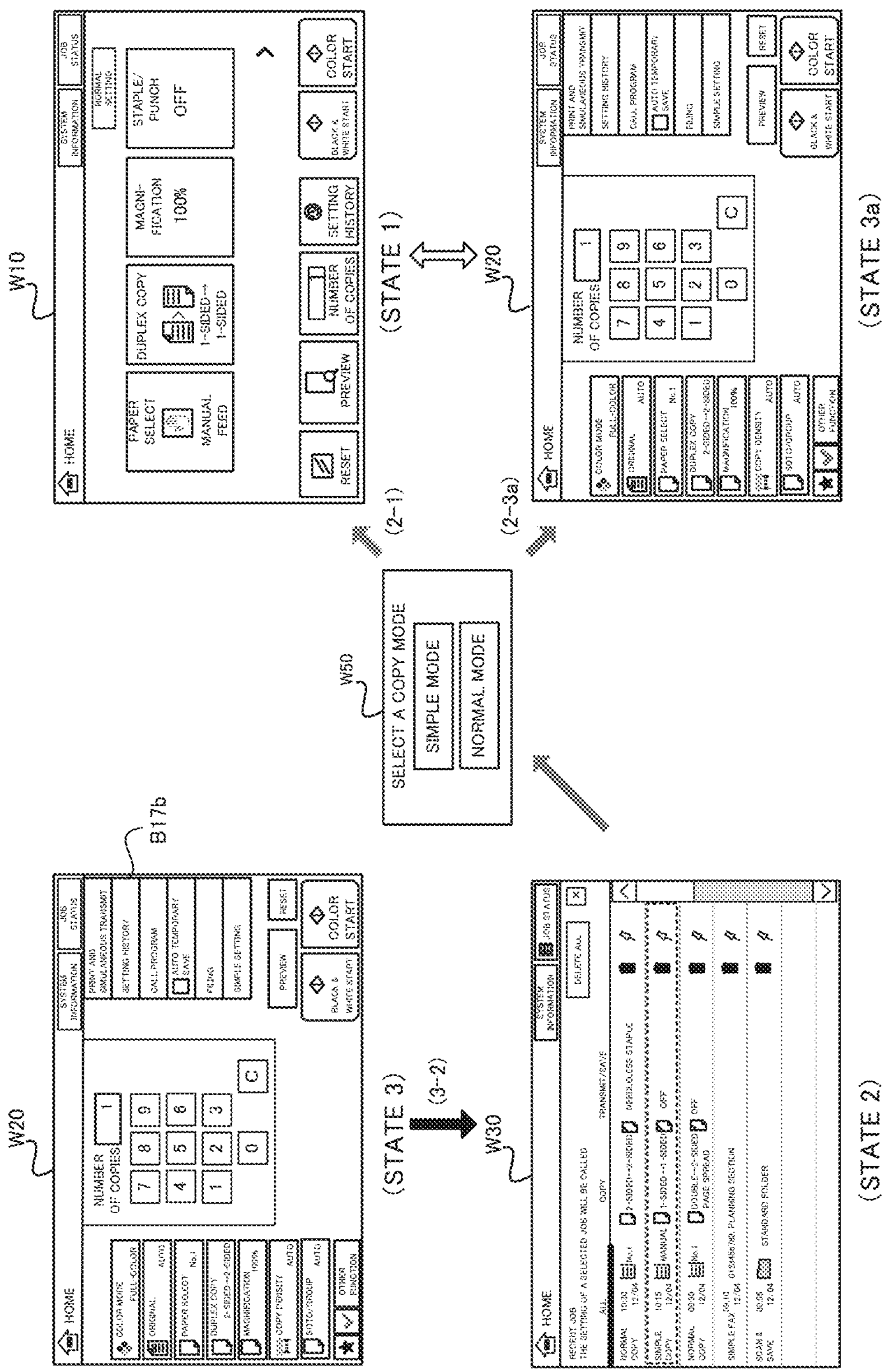
FIG. 18 is a diagram for explaining an operation example of the third embodiment.

FIG. 18 shows an operation example where, when in the normal mode selected by the user the setting history information selected through the normal setting screen W20 is of a job that was executed in the simple mode, it is selected whether the job is executed in the normal mode through the normal setting screen or the job is executed in the simple mode through the simple setting screen.

This operation example corresponds to the process described in the flowchart of FIG. 16. Description herein will be made by referring the states where the controller 11 displays the simple setting screen W10 as "state 1", the setting history display screen W30 as "state 2", and the normal setting screen W20 as "state 3" or "state 3a".

When the setting history display button B17*b* is pressed from the state 3 where the normal setting screen W20 is displayed, the controller 11 transits the display screen to the setting history display screen W30 (arrow 3-2 in the drawing, state 2).

In the state 2, when the setting history information related to a copying job that was executed in the normal mode is selected by the user, the controller 11 displays the mode selection screen W50 for accepting a mode selection of whether the copy job based on this setting history information is executed in the normal mode or in the simple mode.

When the simple mode is selected by the user through the mode selection screen W50, the controller 11 transits the display screen from the setting history display screen W30 to the simple setting screen W10 (arrow 2-1 in the drawing, state 1).

On the other hand, when the normal mode is selected by the user through the mode selection screen W50, the controller 11 transits the display screen from the setting history display screen W30 to the normal setting screen W20 (arrows 2-3*a* in the drawing, state 3a).

In the state 2, when the setting history information related to a copying job that was executed in the normal mode is selected by the user, the controller 11, without displaying the mode selection screen W50, transits the display screen from the setting history display screen W30 to the normal setting screen W20 (arrows 2-3*a* in the drawing, status 3a).

As described above, according to the third embodiment, when selecting setting history information on the simple setting screen or the normal setting screen, it is possible to select whether the job is executed in the normal mode through the normal setting screen or the job is executed in the simple mode through the simple setting screen. Accordingly, it is possible to provide a highly convenient information processing apparatus which enables the user to easily execute a job based on setting history information through a setting screen desired thereby.

4. Fourth Embodiment

A fourth embodiment provides a configuration in which the setting history information related to jobs is used when user authentication is valid.

The functional configuration of a multifunction machine according to the fourth embodiment can be the same as the functional configuration of the multifunction machine 10 according to the first embodiment. Therefore, the description of the functional configuration of the multifunction machine according to the fourth embodiment is omitted, and the description will be given using the same reference numerals as those of the multifunction machine 10 in the first embodiment.

4.1 Flow of Processing

Figure 19:
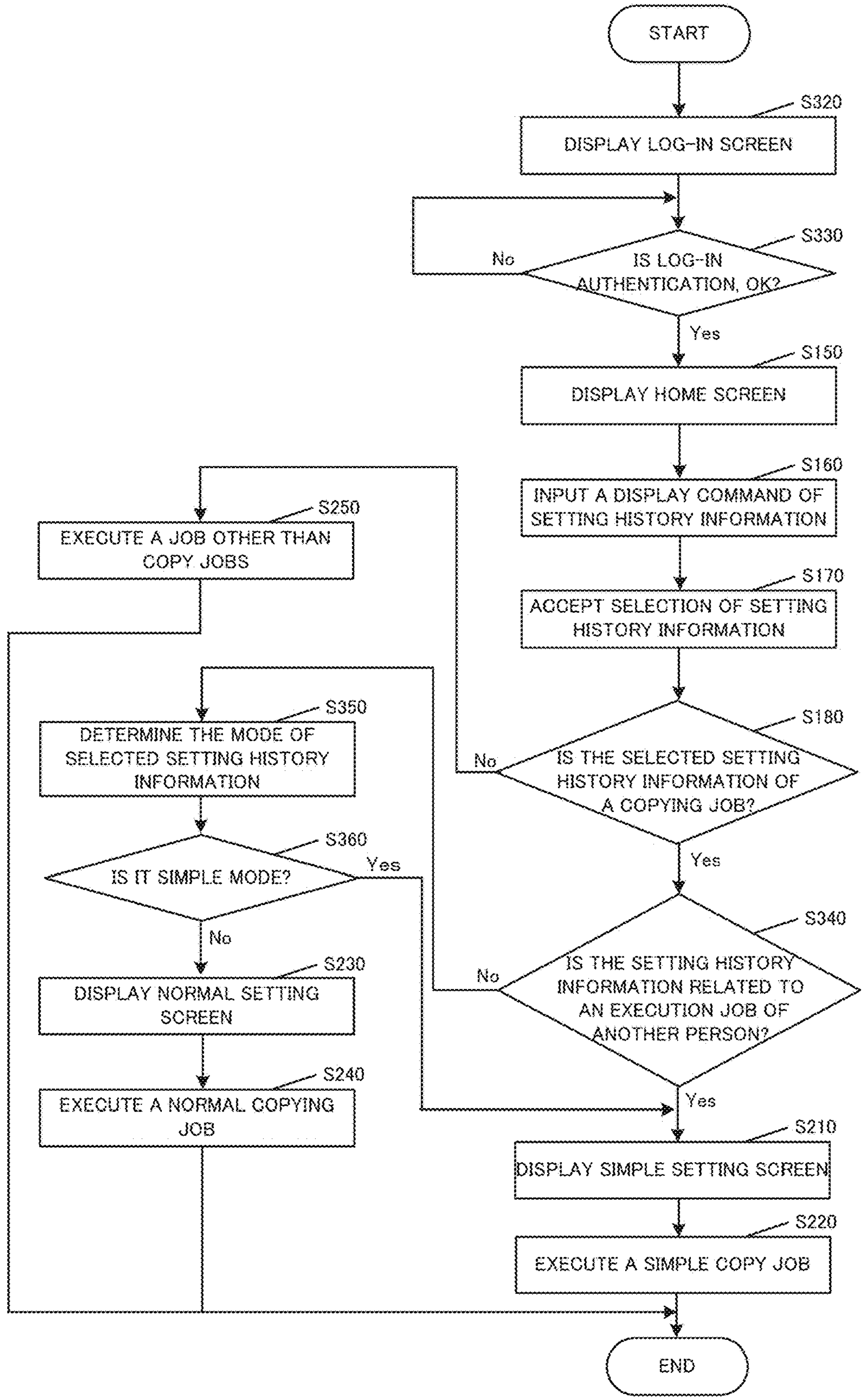
FIG. 19 is a flowchart for explaining a processing flow according to a fourth embodiment.

Referring to the flowchart of FIG. 19, description will be made on the processing flow when the setting history information related to jobs is used at the time when user authentication is valid. Note that the same procedures as those described with flowchart of FIG. 12 in the second embodiment are allotted with the same reference numerals.

The controller 11 displays the log-in screen on the display 13 (step S320). For example, the controller 11 displays the log-in screen at the time of power activation, in standby mode, at the time of recovery from sleep mode, etc.

The controller 11 accepts user input of information related to user authentication such as a log-in username and a log-in password and performs user authentication. In this case, the controller 11 performs user authentication by collating the combination of the log-in username and the log-in password entered by the user with the combination of the log-in username and the log-in password registered beforehand in the machine.

The user authentication may be performed by an external authentication server. In this case, the authentication server holds the log-in username and log-in password for user authentication. Additionally, other than the combination of log-in username and log-in password, the user authentication may be performed, for example, by a combination of ID number, registration number, etc. and log-in password, based on possession authentication using a token, a key, an Integrated Circuit (IC) card, a smartphone, etc., or based on biometric authentication such as fingerprint authentication, face authentication.

When the user authentication succeeds, the controller 11 displays the home screen W40 on the display unit 13 (step S330; Yes→step S150).

When the user inputs a display command of setting history information (step S160), the controller 11 displays the history display screen W30 on the display 13.

Next, the controller 11 accepts the user's selection of setting history information (step S170). The controller 11 determines whether or not the setting history information selected by the user is related to a copying copy job (step S180).

When the setting history information selected by the user is related to a copying job, the controller 11 determines whether or not the setting history information is related to a job that was executed by another person (step S180; Yes→step S340).

When the setting history information is one that relates to another person's execution job, the controller 11 displays the simple setting screen W10 (step S340; Yes→step S210). After displaying the simple setting screen W10, the controller 11 executes a simple copying job (step S220) based on the execution command by the user, and ends the process.

In this case, for example, depending on the job execution status such as a state where the frequency of copying job execution in the simple mode is high, or the system configuration such as prioritizing the simple mode, i.e., "the simple mode is prioritized to execute a job based on another person's copying job", the job mode may be adapted to be changed to the simple mode even if the selected other person's setting history information is related to the normal mode. When the frequency of the copying jobs in the simple mode is not high, the mode may be changed to the same mode as that in which the copy job related to the selected setting history information was executed.

On the other hand, when the setting history information is not related to a job that was executed by another person, the controller 11 assumes that the selected setting history information is that of the logged-in user and determines the mode of the setting history information (step S340; No→step S350).

When the setting history information is related to a logged-in user's simple mode job, the controller 11 displays the simple setting screen W10 (step S360; Yes→step S210). Then, the controller 11 executes a simple copying job based on the command from the user and ends the process (step S220).

On the other hand, when the setting history information is related to a logged-in user's normal mode job (not of a simple mode job), the controller 11 displays the normal setting screen W20 (step S360; No→step S230). Then, the controller 11 executes a normal copying job based on the command from the user and ends the process (step S240).

4.2 Operation Example

Figure 20:
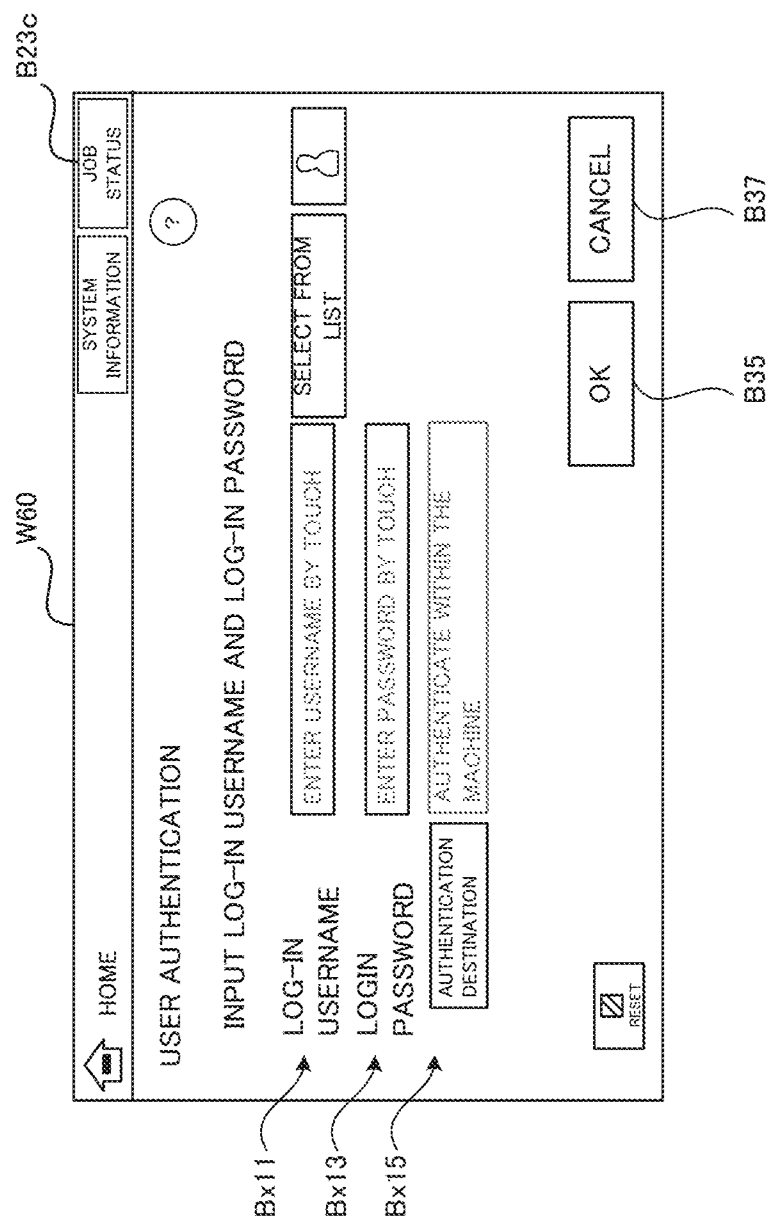
FIG. 20 is a diagram for explaining an operation example of the fourth embodiment.

FIG. 20 shows an example of the configuration of a user authentication screen W60. The user authentication screen W60 includes a logged-in username input box Bx11, a log-in password input box Bx13, an authentication destination input box Bx15, a job status notification button B23*c*, an OK button B35, and a cancel button B37.

The log-in username input box Bx11 accepts input of a log-in username. The log-in password input box Bx13 accepts input of a log-in password. The authentication destination input box Bx15 accepts input of an authentication destination related to user authentication. The OK button B35 accepts an instruction of input confirmation of the log-in username input box Bx11, the log-in password input box Bx13 and the authentication destination input box Bx15. The cancel button B37 accepts an instruction to cancel the user authentication process through the user authentication screen W60.

Figure 21:
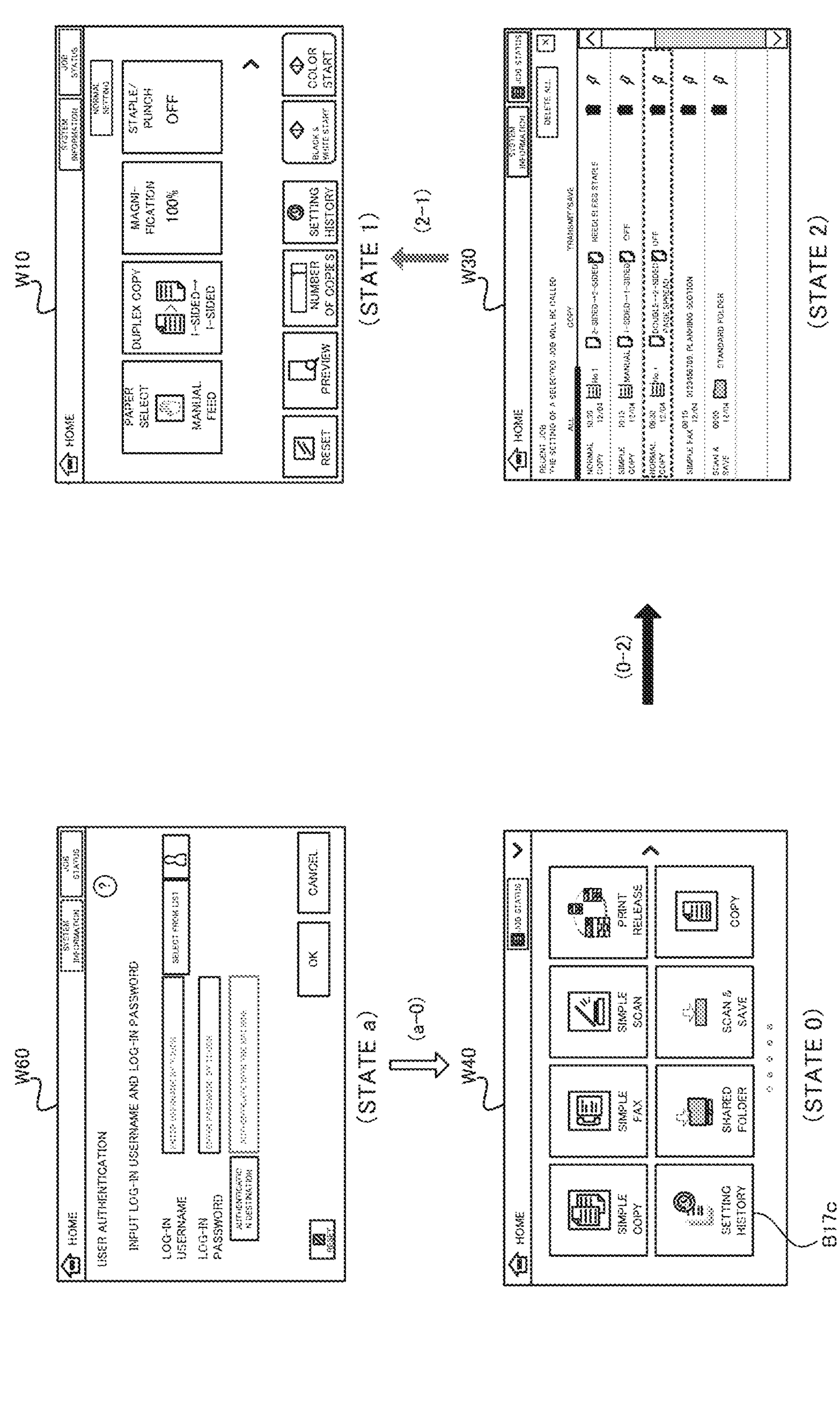
FIG. 21 is a diagram for explaining an operation example of the fourth embodiment.

FIG. 21 shows an operation example in which the setting history information related to a copy job that was executed by a user other than the logged-in user is used when user authentication is enabled. This operation example corresponds to the process described at step S320 to step S340; Yes to step S220 in FIG. 19. Description herein will be made by referring the states where the controller 1 displays the user authentication screen W60 as "state a", the home screen W40 as "state 0", the setting history display screen W30 as "state 2", and the simple setting screen W10 as "state 1".

When the user authentication succeeds in the state a where the user authentication screen W60 is displayed, the controller 11 transits the display screen to the home screen W40 (arrow a-0 in the drawing, state 0).

When the setting history display button B17*c* is pressed from the state 0 where the home screen W40 is displayed, the controller 11 transits the display screen to the setting history display screen W30 (arrow 0-2 in the drawing, state 2).

In the state 2, when the logged-in user selects a copying job (normal mode) of another person, the controller 11 transits the display screen from the setting history display screen W30 to the simple setting screen W10 (arrow 2-1 in the drawing, state 1). In this case, for example, depending on the job execution status such as a state where the frequency of copying job execution in the simple mode is high, or the system configuration such as prioritizing the simple mode, i.e., "the simple mode is prioritized to execute a job based on another person's copying job", the job mode may be changed to the simple mode. When the frequency of the copying jobs in the simple mode is not high, the mode may be changed to the same mode as that in which the copy job related to the setting history information, selected by the user, was executed.

Figure 22:
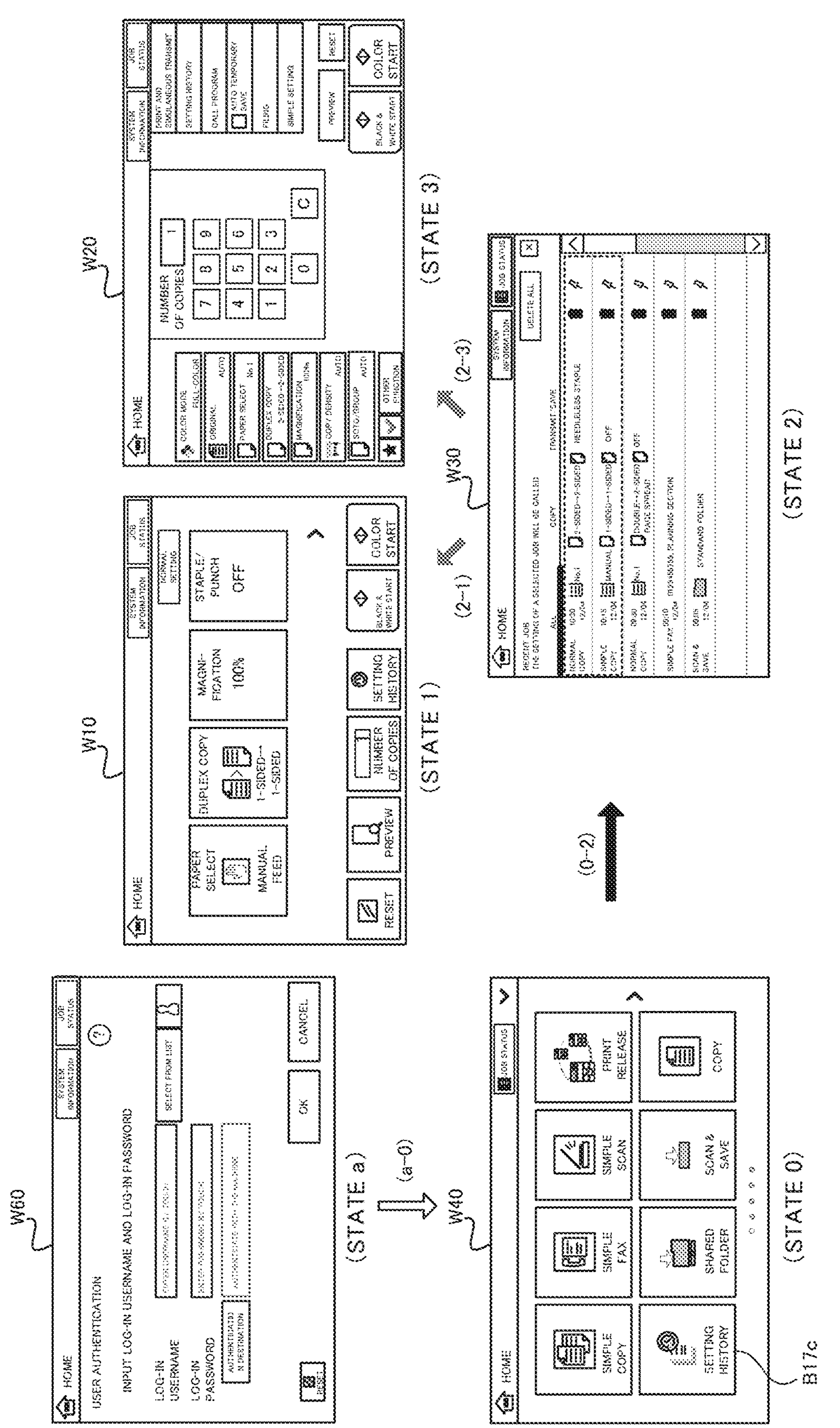
FIG. 22 is a diagram for explaining an operation example of the fourth embodiment.

FIG. 22 shows an operation example in which the setting history information related to a copy job that was executed by the logged-in user is used when the user authentication is enabled. This operation example corresponds to the process described at step S320 to step S340; No to step S240 in FIG. 19. Description herein will be made by referring the states where the controller 11 displays the user authentication screen W60 as "state a", the home screen W40 as "state 0", the setting history display screen W30 as "state 2", the simple setting screen W10 as "state 1", and the normal setting screen W20 is displayed as "state 3".

When the user authentication succeeds in the state a where the user authentication screen W60 is displayed, the controller 11 transits the display screen to the home screen W40 (arrow a-0 in the drawing, state 0).

When the setting history display button B17*c* is pressed from the state 0 where the home screen W40 is displayed, the controller 11 transits the display screen to the setting history display screen W30 (arrow 0-2 in the drawing, state 2).

In the state 2, when the logged-in user selects their own copy job (simple mode or normal mode), the controller 11 transits the display screen from the setting history display screen W30 to either the simple setting screen W10 (arrow 2-1 in the drawing, state 1) or the normal setting screen W20 (arrow 2-3 in the drawing, state 3), which was used when the job was executed.

As described above, according to the fourth embodiment, when user authentication is valid, a setting screen is selected for a job based on the setting history information on a job that was executed by the logged-in user or another user.

Accordingly, it is possible to provide a highly convenient information processing apparatus which enables the user to easily execute a job based on setting history information through a setting screen desired thereby.

5. Fifth Embodiment

A fifth embodiment is given in a form of a multifunction machine that can perform a job through a setting screen, either the normal setting screen that allows all the settings for execution of the job to be set or the simple setting screen whose displayed contents are simplified (limited) compared to those of the normal setting screen. The job execution (operation) mode through the normal setting screen may be referred to as "normal mode", whereas the job execution (operation) mode through the simple setting screen may be referred to as "simple mode".

5.1 Functional Configuration

The functional configuration of a multifunction machine according to the fifth embodiment can be the same as the functional configuration of the multifunction machine 10 according to the first embodiment. Therefore, in the fifth embodiment, the same reference numerals are allotted to the same components as those of the multifunction machine 10 according to the first embodiment. Even if the functional component has the same name, explanation will be supplemented for the parts that need explanation.

In the fifth embodiment, the storage 23 stores a job execution program 231 and a setting history information processing program 232, a display processing program 233, and a mode determination program 234, and secures a setting value storage area 235, a setting history information storage area 236 and a display content storage area 237.

The setting history information processing program 232 is, for example, a program the controller 11 reads out when acquiring setting values and the like for job execution, generating setting history information, and performing various processing on the setting history information. The controller 11 that has read out the setting history information processing program 232 acquires the setting values for job execution and stores them in the setting value storage area 235. Further, the controller 11 generates setting history information based on the acquired setting values and stores it in the setting history information storage area 236. The controller 11 that has read the setting history information processing program 232 functions as a history manager that manages the operation mode (normal mode or simple mode) and the history of the communicator 17 as the job type (fax or image transmission).

The setting value storage area 235 is a storage area for storing the setting values for job execution. The setting values, for example, include settings designated by the user such as fax/image, original size, original orientation, density, image quality, and setting values the device itself holds as the initial values.

The setting history information storage area 236 is a storage area for storing the setting history information in a data table format or the like. The setting history information according to the present disclosure can be configured as history information allotted with an identifier, ID or the like that uniquely identifies the combination of the information on the job execution history such as job type, execution username, execution date and time, mode, and a part or all of the settings stored in the setting value storage area 235. The setting history information stored in the setting history information storage area 236 is called as appropriate upon execution, mode determination, and the like of a job, based on the setting history information.

FIG. 23 is a diagram for explaining a configuration example of setting history information. For example, the setting history information of a job ID "025" contains as information on execution history, "JOB TYPE": FAX, "EXECUTION USERNAME": Yamada, "DOCUMENT NAME": Document03, "PAGE NUMBER/SET NUMBER": 002/001, "STARTING DATE AND TIME/ENDING DATE AND TIME": 2019/12/04 10:30:50-2019/12/04 10:32:50, "MODE": Normal (normal mode). The setting history information includes setting values such as "Fax/Image": Fax, "Original Size": A4, "Original Orientation": Landscape Orientation, "Card Scan": No, and the like. It should be noted that the setting values in FIG. 23 are merely examples, and the setting values in the present disclosure should not be limited to the items described in FIG. 23.

For example, in a fax job or image transmission job, when the destination of the generated fax data or image data is designated by the address book, transmission history, or direct input, the destination information should also be included as settings.

5.2 Flow of Processing

Next, a flow of processing according to the fifth embodiment is described. Note that, since the processing related to generation/storage of the setting history information based on the jobs that were executed by the multifunction machine 10 can be the same as the processing described with FIG. 4 of the first embodiment, the description here is omitted. Additionally, the following explanation will be given on the assumption that a fax job or image transmission job is performed by the multifunction machine 10 as one job form. However, this process can be also applied to copying jobs and others.

Referring first to a flowchart in FIG. 24, description will be made on a process relating to the execution of a new job using the setting history information stored in the setting history information storage area 236.

When executing a job, the user selects whether to execute the job in the normal mode through the normal setting screen or in the simple mode through the simple setting screen. In this case, the user can also select either the normal mode or the simple mode, for example, through the home screen described later.

When the normal mode or the simple mode is selected by the user, the controller 11 accepts input of the selected mode (step S40).

By reading out the display processing program 233, the controller 11 displays a setting screen (normal setting screen or simple setting screen) based on the received mode, on the display 13 (step S50).

After displaying the setting screen, the controller 11 determines whether or not the execution of the job uses the stored setting history information (step S60). In this case, the controller 11 may determine that the stored setting history information will be used, based on the input of a display command of the setting history information.

When it is determined that the setting history information will be used, the controller 11 displays the setting screen to which the setting values of the setting history information selected by the user is applied, on the display 13 (step S70).

When the controller 11 accepts an execution command of a new job through the setting screen displayed on the display unit 13, the controller 11 executes the job based on the setting history information (step S80).

When it is determined that no setting history information will be used (step S60; No), the controller 11, as receiving a command to execute a new job through the setting screen displayed on the display 13 in the step S50, execute the job (step S80).

Additionally, the setting values for the job executed at step S80 can be taken and stored as setting history information, by the same procedures as in step S30 of FIG. 4.

Next, the process of "display a setting screen to which the setting values applied" at step 70 of FIG. 24 will be described with reference to the flowchart of FIG. 25.

Figure 24:
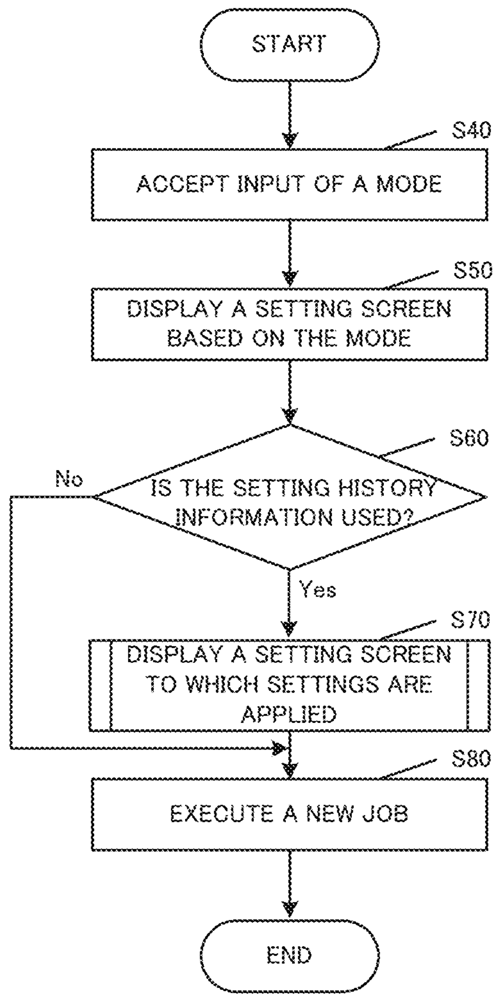
FIG. 24 is a flowchart for explaining a processing flow according to a fifth embodiment.

The controller 11 determines whether or not the setting screen displayed based on the mode selected by the user at step S50 of FIG. 24 is a simple setting screen (step S90).

When it is determined that the displayed setting screen is a simple setting screen (step S90; Yes), the controller 11 determines whether or not the selected setting history information is that related to a normal mode job (step S90; Yes→step S110).

On the other hand, when the controller 11 determines that the displayed setting screen is not a simple setting screen but a normal setting screen (step S90; No→step S100), it is also determined whether or not the selected setting history information is that related to a normal mode job (step S100→step S110).

When determining that the selected setting history information is that of a normal mode job, the controller 11 determines whether or not the normal mode job related to this setting history information can be handled in the simple mode (step S110; Yes→step S120).

When determining that the normal mode job can be handled in the simple mode, the controller 11 displays a simple setting screen to which the setting values of the setting history information are applied, on the display 13 (step S120; Yes→step S130).

On the other hand, when determining that the normal mode job cannot be handled in the simple mode, the controller 11 displays a normal setting screen to which the setting values of the setting history information is applied, on the display 13 (step S120; No→step S140).

The controller 11 executes a job based on the setting values displayed on either the simple setting screen or the normal setting screen and ends the process (step S150).

5.3 Operation Example

Next, an operation example of the fifth embodiment is described. In this disclosure, the operation inputter 15 of a touch panel type provided on the screen of the display 13, detects a user's pressing on each button area sectioned on the screen, enabling each input by the user. FIG. 26A is a configuration example of a simple setting screen W10 for a fax job. FIG. 26B is a configuration example of a normal setting screen W20 for a fax job. The simple setting screen W10 can be displayed, for example, through the mode selection process performed by user through the home screen described later at step S40 of FIG. 24, or through the normal setting screen W20. The normal setting screen W20 can be displayed, for example, through the mode selection process by the user through the home screen as in displaying the simple setting screen W10, or through the simple setting screen W10.

The simple setting screen W10 has such a simple screen configuration that the items of the setting values that can be set by the user is limited as compared to the normal setting screen W20. The simple setting screen W10 includes setting value buttons B11*a*, operation control buttons B13*a*, a start button B15*a*, a normal setting button B17*a*, a job status notification button B19*a*, a display switching button B21*a*, and a destination display area R11*a*.

The setting value buttons B11*a* accepts selection/input of setting values that can be set by the user through the simple setting screen W10. For example, the user can press the address book button and set the destination of fax transmission, from the displayed items in the unillustrated address book. FIG. 26A shows an example in which three setting items, "ADDRESS BOOK", "TRANSMISSION HISTORY", and "DIRECT INPUT", are displayed as settable setting value items. Other setting value items can be displayed by pressing the display switching button B21*a*.

The operation control buttons B13*a* include, for example, a reset button, a preview button, a setting history display button B23*a*, a manual reception button, and the like. For example, the reset button accepts reset of the setting values selected/input through the setting value buttons B11*a*, and the like. The preview button accepts a display command of a preview image ahead of execution of a fax job. The setting history display button B23*a* accepts a display command of the setting history display screen described later. The manual reception button accepts the user's input for manual fax reception.

The start button B15*a* accepts input of an execution command of a fax job. When the start button B15*a* is pressed, the controller 11 executes the process related to a fax job.

The normal setting button B17*a* accepts a command to switch the display to the normal setting screen W20.

The job status notification button B19*a* accepts a notification command of the job execution status.

The destination display area R11*a* is a display area for displaying the destination of fax transmission selected and input through any of the setting value buttons B11*a*, i.e., the address book, the transmission history, or the direct input.

The normal setting screen W20 shown in FIG. 26B has a screen configuration that allows all setting values related to execution of a fax job. The normal setting screen W20 includes setting value buttons B11*b*, operation control buttons B13*b*, a start button B15*b*, a job status notification button B19*b*, and a destination display area R11*b*.

The setting value buttons B11*b* accept selection/input of setting values that can be set by the user. For example, when pressing the density button, the user can select a desired setting values related to density selection, from items such as "dark", "normal", "light", and "automatic", which are not shown. FIG. 26B shows an example in which seven setting value items that can be set: "DENSITY", "IMAGE QUALITY", "ORIGINAL", "MASS ORIGINAL MODE", "THIN PAPER READING", "THICK PAPER READING", and "MIXED ORIGINAL". Herein, the setting values displayed on the top of each of the setting value buttons B11*b* reflects the setting values of the applied setting history information (FIG. 26B is an example in which the setting values of the job ID "025" in FIG. 23 are applied). The configuration of the setting value buttons B11*b* illustrated in FIG. 26B is merely an example and should not be limited to the items shown in FIG. 26B.

The setting value buttons B11*b* include an "OTHER FUNCTIONS" button in addition to the above setting value items. By pressing the "OTHER FUNCTIONS" button, the user can call other setting items other than the setting items being displayed and can select/input the settings.

The operation control buttons B13*b*, in addition to a preview button and a reset button, include extended functionality buttons such as a "SEARCH GLOBAL ADDRESS BOOK" button, a "READ BY SEARCH NUMBER" button, and a "DIRECT TRANSMISSION" button. For example, by pressing the "SEARCH GLOBAL ADDRESS BOOK" button, a destination of fax transmission can be selected from the global address book.

The operation control buttons B13*b* include a setting history display button B23*b* and a simple setting button B17*b*. The setting history display button B23*b* accepts a display command of the setting history display screen described later. In addition, the simple setting button B17*b* accepts a command to switch the display to the simple setting screen W10.

The start button B15*b* accepts input of an execution command of a fax job. As the start button B15*b* is pressed, the controller 11 executes a process related to a fax job.

The job status notification button B19*b* accepts a notification command of the job execution status.

The destination display area R11*b* is a display area for displaying the destination of fax transmission selected and input through any of the address book, the transmission history, or by the direct input through the fax number input area R15 arranged substantially in the center of the normal setting screen W20.

FIG. 27A is a configuration example of a simple setting screen W80 for an image transmission job. FIG. 27B is a configuration example of a normal setting screen W90 for an image transmission job. The simple setting screen W80 can be displayed, for example, through the mode selection process performed by user through the home screen described later at step S40 of FIG. 24, or through the normal setting screen W90. The normal setting screen W90 can be displayed, for example, through the mode selection process by the user through the home screen as in displaying the simple setting screen W80, or through the simple setting screen W80.

The simple setting screen W80 has such a simple screen configuration that the items of the setting values that can be set by the user is limited as compared to the normal setting screen W90. The simple setting screen W80 includes setting value buttons B11*c*, operation control buttons B13*c*, start buttons B15*c*, a normal setting button B17*c*, a job status notification button B19*c*, a display switching button B21*c*, and a destination display area R11*c*.

The setting value buttons B11*c* accepts selection/input of setting values that can be set by the user through the simple setting screen W80. For example, the user can press the address book button and set the destination of transmission of a scanned image data, from the displayed items in the unillustrated address book. FIG. 27A shows an example in which four setting value items, "ADDRESS BOOK", "TRANSMISSION HISTORY", "GLOBAL ADDRESS SEARCH", and "MAIN UNIT/DEVICE SAVE" are displayed as settable setting value items. Other setting value items can be displayed by pressing the display switching button B21*c*.

The operation control buttons B13*c* include, for example, a reset button, a preview button, an automatic setting button, a setting history display button B23*c*, and the like. For example, the reset button accepts reset of the setting values selected/input through the setting value buttons B11*c*, and the like. The preview button accepts a display command of a preview image ahead of execution of an image transmission job. The automatic setting button accepts an application of the device setting set in the system configuration. The setting history display button B23*c* accepts a display command of the setting history display screen described later.

The start buttons B15*c* include black-and-white start button and a color start button. When transmission of black and white images is desired, the user presses the black-and-white start button. On the other hand, when transmission of color images is desired, the user presses the color start button. When either the black-and-white start button or the color start button is pressed by the user, the control unit 11 executes the process related to the image transmission job.

The normal setting button B17*c* accepts a command to switch the display to the normal setting screen W90.

The job status notification button B19*c* accepts a notification command of the job execution status.

The destination display area R11*c* is a display area for displaying the destination of image data transmission selected and input through any of the setting value buttons B11*c*, i.e., the address book, the transmission history, the global address search, and the main unit/device save.

Next, the normal setting screen W90 shown in FIG. 27B has a screen configuration that allows all settings related to execution of an image transmission job. The normal setting screen W90 includes setting value buttons B11*d*, operation control buttons B13*d*, a start button B15*d*, a job status notification button B19*d*, and a destination display area R11*d*.

The setting value buttons B11*d* accept selection/input of setting values that can be set by the user. For example, when pressing the color mode button, the user can select a desired setting values from the items (not shown) for color mode selection such as "full color", "black and white", "monochromatic color", and "automatic (color/black and white)" to thereby configure the setting values for color mode. FIG. 27B shows an example in which five setting value items that can be set: "COLOR MODE", "RESOLUTION", "FORMAT", "ORIGINAL"and" DENSITY" are provided. Herein, the setting values displayed on the top of each of the setting value buttons B11*d* reflects the setting values of the selected setting history information (FIG. 27B is an example in which the setting values of the setting history information of the job ID "023" in FIG. 23 are applied). The configuration of the setting value buttons B11*d* illustrated in FIG. 27B is merely an example and should not be limited to the items shown in FIG. 27B.

The setting value buttons B11*d* include an "OTHER FUNCTIONS" button in addition to the above setting value items. By pressing the "OTHER FUNCTIONS" button, the user can call other setting value items other than the setting value items being displayed and can select/input the settings.

The operation control buttons B13*d*, in addition to a preview button and a reset button, include extended functionality buttons such as a "SEARCH GLOBAL ADDRESS BOOK" button, a "CALL BY SEARCH NUMBER" button, and a "Call Program" button and the like. For example, by pressing the "SEARCH GLOBAL ADDRESS BOOK" button, a destination of image data transmission can be selected from the global address book.

The operation control buttons B13*d* include a setting history display button B23*d* and a simple setting button B17*d*. The setting history display button B23*d* accepts a display command of the setting history display screen described later. In addition, the simple setting button B17*d* accepts a command to switch the display to the simple setting screen W80.

The start button B15*d* accepts input of an execution command of an image transmission job. As the start button B15*d* is pressed, the controller 11 executes a process related to an image transmission job.

The job status notification button B19*d* accepts a notification command of the job execution status.

The destination display area R11*d* is a display area for displaying the destination of image data transmission selected and input through any of the address book, the transmission history, or by the direct input.

Figure 28:
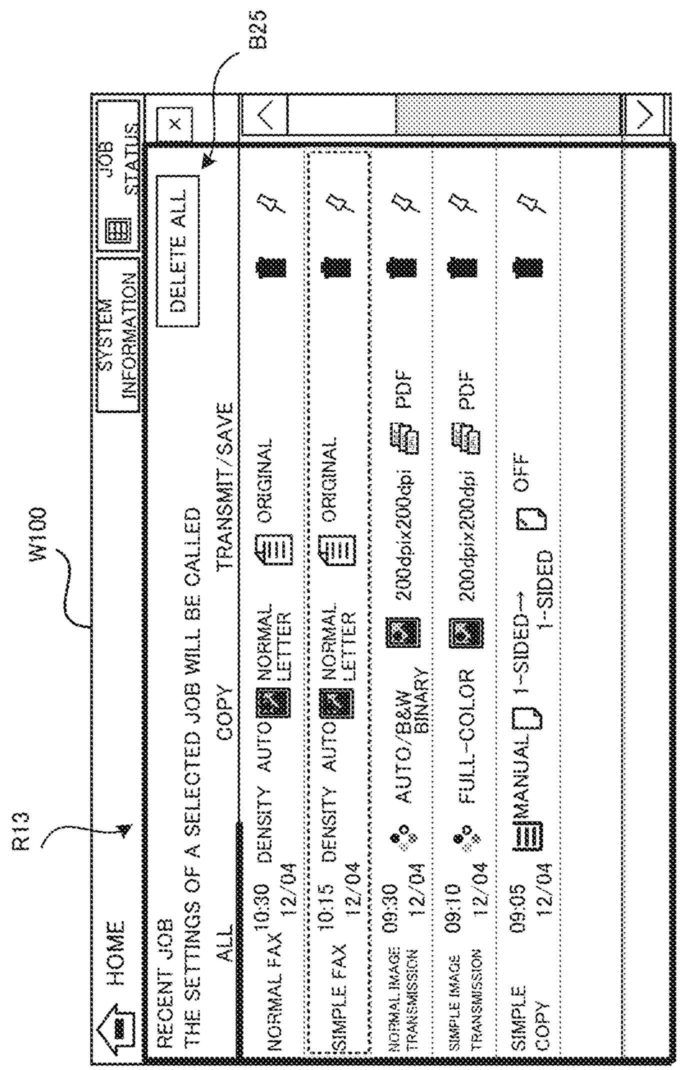
FIG. 28 is a diagram for explaining an operation example of the fifth embodiment.

FIG. 28 shows a configuration of the setting history display screen W100. For example, the setting history display screen W100 can be displayed anytime by pressing the setting history display buttons B23*a* to B23*d* shown in FIGS. 26 and 27, or the setting history display button or the like on the home screen described later.

The setting history display screen W100 includes a setting history display area R13 and a delete-all button B25. The history display area R13 is configured so that, for example, pieces of setting history information related to jobs can be displayed in time-sequential order. The display method of the setting history information is not particularly limited, but may adopt, for example: a display format in which the setting history information for all jobs is displayed as shown in the example in FIG. 28; a display format in which pieces of setting history information related to a certain specific job are displayed; when the multifunction machine 10 has a user authentication function, a display format in which only pieces of setting history information related to logged-in user's jobs are displayed; a display format in which only pieces of setting history information having identical setting values are displayed; a format in which only pieces of setting history information for the jobs executed within a specific period are displayed; a display formant in which only pieces of setting history information related to a specific job execution user are displayed; and the like.

FIG. 28 is an example in which pieces of setting history information related to the five jobs of normal faxing, simple faxing, normal image transmission, simple image transmission, and simple copying are displayed in time-sequential order from top to bottom. The three pieces of setting history information from the top in FIG. 28 correspond to the setting history information on the job IDs "025" to "023" shown in FIG. 23.

Here, in each display section (a section related to fax jobs) in the setting history display area R13, the job type in a specific mode (for example, a fax job in the normal mode: normal faxing) and the start date and time of the job, part of the setting values are displayed. FIG. 28 shows an example in which three setting value items, "density", "image quality", and "original" are given as the setting value items to be displayed, but the setting value items to be displayed can be selected as appropriate.

In addition, each piece of setting history information displayed in the setting history display area R13 is configured so that the user can select it. By selecting a desired piece of setting history information, the user can easily execute a job based on the setting history information or a job similar thereto. For example, when the setting history information (corresponding to job ID "024") for simple faxing, surrounded by the dotted line frame in the drawing is selected, the screen can be transited to the simple setting screen W10 shown in FIG. 26A. In this case, the selected piece of setting history information may be darkened so that the selected piece of setting history information can be easily grasped.

The delete-all button B25 accepts a command to delete the setting history information from the setting history display area R13. When the delete-all button B25 is pressed by the user, the controller 11 stops displaying the setting history information in the setting history display area R13.

Figure 29:
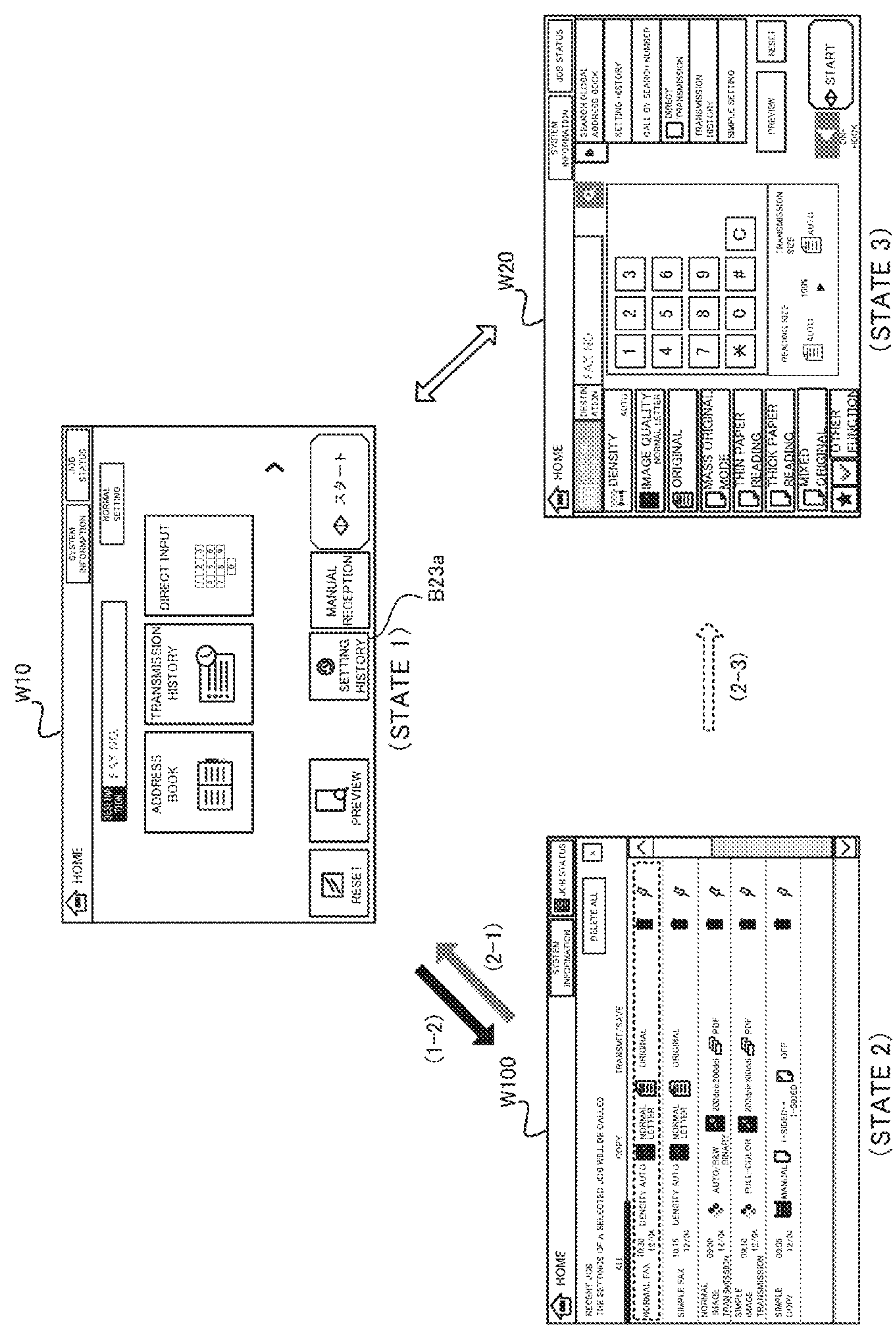
FIG. 29 is a diagram for explaining an operation example of the fifth embodiment.

Next, FIG. 29 shows an operation example relating to a case where in the simple mode related to a fax job, selected by the user at step S40 of FIG. 24, a job is executed in the normal mode (the normal setting screen W20), using the setting history information selected through the simple setting screen W10.

Figure 25:
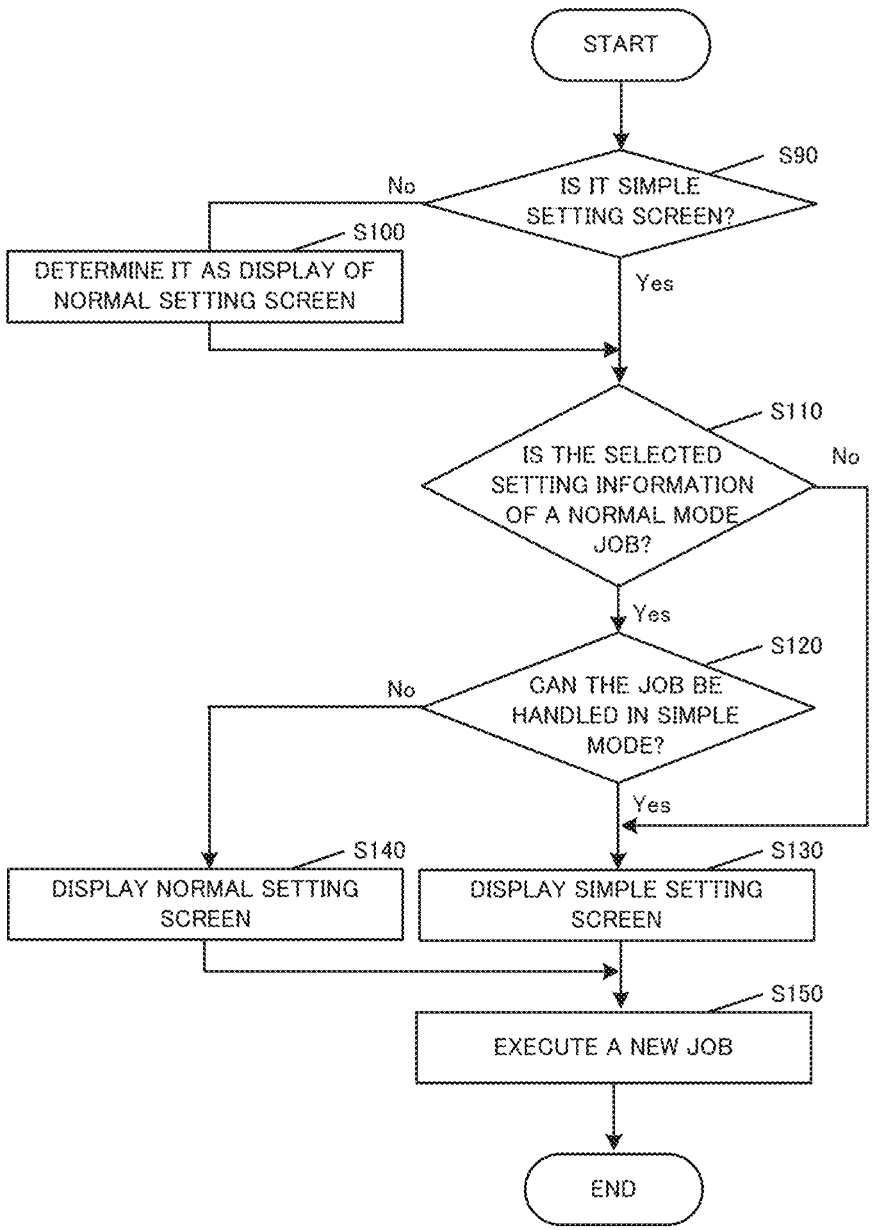
FIG. 25 is a flowchart for explaining a processing flow according to the fifth embodiment.

Note that, this operation example corresponds to the processing described in the flowcharts of FIGS. 24 and 25. Description herein will be made by referring the states where the controller 11 displays the simple setting screen W10 as "state 1", the setting history display screen W100 as "state 2", and the normal setting screen W20 as "state 3".

When the setting history display button B23*a* is pressed from the state 1 where the simple setting screen W10 is displayed, the controller 11 transits the display screen to the setting history display screen W100 (arrow 1-2 in the drawing, state 1→state 2).

When a piece of setting history information related to a fax job is selected by the user in the state 2, the controller 11 determines whether or not the selected setting history information is of a fax job that was executed in the normal mode (corresponding to the process at step S110 in FIG. 25). In this case, the controller 11, referring to the "mode" of the selected setting history information, can determine whether or not the setting history information is of a fax job that was executed in the normal mode.

When determining that the setting history information selected by the user is of a fax job that was executed in the normal mode, the controller 11 further determines whether or not the fax job can be handled in the simple mode (corresponding to the process of step S110; Yes→step S120 in FIG. 25). In this case, the controller 11 refers to the setting values of the setting history information and checks the setting values that the user cannot change through the simple setting screen W10 (for example, the mass original handling function, thin/thick paper reading function, or the like). The controller 11 can determine that the simple mode can be used when any of these settings has not been changed.

When it is determined that the fax job can be handled in the simple mode, the controller 11 transits the display screen from the setting history display screen W100 to the simple setting screen W10 (arrow 2-1 in the drawing, state 2→state 1). Additionally, even when the controller 11 determines that the setting history information selected by the user is of a fax job that was executed in the simple mode, the controller 11 transits the display screen from the setting history display screen W100 to the simple setting screen W10 (arrow 2-1 in the drawing, state 2→state 1).

With the transition of the display screen from the state 2 to the state 1, the controller 11 displays the setting values of the setting history information selected by the user, being applied to the simple setting screen W10, on the display unit 13.

On the other hand, when setting values that cannot be changed by the user through the simple setting screen W10 has been modified, the controller 11 determines that the simple mode cannot be used. Then, the controller 11 transits the display screen from the setting history display screen W100 to the normal setting screen W20 (arrow 2-3 in the drawing, state 2→state 3).

With the transition of the display screen from the state 2 to the state 3, the controller 11 displays the setting values of the setting history information selected by the user, being applied to the normal setting screen W20, on the display unit 13.

Note that, as illustrated in FIGS. 26A and 26B, the simple setting screen W10 and the normal setting screen W20 have respective display switching command buttons (normal setting button B17*a* and simple setting button B17*b*) provided thereon, which allow switching between the screens as appropriate when these buttons are pressed. Accordingly, for example, when the user wants to modify setting values that cannot be changed in the simple mode, the user can switch the display screen (mode) from the simple setting screen W10 to the normal setting screen W20, thereby being able to execute a fax job easily and flexibly.

Figure 30:
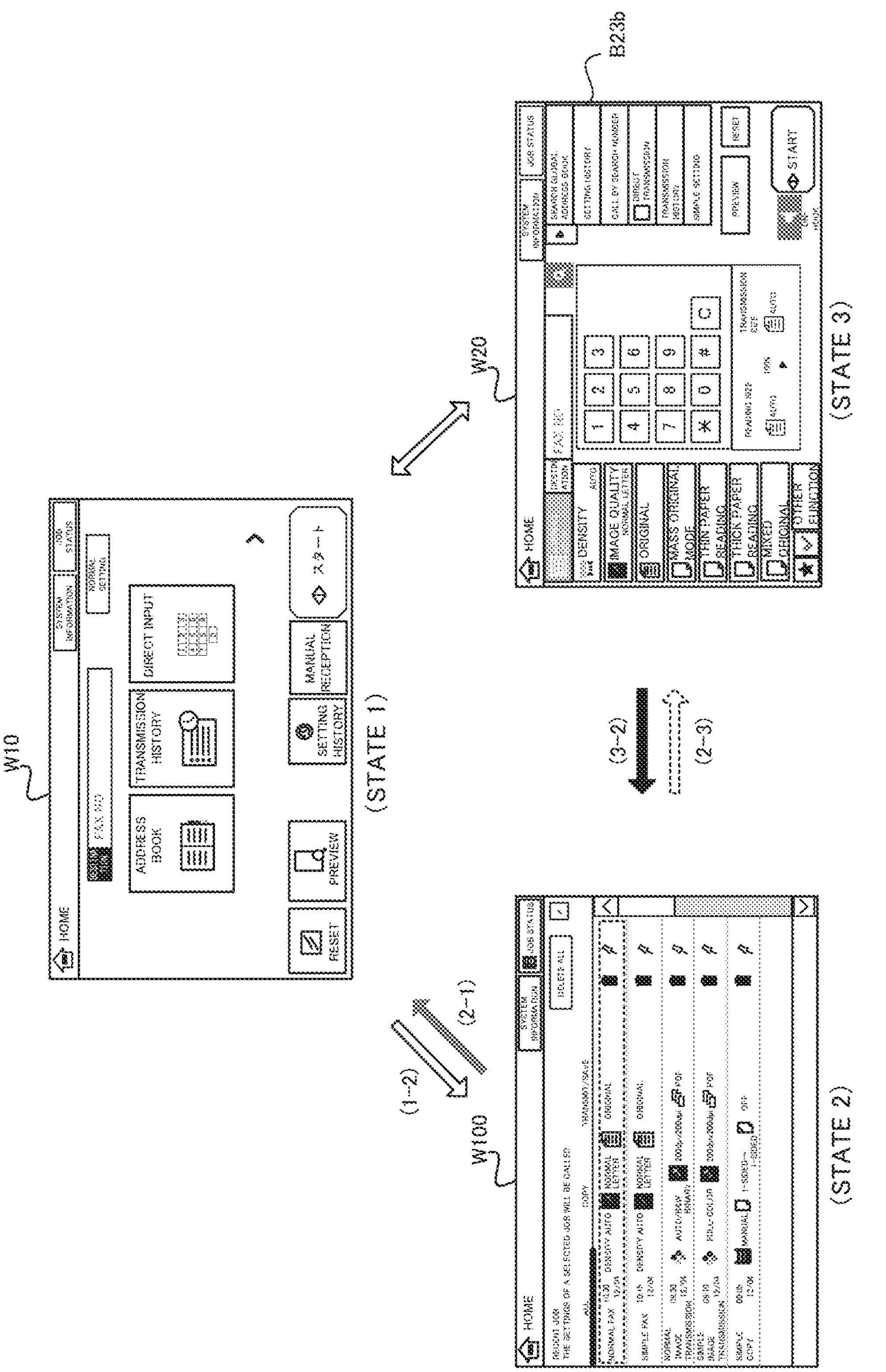
FIG. 30 is a diagram for explaining an operation example of the fifth embodiment.

FIG. 30 shows an operation example relating to a case where in the normal mode selected by the user at step S40 of FIG. 24, a job is executed in the normal mode (the normal setting screen W20), using the setting history information selected through the normal setting screen W20.

When the setting history display button B23*b* is pressed from the state 3 where the normal setting screen W20 is displayed, the controller 11 transits the display screen to the setting history display screen W100 (arrow 3-2 in the drawing, state 3→state 2).

When a piece of setting history information related to a fax job is selected by the user in the state 2, the controller 11 determines whether or not the selected setting history information is of a fax job that was executed in the normal mode (corresponding to the process at step S110 in FIG. 25). In this case, the controller 11, referring to the "mode" of the selected setting history information, can determine whether or not the setting history information is of a fax job that was executed in the normal mode.

When determining that the setting history information selected by the user is of a fax job that was executed in the normal mode, the controller 11 further determines whether or not the fax job can be handled in the simple mode (corresponding to the process of step S110; Yes→step S120 in FIG. 25). In this case, the controller 11 refers to the setting values of the setting history information and checks the setting values that the user cannot change through the simple setting screen W10 (for example, the mass original handling function, thin/thick paper reading function, or the like). The controller 11 can determine that the simple mode can be used when any of these setting values has not been changed. Then, the controller 11 transits the display screen from the setting history display screen W100 to the simple setting screen W10 (arrow 2-1 in the drawing, state 2→state 1). Note that, when the controller 11 determines that the setting history information selected by the user is of a fax job that was executed in the simple mode, the controller 11 transits the display screen from the setting history display screen W100 to the simple setting screen W10 (arrow 2-1 in the drawing, state 2→state 1).

With the transition of the display screen from the state 2 to the state 1, the controller 11 displays the setting values of the setting history information selected by the user, being applied to the simple setting screen W10, on the display unit 13.

When setting values that cannot be changed by the user through the simple setting screen W10 has been modified, the controller 11 determines that the simple mode cannot be used. Then, the controller 11 transits the display screen from the setting history display screen W100 to the normal setting screen W20 (arrow 2-3 in the drawing, state 2→state 3).

With the transition of the display screen from the state 2 to the state 3, the controller 11 displays the setting values of the setting history information selected by the user, being applied to the normal setting screen W20, on the display unit 13.

Note that, as illustrated in FIGS. 26A and 26B, the simple setting screen W10 and the normal setting screen W20 have respective display switching command buttons (normal setting button B17*a* and simple setting button B17*b*) provided thereon, which allow switching between the screens as appropriate when these buttons are pressed. Accordingly, for example, when the user wants to modify setting values that cannot be changed in the simple mode, the user can switch the display screen (mode) from the simple setting screen W10 (state 1) to the normal setting screen W20 (state 3), thereby being able to execute a fax job easily and flexibly.

Figure 31:
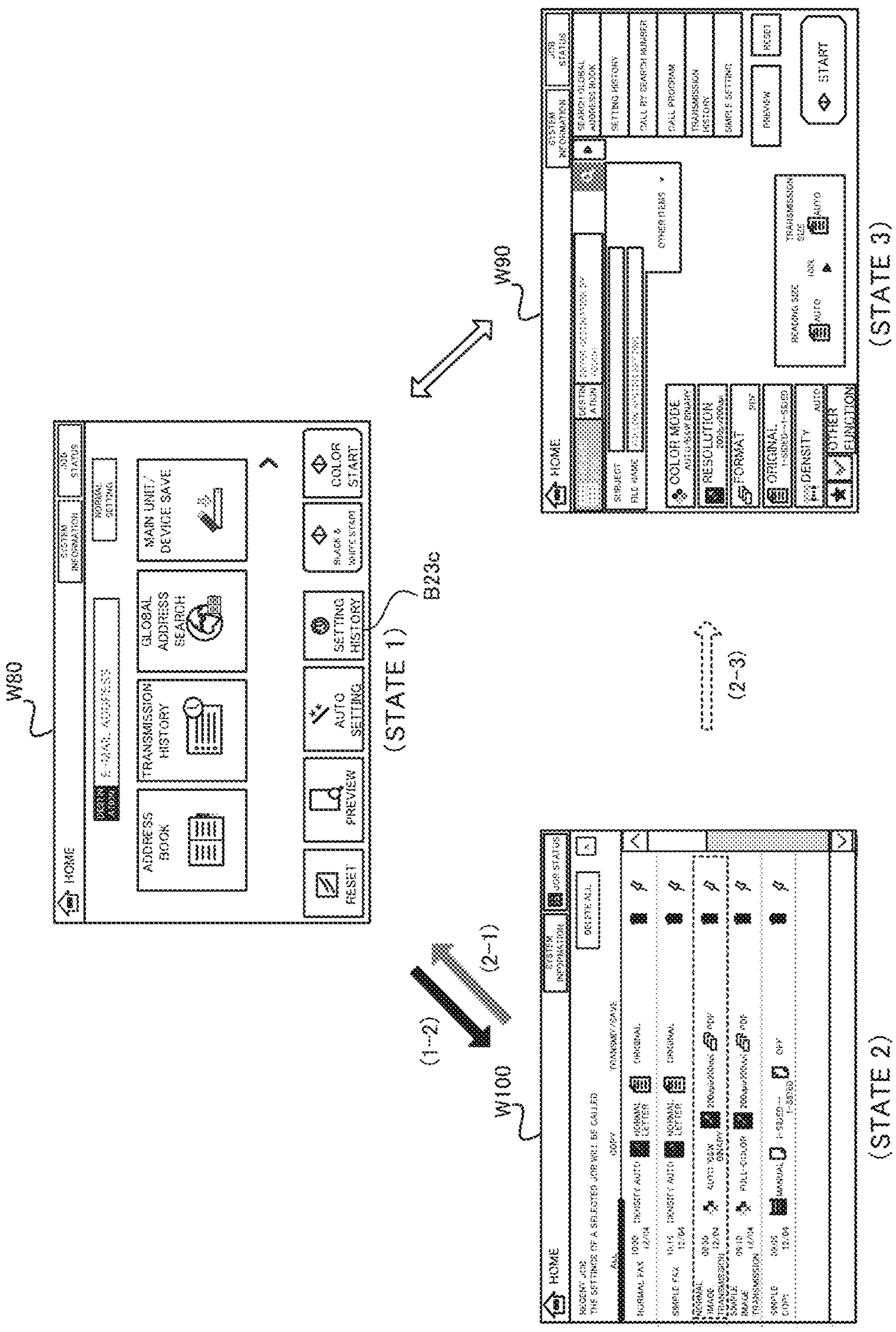
FIG. 31 is a diagram for explaining an operation example of the fifth embodiment.

FIG. 31 shows an operation example relating to a case where in the simple mode related to an image transmission job, selected by the user at step S40 of FIG. 24, a job is executed in the normal mode (the normal setting screen W90), using the setting history information selected through the simple setting screen W80.

Note that, this operation example corresponds to the processing described in the flowcharts of FIGS. 24 and 25. Description herein will be made by referring the states where the controller 11 displays the simple setting screen W80 as "state 1", the setting history display screen W100 as "state 2", and the normal setting screen W90 as "state 3".

When the setting history display button B23*c* is pressed from the state 1 where the simple setting screen W80 is displayed, the controller 11 transits the display screen to the setting history display screen W100 (arrow 1-2 in the drawing, state 1→state 2).

When a piece of setting history information related to an image transmission job is selected by the user in the state 2, the controller 11 determines whether or not the selected setting history information is of an image transmission job that was executed in the normal mode (corresponding to the process at step S110 in FIG. 25). In this case, the controller 11, referring to the "mode" of the selected setting history information, can determine whether or not the setting history information is of an image transmission job that was executed in the normal mode.

When determining that the setting history information selected by the user is of an image transmission job that was executed in the normal mode, the controller 11 further determines whether or not the image transmission job can be handled in the simple mode (corresponding to the process of step S110; Yes→step S120 in FIG. 25). In this case, the controller 11 refers to the setting values of the setting history information and checks the setting values that the user cannot change through the simple setting screen W80 (for example, compression rate function, compression format function, or the like). The controller 11 can determine that the simple mode can be used when any of these settings has not been changed.

When it is determined that the image transmission job can be handled in the simple mode, the controller 11 transits the display screen from the setting history display screen W100 to the simple setting screen W80 (arrow 2-1 in the drawing, state 2→state 1). Additionally, even when the controller 11 determines that the setting history information selected by the user is of an image transmission job that was executed in the simple mode, the controller 11 transits the display screen from the setting history display screen W100 to the simple setting screen W80 (arrow 2-1 in the drawing, state 2→state 1).

With the transition of the display screen from the state 2 to the state 1, the controller 11 displays the setting values of the setting history information selected by the user, being applied to the simple setting screen W80, on the display unit 13.

On the other hand, when setting values that cannot be changed by the user through the simple setting screen W80 has been modified, the controller 11 determines that the simple mode cannot be used. Then, the controller 11 transits the display screen from the setting history display screen W100 to the normal setting screen W90 (arrow 2-3 in the drawing, state 2→state 3).

With the transition of the display screen from the state 2 to the state 3, the controller 11 displays the setting values of the setting history information selected by the user, being applied to the normal setting screen W90, on the display unit 13.

Note that, as illustrated in FIGS. 27A and 27B, the simple setting screen W80 and the normal setting screen W90 have respective display switching command buttons (normal setting button B17*c* and simple setting button B17*d*) provided thereon, which allow switching between the screens as appropriate when these buttons are pressed. Accordingly, for example, when the user wants to modify setting values that cannot be changed in the simple mode, the user can switch the display screen (mode) from the simple setting screen W80 to the normal setting screen W90, thereby being able to execute an image transmission job easily and flexibly.

Figure 32:
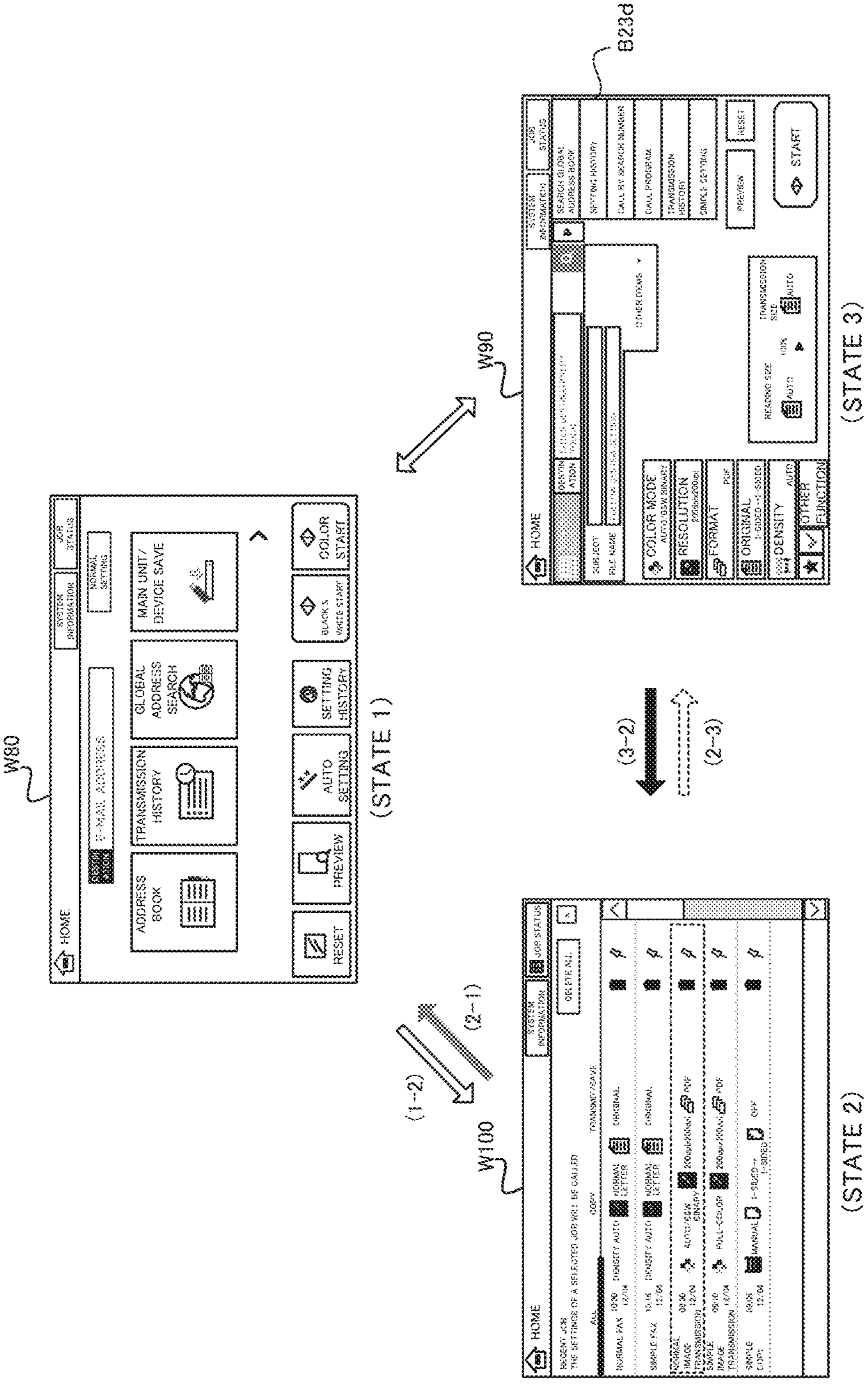
FIG. 32 is a diagram for explaining an operation example of the fifth embodiment.

FIG. 32 shows an operation example relating to a case where in the normal mode selected by the user at step S40 of FIG. 24, a job is executed in the normal mode (the normal setting screen W90), using the setting history information selected through the normal setting screen W90.

When the setting history display button B23*d* is pressed from the state 3 where the normal setting screen W90 is displayed, the controller 11 transits the display screen to the setting history display screen W100 (arrow 3-2 in the drawing, state 3→state 2).

When a piece of setting history information related to an image transmission job is selected by the user in the state 2, the controller 11 determines whether or not the selected setting history information is of an image transmission job that was executed in the normal mode (corresponding to the process at step S110 in FIG. 25). In this case, the controller 11, referring to the "mode" of the selected setting history information, can determine whether or not the setting history information is of an image transmission job that was executed in the normal mode.

When determining that the setting history information selected by the user is of an image transmission job that was executed in the normal mode, the controller 11 further determines whether or not the image transmission job can be handled in the simple mode (corresponding to the process of step S110; Yes→step S120 in FIG. 25). In this case, the controller 11 refers to the setting values of the setting history information and checks the setting values that the user cannot change through the simple setting screen W80 (for example, compression rate function, compression format function, or the like). The controller 11 can determine that the simple mode can be used when any of these setting values has not been changed. Then, the controller 11 transits the display screen from the setting history display screen W100 to the simple setting screen W80 (arrow 2-1 in the drawing, state 2→state 1). Note that, when the controller 11 determines that the setting history information selected by the user is of an image transmission job that was executed in the simple mode, the controller 11 transits the display screen from the setting history display screen W100 to the simple setting screen W80 (arrow 2-1 in the drawing, state 2→state 1).

With the transition of the display screen from the state 2 to the state 1, the controller 11 displays the setting values of the setting history information selected by the user, being applied to the simple setting screen W80, on the display unit 13.

When setting values that cannot be changed by the user through the simple setting screen W80 has been modified, the controller 11 determines that the simple mode cannot be used. Then, the controller 11 transits the display screen from the setting history display screen W100 to the normal setting screen W90 (arrow 2-3 in the drawing, state 2→state 3).

With the transition of the display screen from the state 2 to the state 3, the controller 11 displays the setting values of the setting history information selected by the user, being applied to the normal setting screen W90, on the display unit 13.

Note that, as illustrated in FIGS. 27A and 27B, the simple setting screen W80 and the normal setting screen W90 have respective display switching command buttons (normal setting button B17*c* and simple setting button B17*d*) provided thereon, which allow switching between the screens as appropriate when these buttons are pressed. Accordingly, for example, when the user wants to modify setting values that cannot be changed in the simple mode, the user can switch the display screen (mode) from the simple setting screen W80 (state 1) to the normal setting screen W90 (state 3), thereby being able to execute an image transmission job easily and flexibly.

As described above, according to the fifth embodiment, in a case where the first operation mode related to the setting screen on which display of a history is instructed and the second operation mode with which the selected history is associated, are different, when a job in the second operation mode associated with the history can be executed in the first operation mode, the setting screen corresponding to the first operation mode can be displayed. Accordingly, it is possible to provide a highly convenient image communication apparatus which enables the user to easily execute a job based on setting history information through a setting screen desired thereby.

6. Sixth Embodiment

A sixth embodiment is a configuration in which, upon selection of setting history information on the home screen as an input screen, either the execution of a job in the normal mode through the normal setting screen or the execution of a job in the simple mode through the simple setting screen can be selected.

The functional configuration of a multifunction machine according to the sixth embodiment can be the same as the functional configuration of the multifunction machine 10 according to the fifth embodiment. Therefore, the description of the functional configuration of the multifunction machine according to the sixth embodiment is omitted, and the description will be given using the same reference numerals as those of the multifunction machine 10 in the fifth embodiment.

6.1 Flow of Processing

Figure 33:
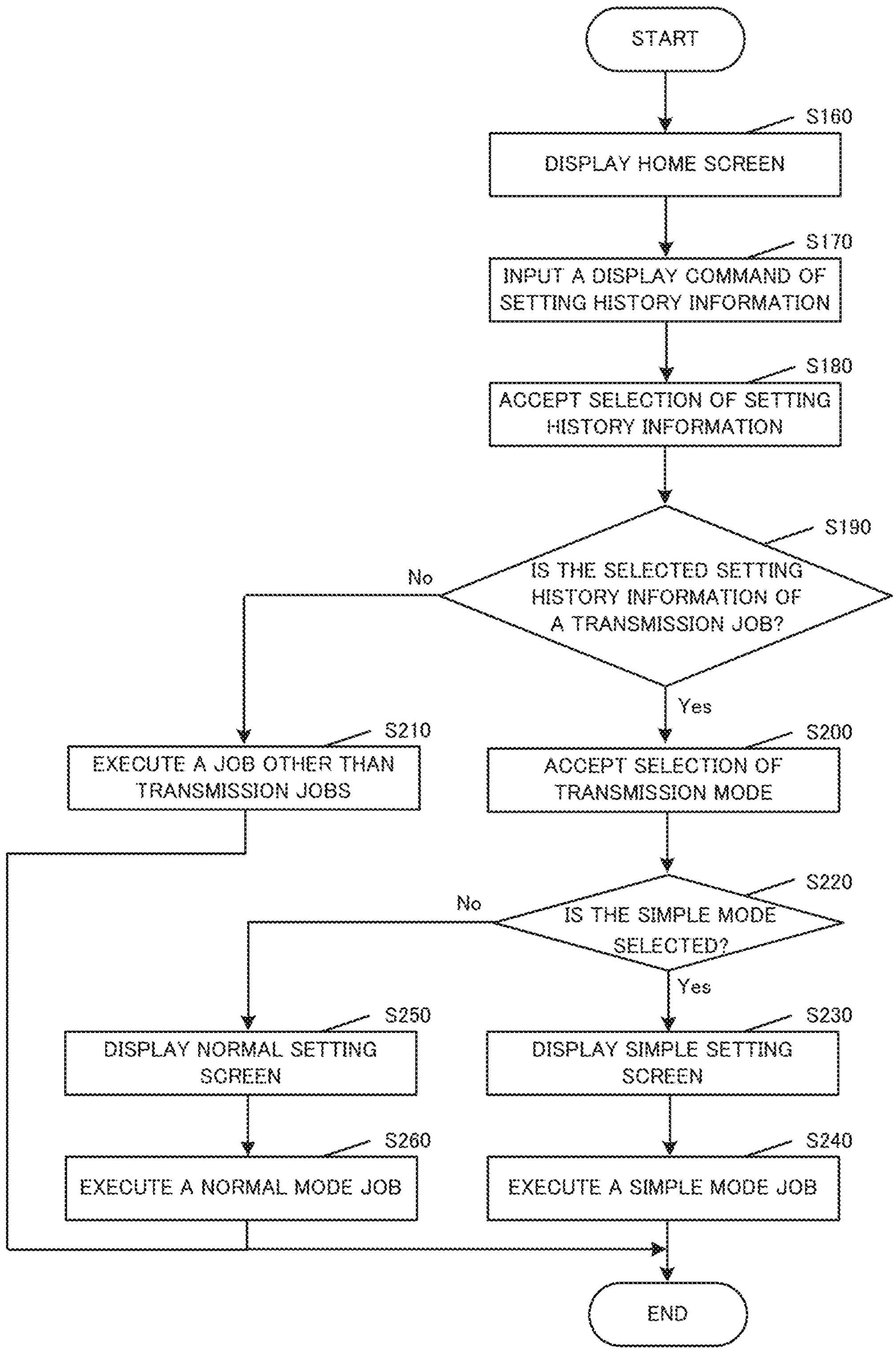
FIG. 33 is a flowchart for explaining a processing flow according to a sixth embodiment.

A flow of processing according to the sixth embodiment is described using the flowchart of FIG. 33. In the sixth embodiment, the process related to a fax job or an image transmission is started through the home screen. The home screen functions as a basic screen that is displayed on the display 13 at the time of power activation, in standby mode, at the time of recovery from sleep mode, etc., and accepts operation input by the user. Note that, the following explanation will be given on the assumption that transmission jobs including fax jobs and image transmission jobs are handled by the multifunction machine 10 as one job form. However, other than transmission jobs, this process can be also applied to copying jobs and others.

The controller 11 displays the home screen on the display 13, by reading out the display processing program 233 when, for example, power is activated, in standby mode, at the time of recovery from sleep mode, or the like (step S160).

When the user inputs a display command of setting history information (step S170), the controller 11 displays the setting history display screen on the display 13.

Next, the controller 11 accepts the user's selection of setting history information (step S180). Then, the controller 11 determines whether or not the setting history information selected by the user is of a transmission job (step S190).

When the controller 11 determines that the selected setting history information is related to a transmission job, the controller 11 accepts the user's selection of transmission mode (step S190; Yes→step S200).

The controller 11 determines whether or not the transmission mode selected by the user is the simple mode (step S220). When the transmission mode selected by the user is the simple mode, the controller 11 displays the simple setting screen on the display 13 (step S220; Yes→step S230). After displaying the simple setting screen, the controller 11 executes a simple mode job based on the execution command by the user and ends the process (step S240).

On the other hand, when the transmission mode selected by the user is not the simple mode, the controller 11 displays the normal setting screen on the display unit 13 (step S220; No→step S250). After displaying the normal setting screen, the controller 11 executes a normal mode job based on the execution command by the user and ends the process (step S260).

When it is determined at step S190 that the setting history information selected by the user is not of a transmission job, the controller 11 executes the job corresponding to the setting history information and ends the process (step S190; No→step S210).

6.2 Operation Example

Figure 34:
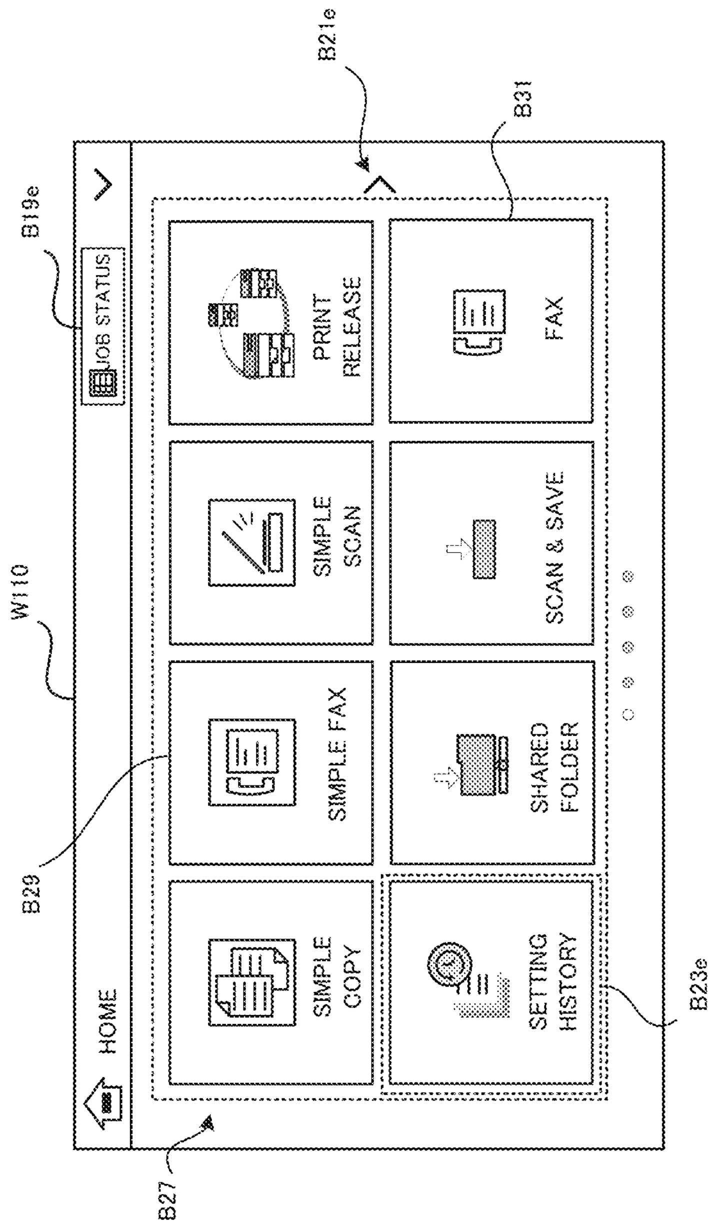
FIG. 34 is a diagram for explaining an operation example of the sixth embodiment.

FIG. 34 is a configuration example of a home screen W110. The home screen W110 includes job set selection buttons B27, a job status notification button B19*e*, and a display switching button B21*e*.

The job set selection buttons B27 accept selection of a job or various processes desired by the user. The user can execute a fax job in the simple mode by pressing the simple fax button B29 included in the job set selection buttons B27. In addition, the user can execute a fax job in the normal mode by pressing the copy button B31. The controller 11 displays the simple setting screen W10 in response to the pressing of the simple fax button B29. Similarly, the controller 11 displays the normal setting screen W20 in response to the pressing of the fax button B31. The setting history display button B23*e* accepts input of a display command of the setting history display screen as in the first embodiment.

FIG. 34 shows a display example of eight job/process items including “SIMPLE COPY”, “SIMPLE FAX”, “SIMPLE SCAN”, “PRINT RELEASE”, “SETTING HISTORY”, “SHARED FOLDER”, and “SCAN AND SAVE” as selectable job/processing items. Other job/processing items can be displayed by pressing the display switching button B21*e*. It should be noted that the configuration of the job set selection buttons B27 shown in FIG. 34 is merely an example and should not be limited to the items described in FIG. 34.

The job status notification button B19*e* accepts a notification command of the job execution status.

Figure 35:
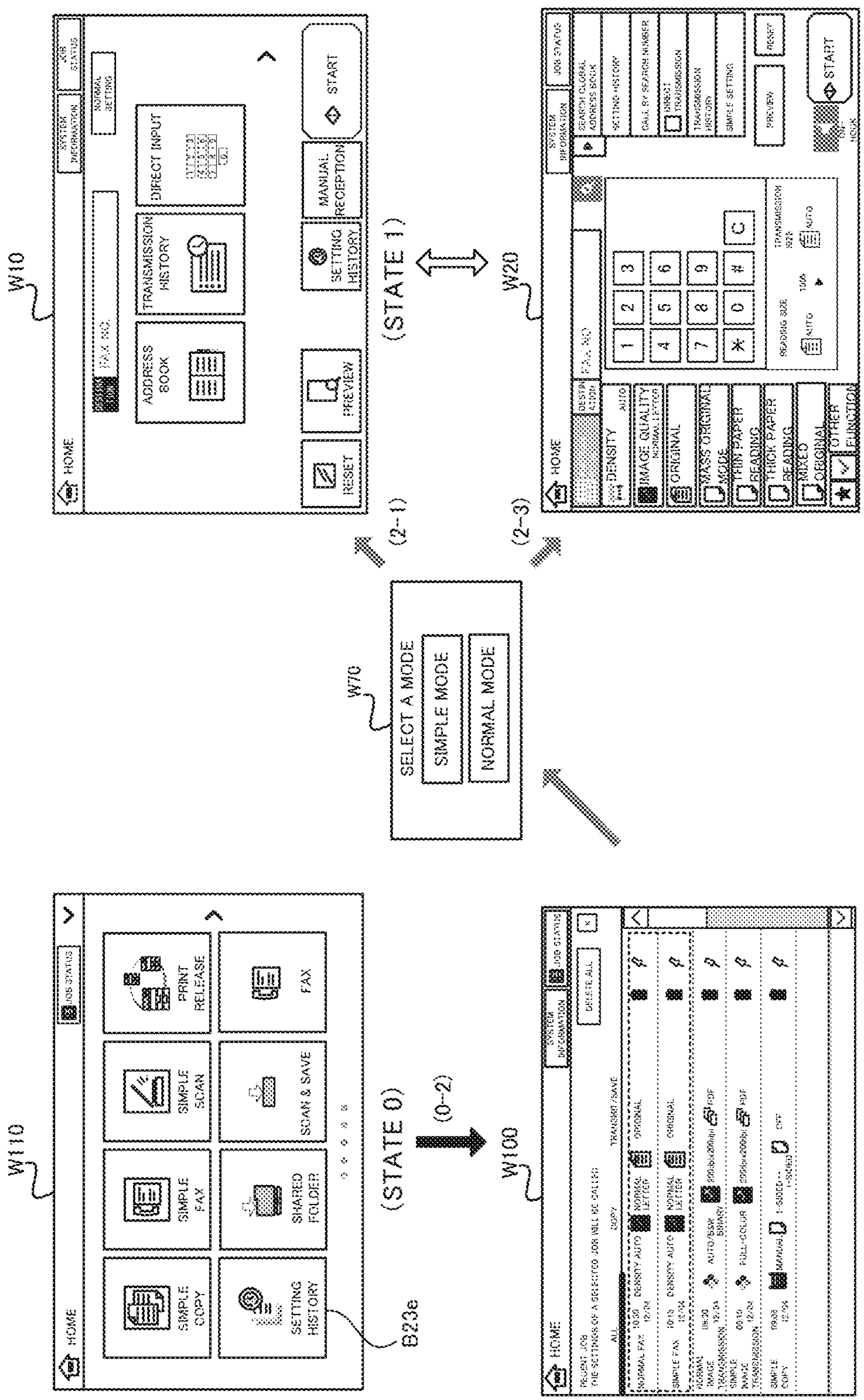
FIG. 35 is a diagram for explaining an operation example of the sixth embodiment.

FIG. 35 is an operation example of a fax job as a transmission job related to a piece of setting history information selected by the user at step S190 of FIG. 33, when accepting a mode selection of whether the fax job based on the setting history information is executed in the normal mode or in the simple mode.

Note that, this operation example corresponds to the processing described in the flowchart of FIG. 33. Description herein will be made by referring the states where the controller 11 displays the home screen W110 as "state 0", the simple setting screen W10 as "state 1", the setting history display screen W100 as "state 2", and the normal setting screen W20 as "state 3".

When the setting history display button B23*e* is pressed from the state 0 where the home screen W110 is displayed, the controller 11 transits the display screen to the setting history display screen W100 (arrow 0-2 in the drawing, state 0→state 2).

In the state 2, when the setting history information related to a fax job is selected by the user, the controller 11 displays a mode selection screen W70 for accepting a mode selection of whether the fax job based on this setting history information is executed in the normal mode or in the simple mode (corresponding to the processing of steps S190 to step S220 in FIG. 33).

When the simple mode is selected by the user through the mode selection screen W70, the controller 11 transits the display screen from the setting history display screen W100 to the simple setting screen W10 (arrow 2-1 in the drawing, state 2→state 1). Note that, when the setting history information selected by the user is a fax job that was executed in the normal mode, and if it can be handled in the simple mode, it is also possible to configure such a system as to allow transition to the simple setting screen W10.

On the other hand, when the normal mode is selected by the user through the mode selection screen W70, the controller 11 transits the display screen from the setting history display screen W100 to the normal setting screen W20 (arrow 2-3 in the drawing, state 2→state 3).

When the system construction or the like is set to prioritize either the simple mode or the normal mode, the system may be configured to display the setting screen corresponding to the priority mode without displaying the mode selection screen W70 shown in FIG. 35. Also, when, in the selected setting history information, setting values that the user cannot change through the simple setting screen W10 has been changed, that is, when a piece of setting history information that cannot be handled in the simple mode is selected, the display screen may be preferentially transited to the normal mode.

Note that, as illustrated in FIGS. 26A and 26B, the simple setting screen W10 and the normal setting screen W20 have respective switching command buttons (normal setting button B17*a* and simple setting button B17*b*) provided thereon, which allow switching between the screens as appropriate when these buttons are pressed. Accordingly, for example, when the user wants to modify setting values that cannot be changed in the simple mode, the user can switch the display screen (mode) from the simple setting screen W10 to the normal setting screen W20, thereby being able to execute a fax job easily and flexibly.

Figure 36:
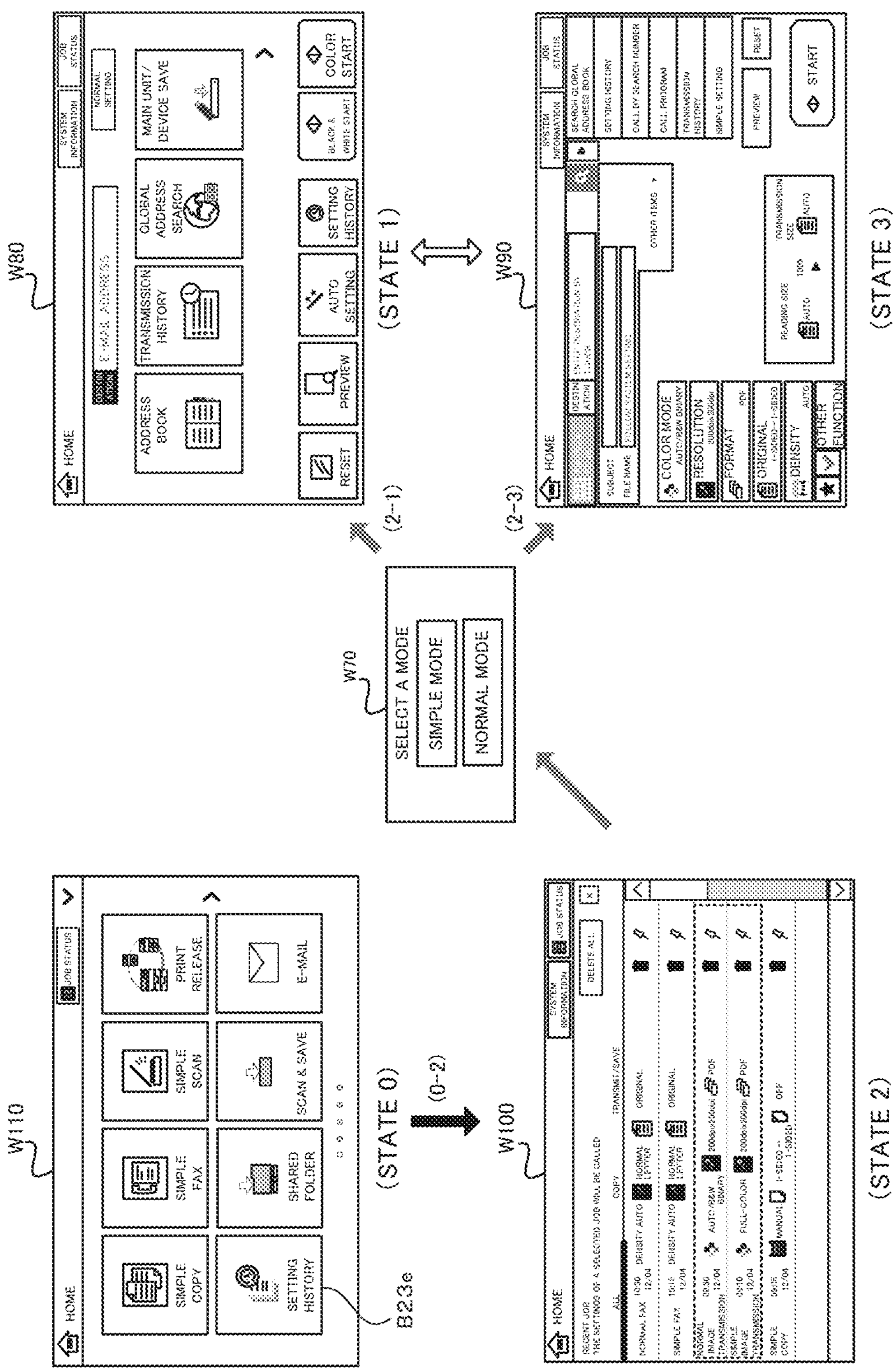
FIG. 36 is a diagram for explaining an operation example of the sixth embodiment.

FIG. 36 is an operation example of an image transmission job as a transmission job related to a piece of setting history information selected by the user at step S190 of FIG. 33, when accepting a mode selection of whether the image transmission job based on the setting history information is executed in the normal mode or in the simple mode.

Note that, this operation example corresponds to the processing described in the flowchart of FIG. 33. Description herein will be made by referring the states where the controller 11 displays the home screen W110 as "state 0", the simple setting screen W80 as "state 1", the setting history display screen W100 as "state 2", and the normal setting screen W90 as "state 3".

When the setting history display button B23*e* is pressed from the state 0 where the home screen W110 is displayed, the controller 11 transits the display screen to the setting history display screen W100 (arrow 0-2 in the drawing, state 2, state 0→state 2).

In the state 2, when the setting history information related to an image transmission job is selected by the user, the controller 11 displays a mode selection screen W70 for accepting a mode selection of whether the image transmission job based on this setting history information is executed in the normal mode or in the simple mode (corresponding to the processing of steps S190 to step S220 in FIG. 33).

When the simple mode is selected by the user through the mode selection screen W70, the controller 11 transits the display screen from the setting history display screen W100 to the simple setting screen W80 (arrow 2-1 in the drawing, state 2→state 1). Note that, when the setting history information selected by the user is of an image transmission job that was executed in the normal mode, and can be handled in the simple mode, it is also possible to configure such a system as to allow transition to the simple setting screen W80.

On the other hand, when the normal mode is selected by the user through the mode selection screen W70, the controller 11 transits the display screen from the setting history display screen W100 to the normal setting screen W90 (arrow 2-3 in the drawing, state 2→state 3).

When the system construction or the like is set to prioritize either the simple mode or the normal mode, the system may be configured to display the setting screen corresponding to the priority mode without displaying the mode selection screen W70 shown in FIG. 36. Also, when, in the selected setting history information, setting values that the user cannot change through the simple setting screen W80 has been changed, that is, when a piece of setting history information that cannot be handled in the simple mode is selected, the display screen may be preferentially transitioned to the normal mode.

Note that, as illustrated in FIGS. 27A and 27B, the simple setting screen W80 and the normal setting screen W90 have respective switching command buttons (normal setting button B17*c* and simple setting button B17*d*) provided thereon, which allow switching between the screens as appropriate when these buttons are pressed. Accordingly, for example, when the user wants to modify setting values that cannot be changed in the simple mode, the user can switch the display screen (mode) from the simple setting screen W80 to the normal setting screen W90, thereby being able to execute an image transmission job easily and flexibly.

As described above, according to the sixth embodiment, when selecting a piece of setting history information through the home screen as an input screen, the user can select either the job is executed in the normal mode through the normal setting screen or the job is executed in the simple setting screen. Accordingly, it is possible to provide a highly convenient image communication apparatus which enables the user to easily execute a job based on setting history information through a setting screen desired thereby.

7. Seventh Embodiment

A seventh embodiment is a configuration in which, upon selection of setting history information on the simple setting screen, either the execution of a job in the normal mode through the normal setting screen or the execution of a job in the simple mode through the simple setting screen can be selected.

The functional configuration of a multifunction machine according to the seventh embodiment can be the same as the functional configuration of the multifunction machine 10 according to the fifth embodiment. Therefore, the description of the functional configuration of the multifunction machine according to the seventh embodiment is omitted, and the description will be given using the same reference numerals as those of the multifunction machine 10 in the fifth embodiment.

7.1 Flow of Processing

Figure 37:
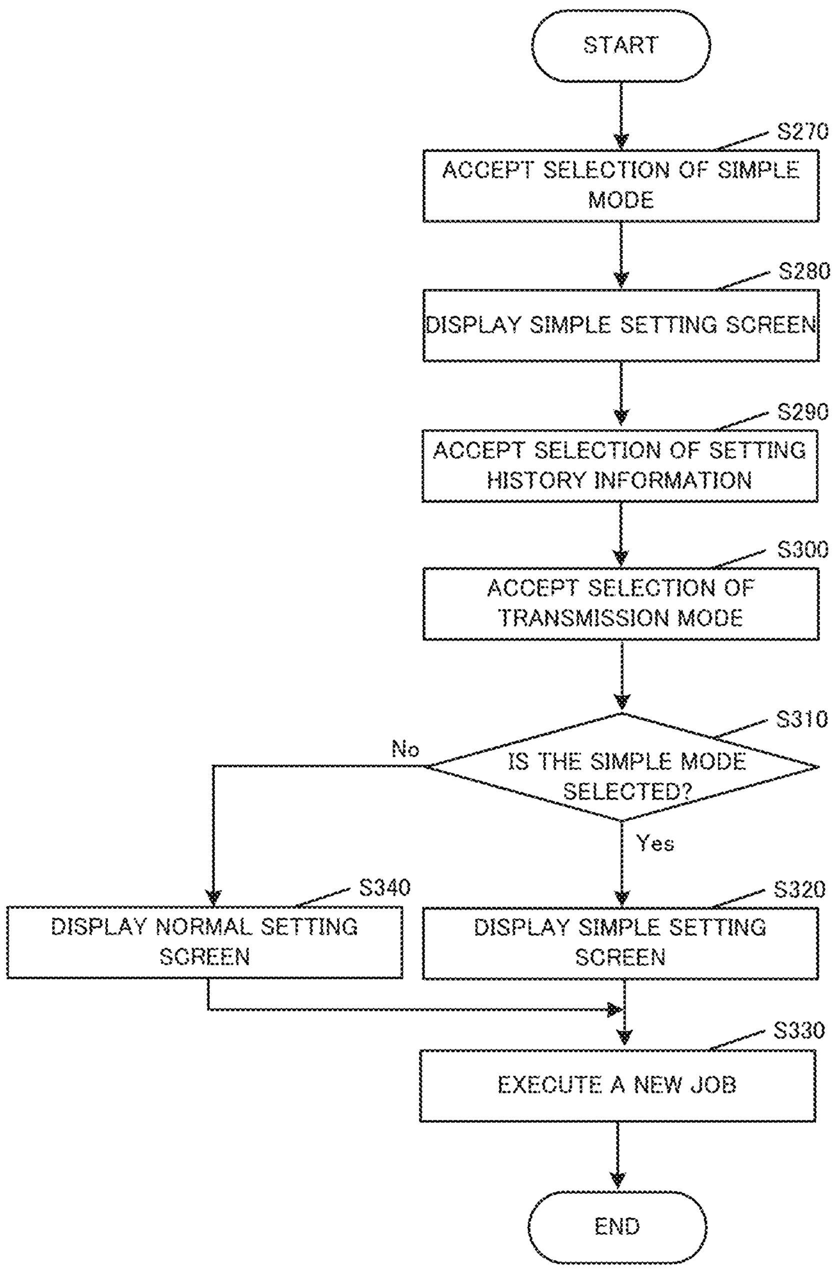
FIG. 37 is a flowchart for explaining a processing flow according to a seventh embodiment.

A flow of processing according to the seventh embodiment is described with reference to FIG. 37. FIG. 37 is a flowchart explaining a process which is set in the simple mode by the user and performed through the simple setting screen.

When the simple mode is selected by the user, the controller 11 accepts the selection of the simple mode (step S270).

The controller 11 displays the simple setting screen based on the entered simple mode, on the display unit 13 (step S280).

After displaying the simple setting screen, the controller 11 accepts user's selection of setting history information (step S290).

Then, the controller 11 accepts the selection of a transmission mode for executing a transmission job related to the selected setting history information (step S290; Yes→step S300).

When the user selects the simple mode to execute the transmission job related to the setting history information, the controller 11 displays the simple setting screen on the display 13 (step S310; Yes→step S320). Then, the controller 11 executes a new transmission job and ends the process (step S330).

On the other hand, when the user does not select the simple mode to execute the transmission job related to the setting history information, the controller 11 displays the normal setting screen on the display 13 (step S310; No→step S340). Then, the controller 11 executes a new transmission job and ends the process (step S330).

7.2 Operation Example

Figure 38:
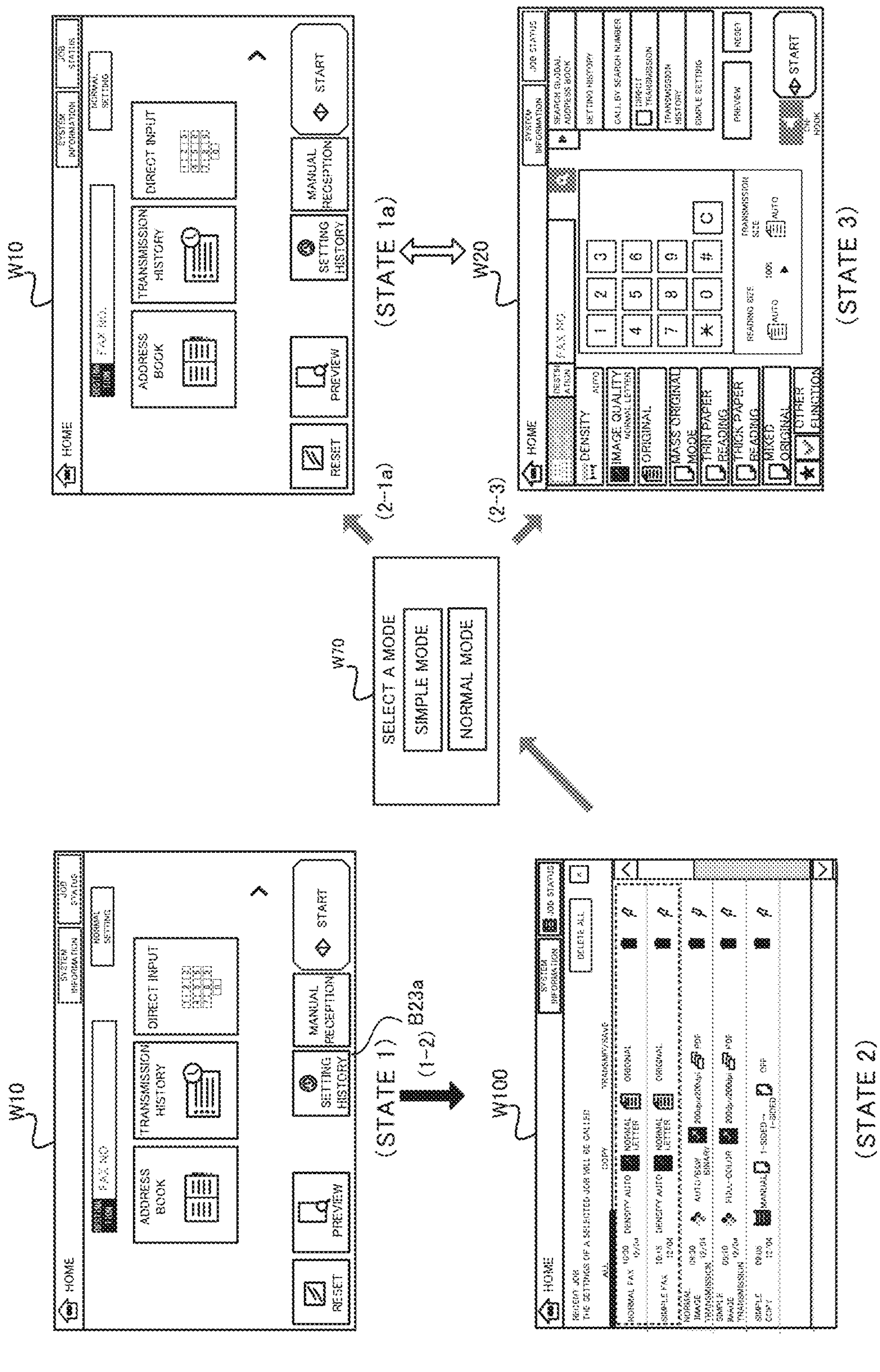
FIG. 38 is a diagram for explaining an operation example of the seventh embodiment.

FIG. 38 shows an operation example where, when, in the simple mode related to a fax job, selected by the user, the setting history information selected through the simple setting screen W10 is of a job that was executed in either the normal mode or the simple mode, it is selected whether the job is executed in the normal mode through the normal setting screen W20 or the job is executed in the simple mode through the simple setting screen W10.

This operation example corresponds to the process described with the flowchart of FIG. 37. Description herein will be made by referring the states where the controller 11 displays the simple setting screen W10 as "state 1" or "state 1a", the setting history display screen W100 as "state 2", and the normal setting screen W20 as "state 3".

When the setting history display button B23*a* is pressed from the state 1 where the simple setting screen W10 is displayed, the controller 11 transits the display screen to the setting history display screen W100 (arrow 1-2 in the drawing, state 1→state 2).

In the state 2, when the setting history information related to a fax job that was executed in the normal mode or in the simple mode is selected by the user, the controller 11 displays a mode selection screen W70 for accepting a mode selection of whether the fax job based on this setting history information is executed in the normal mode or in the simple mode.

When the simple mode is selected by the user through the mode selection screen W70, the controller 11 transits the display screen from the setting history display screen W100 to the simple setting screen W10 (arrow 2-1*a* in the drawing, state 2→state 1a). Note that, when the setting history information selected by the user is of a fax job that was executed in the normal mode, and can be handled in the simple mode, it is also possible to configure such a system as to allow transition to the simple setting screen W10.

On the other hand, when the normal mode is selected by the user through the mode selection screen W70, the controller 11 transits the display screen from the setting history display screen W100 to the normal setting screen W20 (arrow 2-3 in the drawing, state 2→state 3).

In the state 2, when the setting history information related to a fax job that was executed in the simple mode is selected by the user, the controller 11, without displaying the mode selection screen W70, transits the display screen from the setting history display screen W100 to the simple setting screen W10 (arrow 2-1*a* in the drawing, state 2→state 1a).

Figure 39:
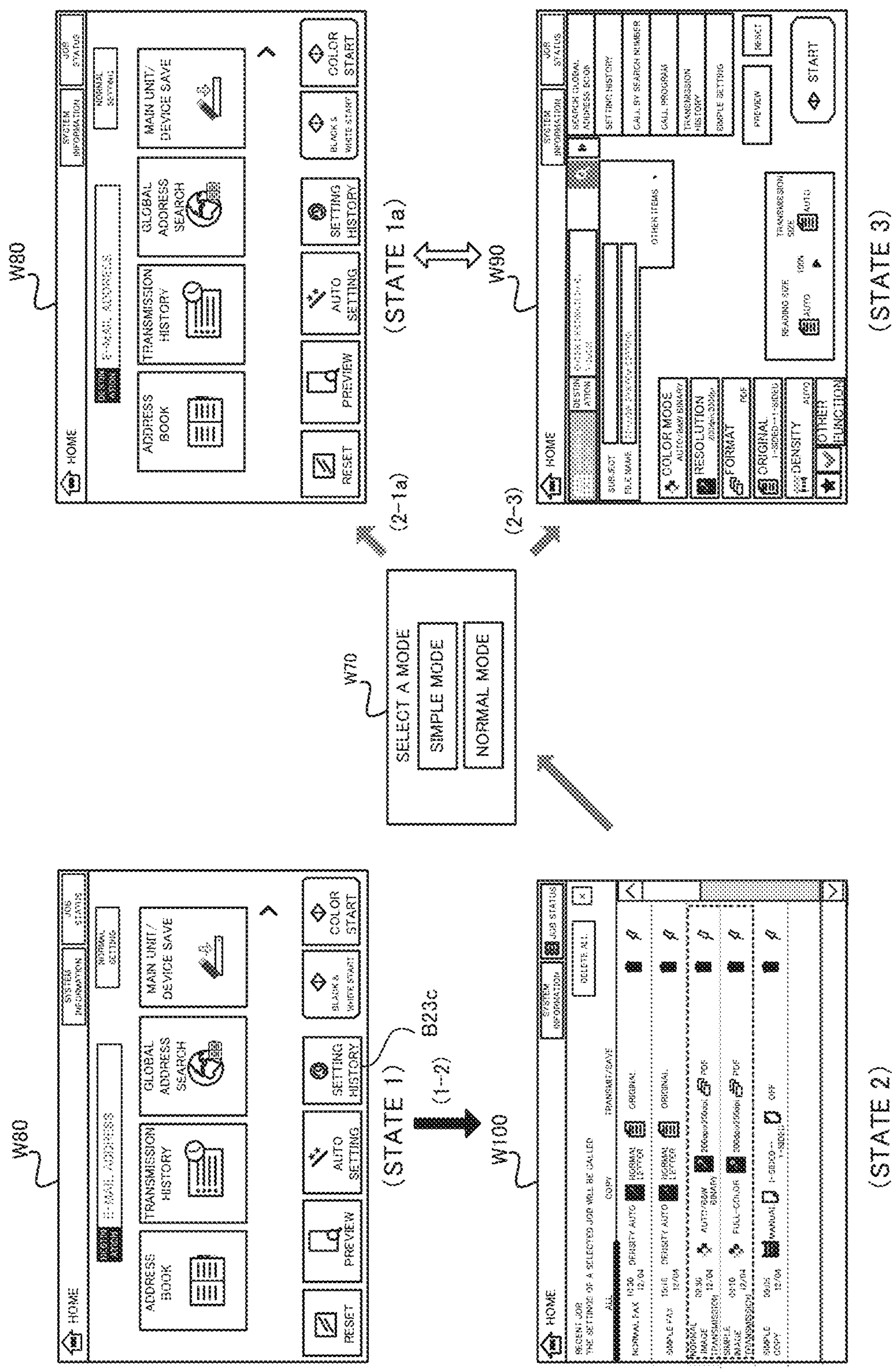
FIG. 39 is a diagram for explaining an operation example of the seventh embodiment.

FIG. 39 shows an operation example where, when, in the simple mode related to an image transmission job, selected by the user, the setting history information selected through the simple setting screen W80 is of a job that was executed in either the normal mode or the simple mode, it is selected whether the job is executed in the normal mode through the normal setting screen W90 or the job is executed in the simple mode through the simple setting screen W80.

This operation example corresponds to the process described with the flowchart of FIG. 37. Description herein will be made by referring the states where the controller 11 displays the simple setting screen W80 as "state 1" or "state 1a", the setting history display screen W100 as "state 2", and the normal setting screen W90 as "state 3".

When the setting history display button B23*c* is pressed from the state 1 where the simple setting screen W80 is displayed, the controller 11 transits the display screen to the setting history display screen W100 (arrow 1-2 in the drawing, state 1→state 2).

In the state 2, when the setting history information related to an image transmission job that was executed in either the normal mode or the simple mode is selected by the user, the controller 11 displays a mode selection screen W70 for accepting a mode selection of whether the image transmission job based on this setting history information is executed in the normal mode or in the simple mode.

When the simple mode is selected by the user through the mode selection screen W70, the controller 11 transits the display screen from the setting history display screen W100 to the simple setting screen W80 (arrow 2-1*a* in the drawing, state 2→state 1a). Note that, when the setting history information selected by the user is of an image transmission job that was executed in the normal mode, and can be handled in the simple mode, it is also possible to configure such a system as to allow transition to the simple setting screen W80.

On the other hand, when the normal mode is selected by the user through the mode selection screen W70, the controller 11 transits the display screen from the setting history display screen W100 to the normal setting screen W90 (arrow 2-3 in the drawing, state 2→state 3).

In the state 2, when the setting history information related to an image transmission job that was executed in the simple mode is selected by the user, the controller 11, without displaying the mode selection screen W70, transits the display screen from the setting history display screen W100 to the simple setting screen W80 (arrow 2-1*a* in the drawing, state 2→state 1a).

As described above, according to the seventh embodiment, when selecting setting history information on the simple setting screen, it is possible to select whether the job is executed in the normal mode through the normal setting screen or the job is executed in the simple mode through the simple setting screen. Accordingly, it is possible to provide a highly convenient information processing apparatus which enables the user to easily execute a job based on setting history information through a setting screen desired thereby.

8. Eighth Embodiment

A eighth embodiment is a configuration in which, upon selection of setting history information on the normal setting screen, either the execution of a job in the normal mode through the normal setting screen or the execution of a job in the simple mode through the simple setting screen can be selected.

The functional configuration of a multifunction machine according to the eighth embodiment can be the same as the functional configuration of the multifunction machine 10 according to the fifth embodiment. Therefore, the description of the functional configuration of the multifunction machine according to the eighth embodiment is omitted, and the description will be given using the same reference numerals as those of the multifunction machine 10 in the fifth embodiment.

8.1 Flow of Processing

Figure 40:
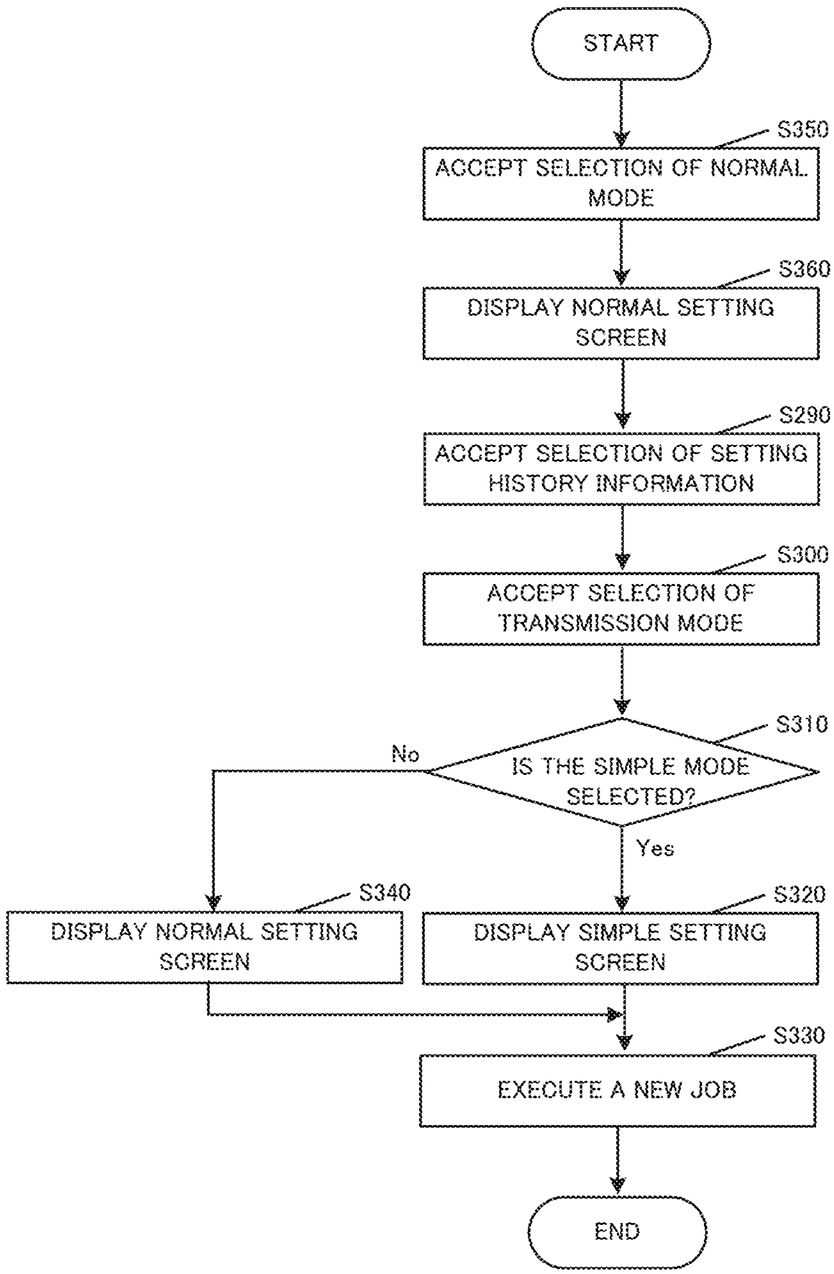
FIG. 40 is a flowchart for explaining a processing flow according to an eighth embodiment.

A flow of processing according to the eighth embodiment is described with reference to FIG. 40. FIG. 40 is a flowchart explaining a process which is set in the normal mode related to a transmission job by the user and performed through the normal setting screen. The process according to the eighth embodiment can be the same as the processing after step S290 described with reference to FIG. 37 for the seventh embodiment, except for a part thereof. Therefore, the same parts will be allotted with the same reference numerals.

When the normal mode is selected by the user, the controller 11 accepts the selection of the normal mode (step S350).

The controller 11 displays the simple setting screen based on the entered normal mode, on the display 13 (step S360).

After displaying the normal setting screen, the controller 11 accepts user's selection of setting history information (step S290).

Then, the controller 11 accepts the selection of a transmission mode for executing a transmission job related to the selected setting history information (step S300).

When the user selects the simple mode to execute the transmission job related to the setting history information, the controller 11 displays the simple setting screen on the display 13 (step S310; Yes→step S320). Then, the controller 11 executes a new transmission job and ends the process (step S330).

On the other hand, when the user does not select the simple mode to execute the transmission job related to the setting history information, the controller 11 displays the normal setting screen on the display 13 (step S310; No→step S340). Then, the controller 11 executes a new transmission job and ends the process (step S330).

8.2 Operation Example

Figure 41:
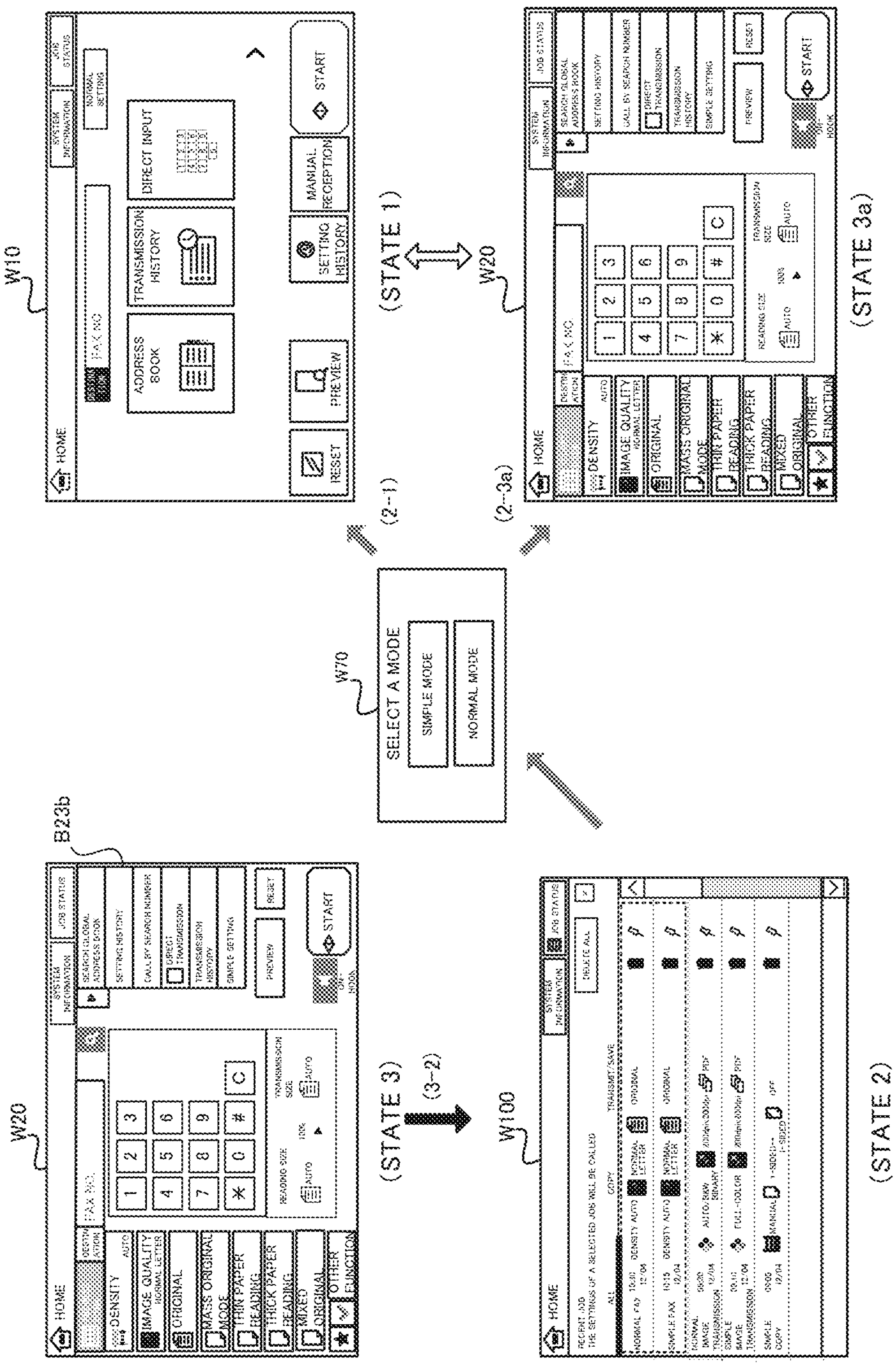
FIG. 41 is a diagram for explaining an operation example of the eighth embodiment.

FIG. 41 shows an operation example where, when, in the normal mode related to a fax job, selected by the user, the setting history information selected through the normal setting screen W20 is of a job that was executed in either the normal mode or the simple mode, it is selected whether the job is executed in the normal mode through the normal setting screen W20 or the job is executed in the simple mode through the simple setting screen W10.

This operation example corresponds to the process described with the flowchart of FIG. 40. Description herein will be made by referring the states where the controller 11 displays the simple setting screen W10 as "state 1", the setting history display screen W100 as "state 2", and the normal setting screen W20 as "state 3" or "state 3a".

When the setting history display button B23*b* is pressed from the state 3 where the normal setting screen W20 is displayed, the controller 11 transits the display screen to the setting history display screen W100 (arrow 3-2 in the drawing, state 3→state 2).

In the state 2, when the setting history information related to a fax job that was executed in either the normal mode or the simple mode is selected by the user, the controller 11 displays a mode selection screen W70 for accepting a mode selection of whether the fax job based on this setting history information is executed in the normal mode or in the simple mode.

When the simple mode is selected by the user through the mode selection screen W70, the controller 11 transits the display screen from the setting history display screen W100 to the simple setting screen W10 (arrow 2-1 in the drawing, state 2→state 1). Note that, when the setting history information selected by the user is of a fax job that was executed in the normal mode, and can be handled in the simple mode, it is also possible to configure such a system as to allow transition to the simple setting screen W10.

On the other hand, when the normal mode is selected by the user through the mode selection screen W70, the controller 11 transits the display screen from the setting history display screen W100 to the normal setting screen W20 (arrow 2-3*a* in the drawing, state 2→state 3a).

In the state 2, when the setting history information related to a fax job that was executed in the simple mode is selected by the user, the controller 11, without displaying the mode selection screen W70, transits the display screen from the setting history display screen W100 to the simple setting screen W10 (arrow 2-1 in the drawing, state 2→state 1).

Figure 42:
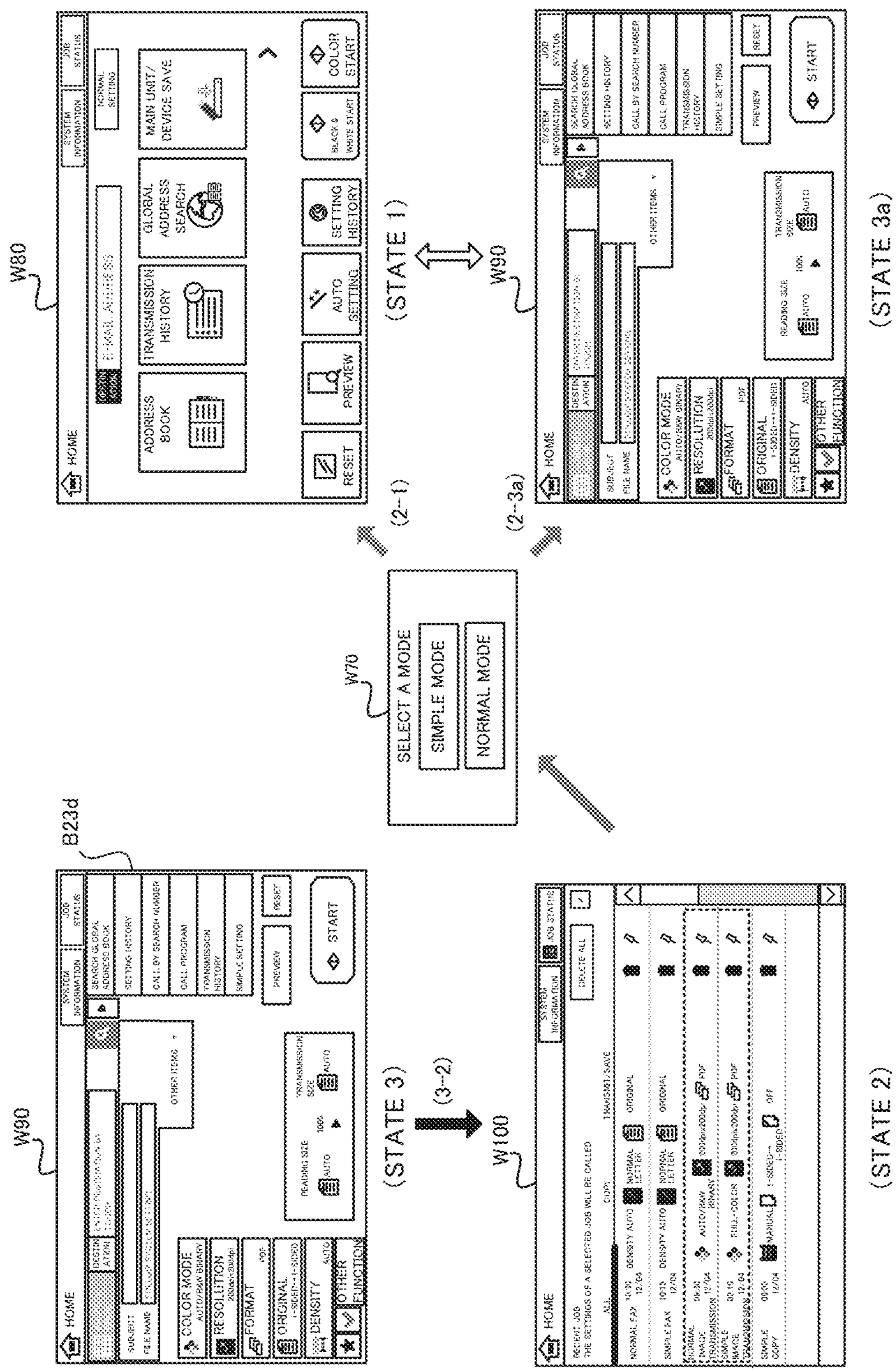
FIG. 42 is a diagram for explaining an operation example of the eighth embodiment.

FIG. 42 shows an operation example where, when, in the normal mode related to an image transmission job, selected by the user, the setting history information selected through the normal setting screen W90 is of a job that was executed in either the normal mode or the simple mode, it is selected whether the job is executed in the normal mode through the normal setting screen W90 or the job is executed in the simple mode through the simple setting screen W80.

This operation example corresponds to the process described with the flowchart of FIG. 40. Description herein will be made by referring the states where the controller 11 displays the simple setting screen W80 as "state 1", the setting history display screen W100 as "state 2", and the normal setting screen W90 as "state 3" or "state 3a".

When the setting history display button B23*d* is pressed from the state 3 where the normal setting screen W90 is displayed, the controller 11 transits the display screen to the setting history display screen W100 (arrow 3-2 in the drawing, state 3→state 2).

In the state 2, when the setting history information related to an image transmission job that was executed in either the normal mode or the simple mode is selected by the user, the controller 11 displays a mode selection screen W70 for accepting a mode selection of whether the image transmission job based on this setting history information is executed in the normal mode or in the simple mode.

When the simple mode is selected by the user through the mode selection screen W70, the controller 11 transits the display screen from the setting history display screen W100 to the simple setting screen W80 (arrow 2-1*a* in the drawing, state 2→state 1). Note that, when the setting history information selected by the user is of an image transmission job that was executed in the normal mode, and can be handled in the simple mode, it is also possible to configure such a system as to allow transition to the simple setting screen W80.

On the other hand, when the normal mode is selected by the user through the mode selection screen W70, the controller 11 transits the display screen from the setting history display screen W100 to the normal setting screen W90 (arrow 2-3*a* in the drawing, state 2→state 3a).

In the state 2, when the setting history information related to an image transmission job that was executed in the simple mode is selected by the user, the controller 11, without displaying the mode selection screen W70, transits the display screen from the setting history display screen W100 to the simple setting screen W80 (arrow 2-1 in the drawing, state 2→state 1).

As described above, according to the eighth embodiment, when selecting setting history information on the normal setting screen, it is possible to select whether the job is executed in the normal mode through the normal setting screen or the job is executed in the simple mode through the simple setting screen. Accordingly, it is possible to provide a highly convenient image communication apparatus which enables the user to easily execute a job based on setting history information through a setting screen desired thereby.

9. Ninth Embodiment

A ninth embodiment provides a configuration in which when setting history information related to a broadcast transmission (a function of simultaneously transmitting to destinations of different transmission methods (for example, fax, image transmission, internet fax, saving in a shared folder, etc.)) is used, the display screen is transited depending on the number of destinations stored in each of setting history information, to the setting screen for the transmission method having the largest number of destinations stored in the setting history information thereof. The description of the ninth embodiment will be explained with an example in which a fax job is referred to as the first transmission method, and an image transmission (e-mail transmission) job is referred to as the second transmission method.

The functional configuration of a multifunction machine according to the ninth embodiment can be the same as the functional configuration of the multifunction machine 10 according to the fifth embodiment. Therefore, the description of the functional configuration of the multifunction machine according to the ninth embodiment is omitted, and the description will be given using the same reference numerals as those of the multifunction machine 10 in the fifth embodiment.

9.1 Flow of Processing

A flow pf processing according to the ninth embodiment is described with reference to FIG. 43. Controller 11 displays the home screen on the display unit 13 (step S370). When the user inputs a display command of the setting history display screen (step S380), the controller 11 displays the setting history display screen on the display 13.

Next, the controller 11 accepts a selection of setting history information by the user (step S390). The controller 11 determines whether or not the setting history information selected by the user is related to a broadcast transmission job (step S400). When the selected setting history information is related to a broadcast transmission job, the controller 11 checks the number of destinations related to the first transmission method of the broadcast transmission, i.e., faxing and that related to the second transmission method, i.e., image transmission (e-mail transmission) and compares the two (step S400; Yes→step S410).

As a result of comparing the number of destinations, when it is determined that the number of destinations related to faxing is greater, the controller 11 displays the fax setting screen (step S420; Yes→step S430). Then, the controller 11 executes the fax job (step S440) and ends the process.

On the other hand, as a result of comparing the number of destinations, when it is determined that the number of destinations related to e-mail transmission is greater, the controller 11 displays the e-mail setting screen (step S420; No→step S460). Then, the controller 11 executes the e-mail transmission job (step S470) and ends the process.

When the selected setting history information is not related to a broadcast transmission job, the controller 11 applies the setting history information to the setting screen of a job related to the selected setting history information, and executes the job based on the user's instruction (step S400; No→step S450).

9.2 Operation Example

Figure 44:
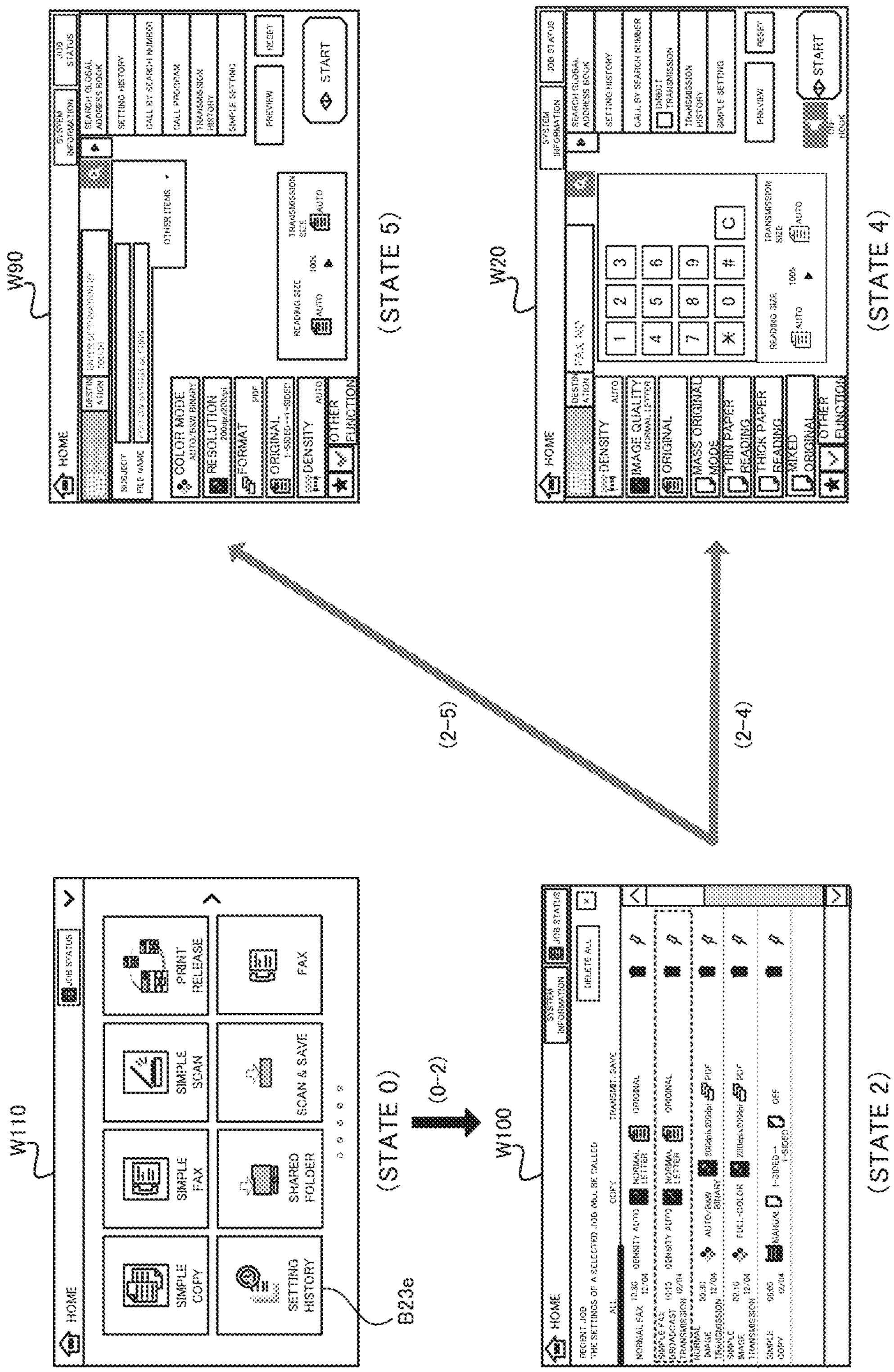
FIG. 44 is a diagram for explaining an operation example of the ninth embodiment.

FIG. 44 shows an operation example in which when setting history information related to a broadcast transmission is used, the display screen is transited in accordance with the number of destinations stored in each of setting history information, to the setting screen for the transmission method having the largest number of destinations stored in the setting history information thereof.

Figure 43:
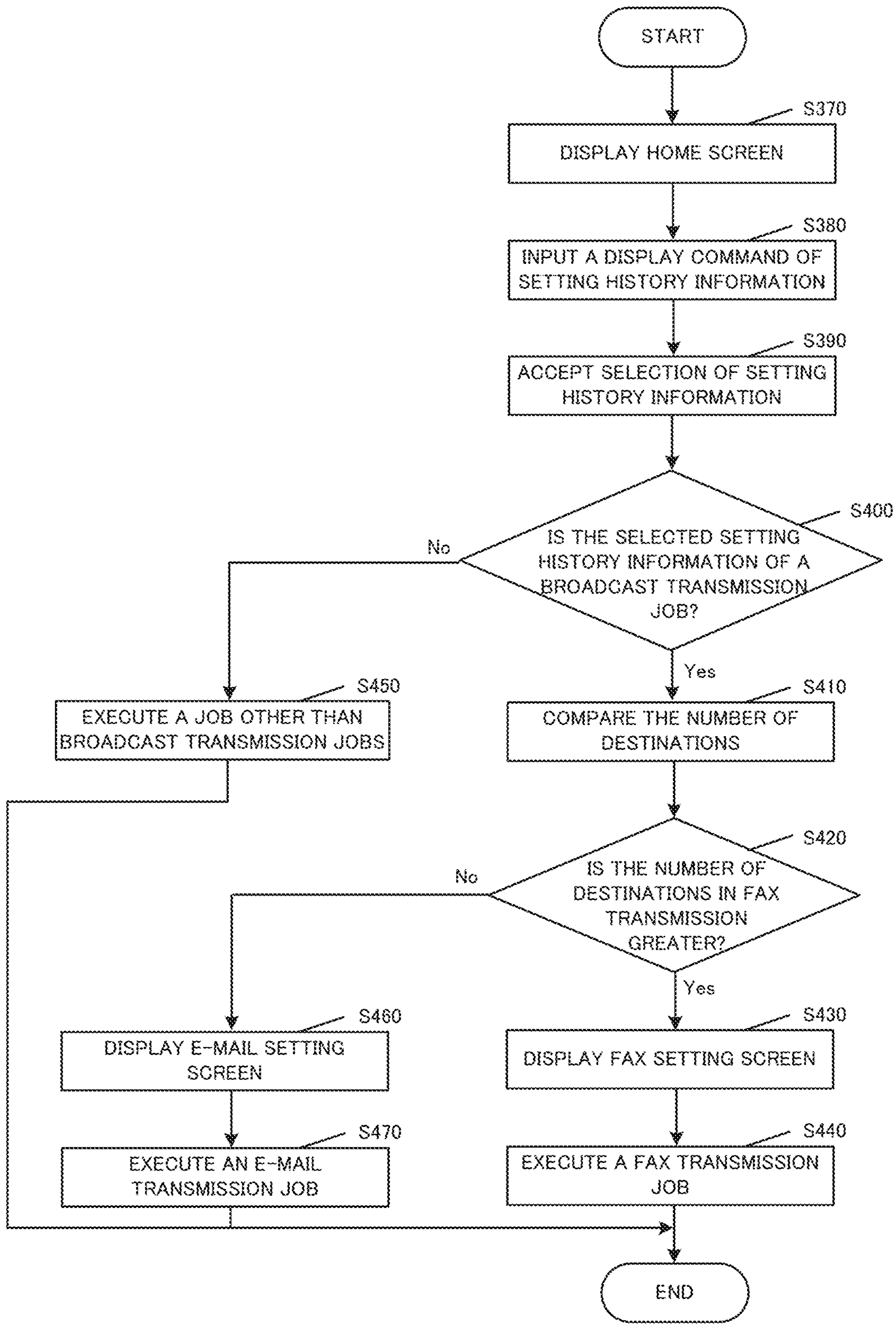
FIG. 43 is a flowchart for explaining a processing flow according to a ninth embodiment.

This operation example corresponds to the process described in the flowchart of FIG. 43. Description herein will be made by referring the states where the controller 11 displays a home screen W110 as "state 0", a setting history display screen W100 as "state 2", a fax setting screen (displayed as a normal setting screen) W20 as "state 4 and an e-mail setting screen (displayed as a normal setting screen) W90 as "state 5".

When the setting history display button B23*e* is pressed from the state 0 where the home screen W110 is displayed, the controller 11 transits the display screen to the setting history display screen W100 (arrow 0-2 in the drawing, state 0→state 2).

In the state 2, when a broadcast transmission job is selected by the user, the controller 11, in accordance with the number of destinations of the transmission method (fax or e-mail), displays either the fax setting screen W20 (arrow 2-4, state 2→state 4) or the e-mail setting screen W90 (arrow 2-5, state 2→state 5).

9.3 Modification

As a modification, explanation will made on a form in which the operation screen the user is operating is preferentially displayed without regard to the number of destinations in each of transmission methods related to a broadcast transmission job.

Figure 45:
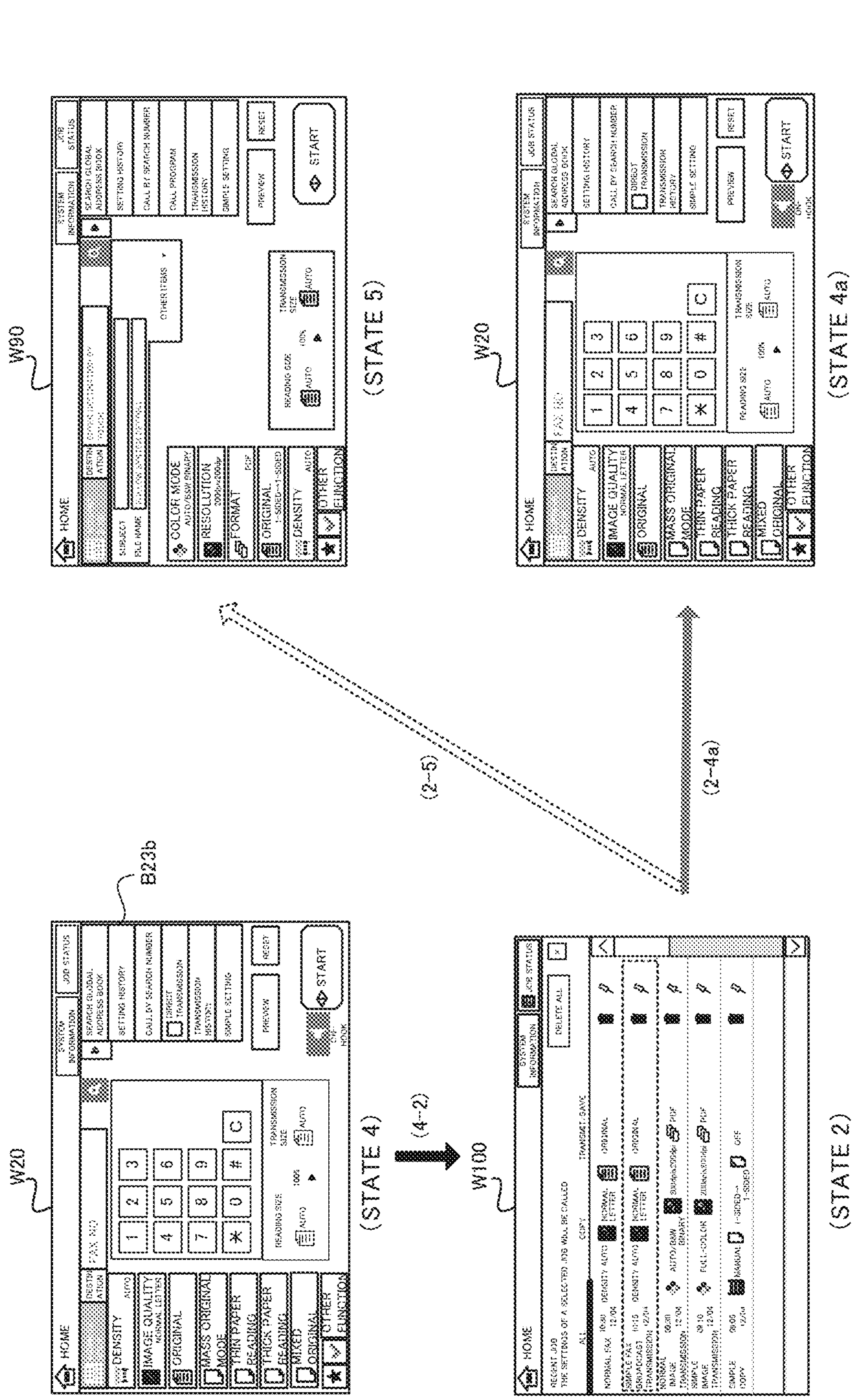
FIG. 45 is a diagram for explaining an operation example of the ninth embodiment.

FIG. 45 shows an operation example in which the operation screen the user is operating is preferentially displayed without regard to the number of destinations in each of transmission methods related to a broadcast transmission job.

In this operation example, the controller 11 does not compare the number of destinations between the transmission methods related to a broadcast transmission job. The controller 11 displays the setting screen of a transmission method as to which a display command of a setting history is given. Description herein will be made by referring the states where the controller 11 displays the setting history display screen W100 as "state 2", the fax setting screen W20 as "state 4 or state 4a", and the e-mail setting screen W90 as "state 5".

When the setting history display button B23*b* is pressed from the state 4 where the fax setting screen W20 is displayed, the controller 11 transits the display screen to the setting history display screen W100 (arrow 4-2 in the drawing, state 4→state 2).

In the state 2, when a broadcast transmission job is selected by the user, the controller 11 will not transit the display screen to the e-mail setting screen W90 (arrow 2-5, state 2→state 5), but transits the display screen to the fax setting screen W20 which is instructed to be displayed through the setting history display screen W100 (arrow 2-4*a*, status 2→status 4a).

As described above, according to the ninth embodiment, when setting history information related to a broadcast transmission job is used, the display screen is transited to the setting screen of a transmission method, depending on the number of destinations related to the setting history information or the operation screen the user operates. Accordingly, it is possible to provide a highly convenient image communication apparatus which enables the user to easily execute a job based on setting history information through a setting screen desired thereby.

The present invention should not be limited to the above-described embodiments, and various modifications can be made. That is, the technical scope of the present invention also includes embodiments obtained by combining technical means appropriately modified within the scope of the gist of the present invention.

Further, the above-described embodiments are described separately for the convenience of explanation, but it is needless to say that they may be executed in combination to the extent technically possible.

Further, the programs that are operated in each device in the embodiments are those that control a CPU or the like (programs that cause a computer to function) so as to realize the functions of the above-described embodiments. The information handled by these devices is temporarily stored in a temporary storage device (for example, RAM) at the time of processing, then stored in various storage devices such as ROMs and HDDs, and read by the CPU as needed, and corrected and saved.

Here, as the recording medium for storing the programs, a semiconductor medium (for example, ROM, a non-volatile memory card, etc.), an optical recording medium/magneto-optical recording medium (for example, a Digital Versatile Disc (DVD), Magneto Optical Disc (MO), Mini Disc (MD), Compact Disc (CD), Blu-ray (registered trademark) Disk (BD), etc., magnetic recording medium (for example, magnetic tape, flexible disk, etc.) and the like may be employed. In addition, not only the functions of the above-described embodiments are realized by executing the loaded program, but also the functions of the present invention may be realized based on the instructions of the program in combination with the operating system or other application programs.

In addition, when distributing on the market, the program can be stored and distributed in a portable recording medium, or transferred to a server computer connected via a network such as the internet. In this case, it goes without saying that the storage device of the server computer is also included in the present invention.

What is claimed is:

1. An information processing apparatus, comprising:

a display;

a storage; and one or more controllers, wherein the one or more controllers are configured to display, on the display, either an execution screen for accepting an execution command of a job or a simplified execution screen for accepting the execution command of the job, the simplified execution screen displaying fewer items that is displayed on the execution screen, the storage is configured to store history information related to the job executed through either the execution screen or the simplified execution screen, and the one or more controllers are further configured to:

display the history information, accept a selection of an item in the history information related to the job executed through the execution screen, and display a selection screen on the display after the item in the history information has been selected, the selection screen prompting the user to select either the execution screen or the simplified execution screen to input another execution command related to the job.

2. The information processing apparatus according to claim 1, wherein the one or more controllers, when the history information related to the job executed through the execution screen is selected, is further configured to determine that the other execution command related to the job is accepted through the simplified execution screen.

3. The information processing apparatus according to claim 1, further comprising an authenticator for authenticating users, wherein in a state that the user has been authenticated, the one or more controllers are further configured to:
accept an input to display the history information through an input screen displayed on the display; and
determine that the other execution command related to the job is accepted through the simplified execution screen when the history information related to the job that was executed by another user is selected.

4. The information processing apparatus according to claim 3, wherein in a state that the user has been authenticated,
the one or more controllers are further configured to:
determine that the other execution command related to the job is accepted through the execution screen when the history information related to the job that was executed by the user is selected.

5. A method for controlling an information processing apparatus, the method comprising:
displaying, on a display, either an execution screen for accepting an execution command of a job or a simplified execution screen for accepting the execution command of the job, the simplified execution screen displaying fewer items that is displayed on the execution screen;
storing history information related to the job executed through either the execution screen or the simplified execution screen;
displaying, on the display, the history information;
accepting a selection of an item in the history information related to the job executed through the execution screen; and
displaying, on the display, a selection screen after the item in the history information has been selected, the selection screen prompting the user to select either the execution screen or the simplified execution screen to input the execution command of the job.

6. An image communication apparatus comprising:
a communicator configured to communicate with another device in accordance with an operation mode;
a history manager configured to manage the operation mode and a history of the communicator; and
one or more controllers configured to control a displaying of the history, wherein
when a first operation mode, which is related to a setting screen that accepted a display command of the history, and a second operation mode, which is associated with a selected history, are different, and when a job associated with the history is executed in the first operation mode, the one or more controllers are configured to display a setting screen corresponding to the first operation mode,
the second operation mode is a normal mode in which the job is executed through a normal setting screen, and the first operation mode is a simple mode in which the job is executed through a simplified setting screen displaying fewer items that is displayed in the normal setting screen, and
after the history has been selected on an input screen for accepting the display command of the history related to the job, the one or more controllers are configured to display a selection screen for prompting a user to select either the normal mode or the simple mode to execute the job associated with the hi story.

7. The image communication apparatus according to claim 6, wherein the input screen has a display command input means for the history.

8. The image communication apparatus according to claim 6, wherein the one or more controllers are further configured to:
display the setting screen related to either the normal mode or the simple mode, and
display the selection screen for prompting a user to select either the normal mode or the simple mode to execute the job associated with the history when the history, selected through the setting screen and related to the job, is executed in either the normal mode or the simple mode.

* * * * *